United States Patent [19] [11] Patent Number: 5,806,072
Kuba et al. [45] Date of Patent: Sep. 8, 1998

[54] ELECTRONIC IMAGING APPARATUS HAVING HIERARCHICAL IMAGE DATA STORAGE STRUCTURE FOR COMPUTER-COMPATIBLE IMAGE DATA MANAGEMENT

[75] Inventors: Hirokazu Kuba; Yawara Saitoh; Takeshi Suzuki, all of Tokyo, Japan

[73] Assignee: Olympus Optical Co., Ltd., Tokyo, Japan

[21] Appl. No.: 995,264

[22] Filed: Dec. 21, 1992

[30] Foreign Application Priority Data

| Dec. 20, 1991 | [JP] | Japan | 3-338791 |
| Dec. 26, 1991 | [JP] | Japan | 3-345538 |
| Jan. 21, 1992 | [JP] | Japan | 4-008375 |
| Feb. 19, 1992 | [JP] | Japan | 4-032310 |
| Mar. 17, 1992 | [JP] | Japan | 4-091880 |
| Apr. 28, 1992 | [JP] | Japan | 4-135855 |
| May 19, 1992 | [JP] | Japan | 4-151571 |
| Nov. 11, 1992 | [JP] | Japan | 4-326070 |
| Nov. 11, 1992 | [JP] | Japan | 4-326072 |

[51] Int. Cl.$^6$ .............................. G06F 17/30; G03B 19/02
[52] U.S. Cl. .................... 707/200; 348/231; 348/232; 707/100; 707/104
[58] Field of Search .................... 395/600, 425, 395/616, 615, 611; 364/419.19; 348/231, 232

[56] References Cited

U.S. PATENT DOCUMENTS

| 4,131,919 | 12/1978 | Lloyd et al. | 386/117 |
| 4,541,021 | 9/1985 | Konishi et al. | 386/120 |
| 4,691,253 | 9/1987 | Silver | 386/118 |
| 4,758,883 | 7/1988 | Kawahara et al. | 348/222 |
| 4,803,554 | 2/1989 | Pape | 348/231 |
| 4,805,013 | 2/1989 | Dei et al. | 358/523 |
| 4,837,628 | 6/1989 | Sasaki | 348/220 |
| 4,858,032 | 8/1989 | Okada et al. | 360/91 |
| 4,887,161 | 12/1989 | Watanabe et al. | 348/233 |
| 4,897,732 | 1/1990 | Kinoshita et al. | 386/118 |
| 4,903,132 | 2/1990 | Yamawaki | 348/231 |
| 4,907,231 | 3/1990 | Watanabe et al. | 371/24 |
| 4,914,746 | 4/1990 | Nishi et al. | 386/32 |
| 4,930,014 | 5/1990 | Maeda et al. | 348/231 |
| 4,947,271 | 8/1990 | Nakayama et al. | 386/102 |
| 4,951,140 | 8/1990 | Ueno et al. | 348/413 |
| 4,982,291 | 1/1991 | Kurahashi et al. | 386/70 |
| 5,005,076 | 4/1991 | Stroppina et al. | 348/400 |
| 5,016,107 | 5/1991 | Sasson et al. | 348/231 |
| 5,018,017 | 5/1991 | Sasaki et al. | 348/232 |

(List continued on next page.)

OTHER PUBLICATIONS

Gregory Quick, "DYCAM to Release Digital Still Camera", *Macintosh News*, Feb. 12, 1990, p. 28.

Carolyn Said, "DYCAM Premiers Still–video Camera for Transmitting Grey–Scale Photographs to Computers via Cable", *MacWeek*, vol. 4, No. 11, Mar. 20, 1990, p. 27.

Cynthia Morgan, "Logitech Debuts Digital Camera", *Government Computer News*, vol. 10, No. 19, Sep. 16, 1991, p.28.

Carolyn Said, "DYCAM Model 1 The first portable Digital Still Camera", *MacWeek*, vol. 4, No. 35, Oct. 16, 1990, p. 34.

Jonathan Matzkin, "Instant Digital Photography", *PC Magazine*, vol. 10, No. 18, Oct. 29, 1991, p. 49.

David DeJean, "FotoMan Makes it a Snap to Work With Photos on Your PC", *PC–Computing*, vol. 4, No. 12, p. 80.

Dawn Smith, "Logitech Says it With Pictures", *Marketing Computers*, vol. 11, No. 12, p. 4.

Gerard et al., "The Worlds of Mac and Next", *Photo District News*, vol. 12, No. 4, pp.16–17.

*Primary Examiner*—Paul R. Lintz
*Attorney, Agent, or Firm*—Cushman Darby & Cushman, IP Group of Pillsbury Madison & Sutro LLP

[57] ABSTRACT

An image incident on an image sensor is photoelectrically converted to digital image data and stored on a storage device or medium in a hierarchical form as a file in a directory or subdirectory supported by a disk operating system. In this way, the system realizes an electronic imaging apparatus fully compatible with a personal computer.

43 Claims, 106 Drawing Sheets

U.S. PATENT DOCUMENTS

| | | | |
|---|---|---|---|
| 5,027,214 | 6/1991 | Fujimori | 348/233 |
| 5,032,918 | 7/1991 | Ota et al. | 348/232 |
| 5,032,927 | 7/1991 | Watanabe et al. | 386/101 |
| 5,034,804 | 7/1991 | Sasaki et al. | 348/232 |
| 5,040,072 | 8/1991 | Tsuji et al. | 348/351 |
| 5,041,911 | 8/1991 | Moorman | 348/364 |
| 5,051,838 | 9/1991 | Cho et al. | 358/401 |
| 5,060,069 | 10/1991 | Aoki | 348/229 |
| 5,065,246 | 11/1991 | Takemoto et al. | 348/354 |
| 5,067,029 | 11/1991 | Takahashi | 386/38 |
| 5,077,612 | 12/1991 | Megrgardt et al. | 348/231 |
| 5,093,731 | 3/1992 | Watanabe et al. | 386/118 |
| 5,111,283 | 5/1992 | Nagasawa et al. | 348/232 |
| 5,121,216 | 6/1992 | Chen et al. | 358/261.3 |
| 5,138,459 | 8/1992 | Roberts et al. | 358/209 |
| 5,231,501 | 7/1993 | Sakai | 348/231 |
| 5,249,053 | 9/1993 | Jain | 358/209 |
| 5,321,831 | 6/1994 | Hirose et al. | 395/600 |
| 5,339,423 | 8/1994 | Beitel et al. | 395/600 |
| 5,359,427 | 10/1994 | Sato | 358/335 |
| 5,363,504 | 11/1994 | Hasuo | 395/600 |
| 5,434,991 | 7/1995 | Maeda et al. | 395/425 |
| 5,576,757 | 11/1996 | Roberts et al. | 348/207 |

| BYTE0 | 0BH | 0CH | 16H | 18H | 1AH | 1CH  1FH |
|---|---|---|---|---|---|---|
| NAME | ATTRIBUTE | (RESERVATION) | TIME | DATE | START CLUSTER | FILE SIZE |

POINTER TO FAT

⇩

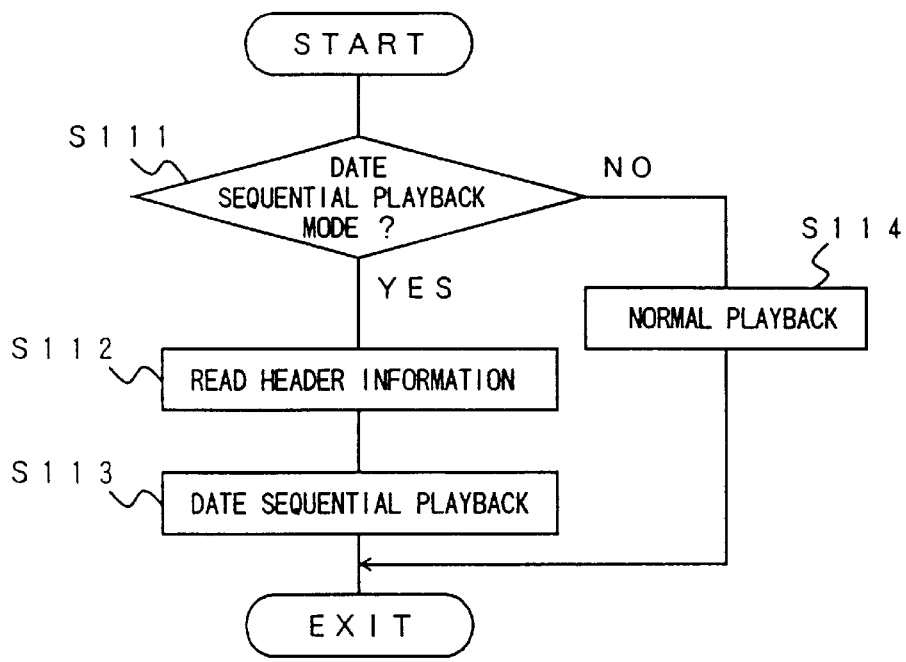

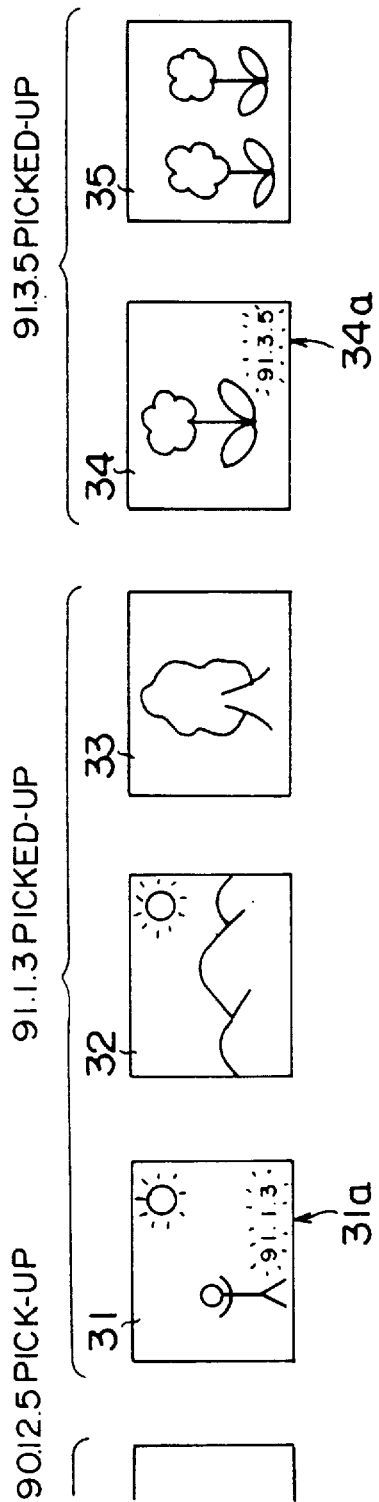

<ROOT DIRECTORY>

PLAYBACK ORDER

| 1 | FILE NAME I |
| 2 | FILE NAME II |
| 3 | FILE NAME III |
| 4 | FILE NAME IV |
| 5 | FILE NAME V |

FORMAT OF ROOT DIRECTORY

| NAME | ATTRIBUTE | (RESERVATION) | TIME | DATE | START CLUSTER | FILE SIZE |
|---|---|---|---|---|---|---|

ROOT DIRECTORY

DATA FILE REGION

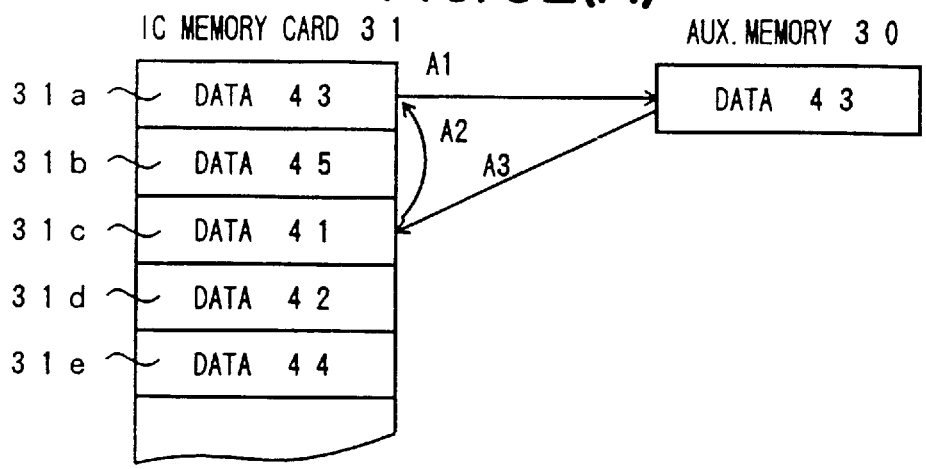
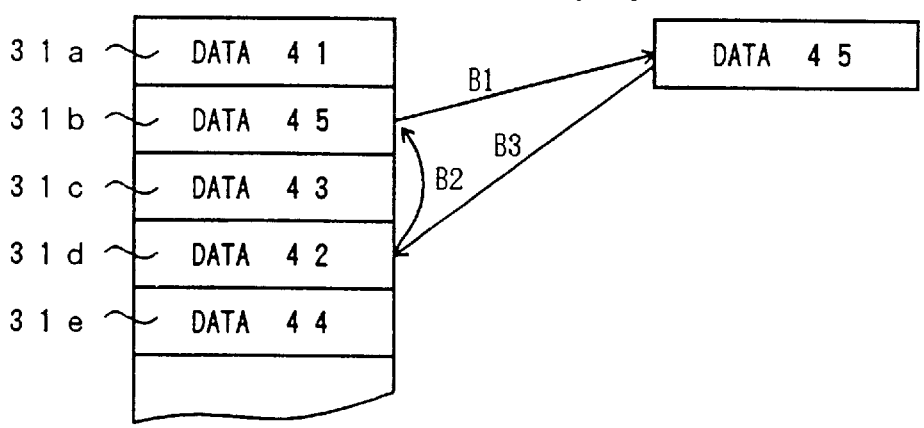
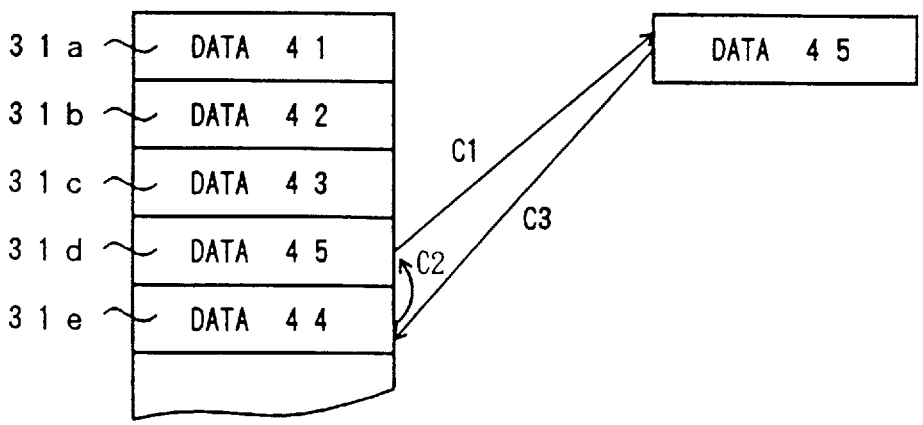

FIG. 48

DATA AREA

| | |
|---|---|
| 2 | 1ST FRAME |
| 3 | 1ST FRAME |
| 4 | 1ST FRAME |
| 5 | 2ND FRAME |
| 6 | 2ND FRAME |
| 7 | 2ND FRAME |
| 8 | NOT USED |
| ⋮ | ⋮ |

FIG. 49

| BYTE 0 | 0BH | 0CH | 16H | 18H | 1AH | 1CH 1FH |
|---|---|---|---|---|---|---|
| NAME | ATTRIBUTE | (RESERVATION) | TIME | DATE | 1ST CLUSTER | FILE SIZE |

↑ POINTER TO FAT

FIG. 50

| BIT | KINDS OF FILES |
|---|---|
| 0 | READ ONLY FILE |
| 1 | INVISIBLE FILE |
| 2 | SYSTEM FILE |
| 3 | VOLUME LABEL |
| 4 | SUBDIRECTORY |
| 5 | ARCHIVE FILE |
| 6<br>7 | } RESERVATION |

FIG. 62

```
START
 TABLE

#1→ROOT  IMAGE
       ┌1. DSC00001. J6I
   #2 │ 2. DSC00002. J6I
       │ 3. DSC00003. J6I
       └4. DSC00004. J6I
         END
#3→ROOT  SOUND
       ┌1. DSC00001. J6S
   #4 │ 2. DSC00002. J6S
       └3. DSC00003. J6S
         END
#5→ROOT  CONT.
  #6→  1. DSC00001. J6C
         END
  #7→ SUB01  IMAGE
       ┌1. DSCS0101. J6I
       │ 2. DSCS0102. J6I
   #8 │      {
       │
       └11. DSCS0111. J6I
         END
  #9→ SUB01  CONT.
         1. DSCS0101. J6C
     END

#10→  INFO.
         REC DRIVE1
           TIME=01
       ┌1. DSC00001. J6I
  #11 │ 2. DSC00002. J6I
       │ 3. DSC00003. J6I
       └4. DSC00004. J6I
         END
         {
```

FRAME No. TABLE
(DIFFERENT NOS. ARE ATTACHED TO IMAGE AND SOUND)

SUBDIRECTORY (No. 01)

SUCCESSIVE PICK-UP INFORMATION

FIG. 63

IMAGE+SOUND01

\#1 { DSC00001. J6I, DSC00001. J6S, CONT, OFF
    DSC00002. J6I, DSC00002. J6S, SING, ON

\#2 → DSC00003. J6I, DSC00002. J6S, DSC00003. J6S, SING, ON

END

PROGRAM01
      DSC00001. J6S
      TIME=05
      DSC00001. J6I
      DSC00002. J6I    } PROGRAM REPRODUCTION
      DSC00003. J6I
      DSC00002. J6S
      TIME=10
      DSC00004. J6I
      RETURN
   END
  END
END

FIG. 64

ROOT. IMAGE

1. DSC00001. J6I    1992. 01. 12    12:10

FIG. 65

DATE PLAY MODE

EVENT PLAY MODE

RELATIONAL PLAY MODE

*1. PICTURE & SOUND
 2. INTERVAL PLAY
 3. PROGRAM PLAY
 4. CONTINUOUS PLAY

FIG. 66

PICTURE
  1 DSC00001
  2 DSC00002
  3 DSC00003
  4 DSC00004

SOUND
  1 DSC00001
  2 DSC00002

EVENT1

FIG. 69

```
ROOT DIRECTORY
|—DSC00001.J6C      →CONTROL FILE FOR NORMAL STORING(ROOT DIRECTORY 1) #1
|—DSC00002.J6I      →IMAGE FILE NORMALLY STORED
|—DSC00003.J6I  } #2
|—DSC00004.J6I
|—DSC00001.J6S      →SOUND FILE NORMALLY STORED
|—DSC00002.J6S  } #3
|—DSC00003.J6S
|
|—SUB01 (SUBDIRECTORY 01)  →SUBDIRECTORY FOR CONTINUOUS HIGH SPEED STORAGE (SUBDIRECTORY) #4
|  |—DSCS0101.J6C    →CONTROL FILE FOR CONTINUOUS HIGH SPEED STORAGE
|  |—DSCS0101.J6I    →SUCCESSIVELY STORED IMAGE FILE
|  |—DSCS0102.J6I
|  |—DSCS0103.J6I                } #5
|  |—  —  —
|  |—DSCS0111.J6I
```

F I G. 7 0
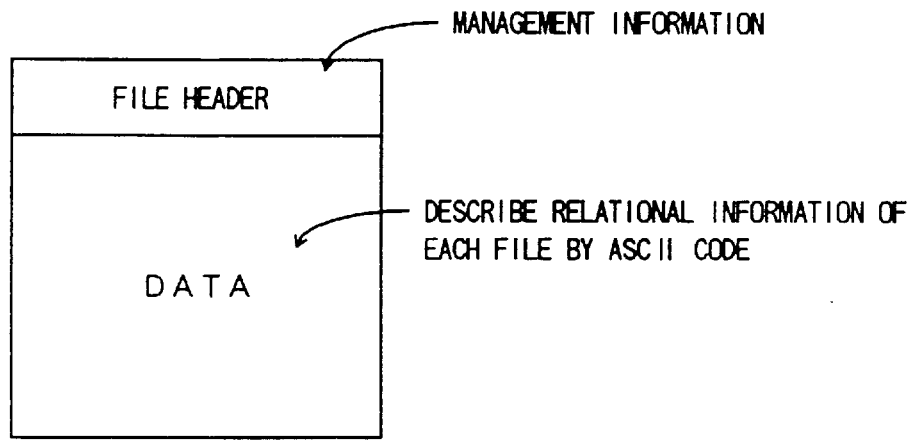
F I G. 7 1
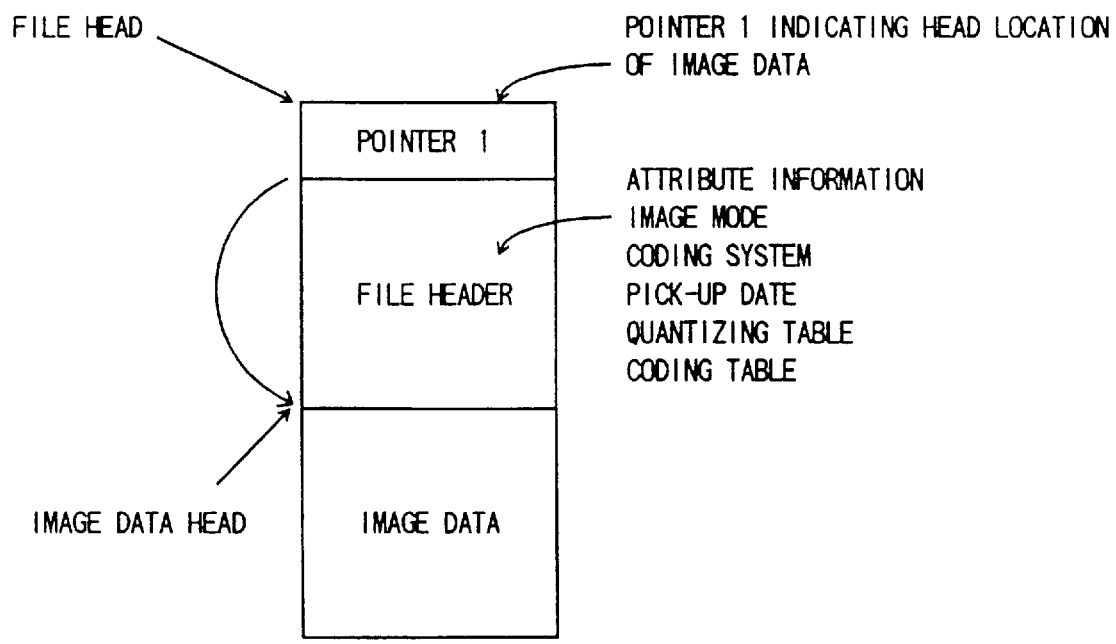

FIG. 73

```
START
   TABLE                            ←START OF FILE MANAGEMENT INFORMATION
      ROOT IMAGE
         1. DSCS0001.J6I   ←CONTINUOUSLY STORED IMAGE FILE
         2. DSCS0002.J6I
FRAME    3. DSCS0003.J6I   #1
No.      4. DSCS0004.J6I
         5. DSCS0005.J6I
      END
      ROOT SOUND
         1. DSCS0001.J6S   ←STORED SOUND FILE
         2. DSCS0002.J6S   #2
         3. DSCS0003.J6S
      END
      ROOT CONT.
         1. DSCS0001.J6C   ←STORED CONTROL FILE #3
      SUB01 IMAGE
         1. DSCS0101.J6I   ←STORED IMAGE FILE OF SUBDIRECTORY 01
         2. DSCS0102.J6I
         3. DSCS0103.J6I
         4. DSCS0104.J6I   #4
         5. DSCS0105.J6I
         6. DSCS0106.J6I
         7. DSCS0107.J6I
         8. DSCS0108.J6I
      END
   INFO.                            ←INFORMATION
      SUB01 REC DRIVE1              ←1 GROUP OF CONTINUOUS STORAGE #5
         TIME=01                    ←INTERVAL TIME(SEC) #6
         1. DSCS0101.J6I   ←CONTINUOUS FILE
         2. DSCS0102.J6I
         3. DSCS0103.J6I
         4. DSCS0104.J6I   #7
         5. DSCS0105.J6I
         6. DSCS0106.J6I
         7. DSCS0107.J6I
         8. DSCS0108.J6I
      END
   END
```

FIG. 74

```
START
  TABLE                    ←START OF FILE MANAGEMENT INFORMATION
    SUB01 IMAGE
      1. DSCS0101.J61    0400 ⎤ ←POINTERS OF IMAGE FILE AND IMAGE
      2. DSCS0102.J61    0400 ⎥    DATA OF SUBDIRECTORY 01
      3. DSCS0103.J61    0400 ⎥
      4. DSCS0104.J61    0400 ⎬ #1
      5. DSCS0105.J61    0400 ⎥
      6. DSCS0106.J61    0400 ⎥
      7. DSCS0107.J61    0400 ⎥
      8. DSCS0108.J61    0400 ⎦
    END
  INFO.                    ←INFORMATION #2
    SUB01 REC DRIVE1       ←1 GROUP OF CONTINUOUS STORAGE
                              (FILE IN SUBDIRECTORY 01) #3
      TIME=01              ←INTERVAL TIME(SEC) #4
        1. DSCS0101.J61    ←CONTINUOUSLY STORED FILE ⎤
        2. DSCS0102.J61                              ⎥
        3. DSCS0103.J61                              ⎥
        4. DSCS0104.J61                              ⎬ #5
        5. DSCS0105.J61                              ⎥
        6. DSCS0106.J61                              ⎥
        7. DSCS0107.J61                              ⎥
        8. DSCS0108.J61                              ⎦
      END
    END
  END
```

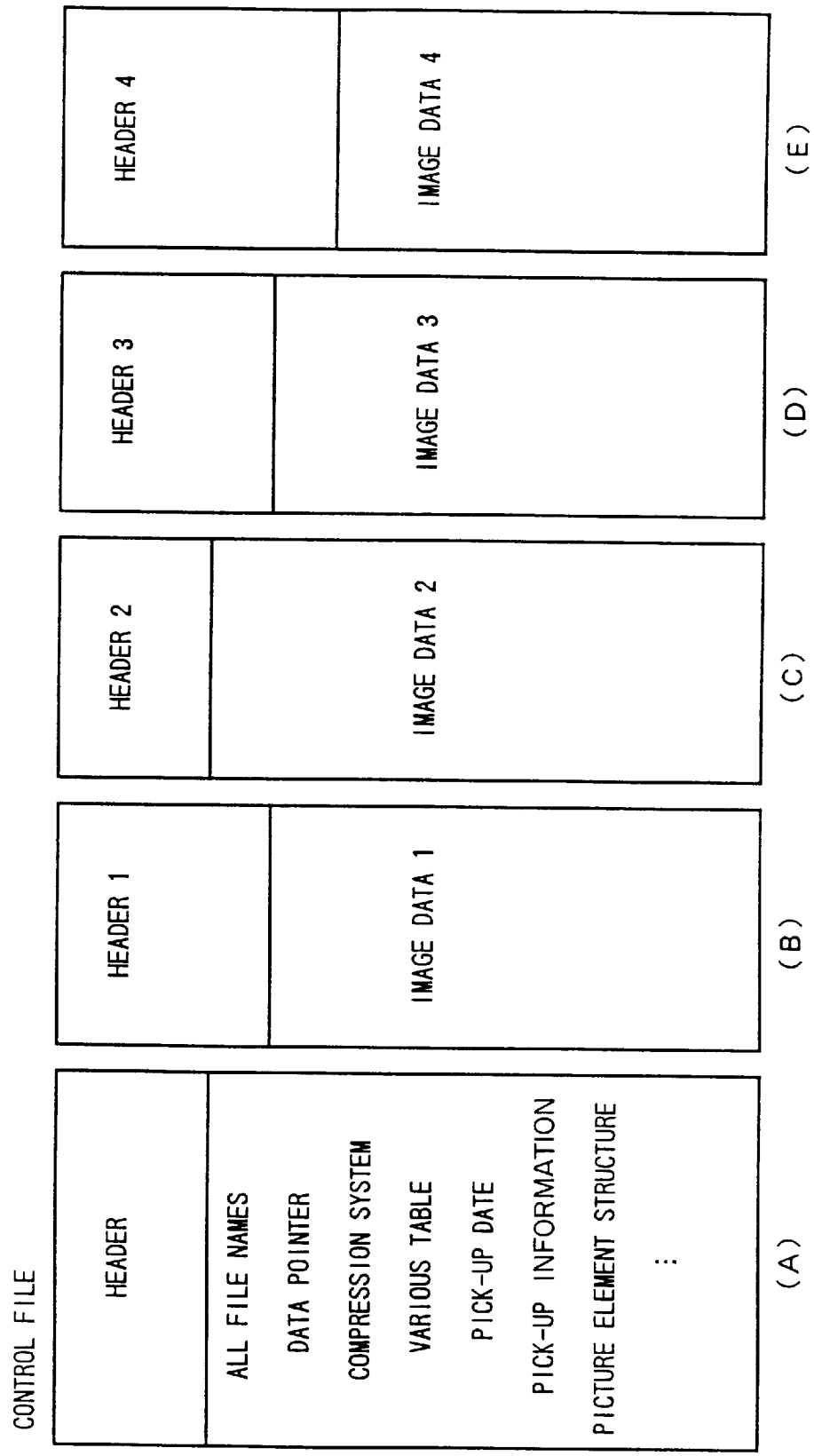

FIG. 86

| Layer 1 | ATTRIBUTE INFORMATION AREA LEVEL 1 | DEVICE KIND<br>DEVICE SPEED<br>DEVICE CAPACITY | NON VOLATILE MEMORY<br><br>JEIDA Ver. 4.1 |
|---|---|---|---|
| Layer 2 | ATTRIBUTE INFORMATION AREA LEVEL 2 | FIRST DATA ADDRESS<br>BLOCK LENGTH<br>INITIALIZATION DATE<br>MANUFACTURER INFORMATION | C<br><br>JEIDA Ver. 4.1 |
| | MEMORY MANAGEMENT AREA | <BOOT SECTOR><br>STANDARD Ver. No.<br>B P B | DOS I/F<br><br>Ver. 1.1 |
| | | <F A T> | |
| | | <DIRECTORY><br>FILE NAME, FILE ATTRIBUTE,<br>DATE, START CLUSTER,<br>FILE SIZE | |
| | IMAGE DATA FILE AREA | <HEADER INFORMATION><br>POINTER OF IMAGE DATA<br>STANDARD NAME Ver.<br>COMPRESSION SYSTEM<br>PIXEL ORGANIZATION<br>COMPRESSION/NON-<br>COMPRESSION FIELD/FRAME<br>PICK-UP DATE VARIOUS<br>VARIOUS TABLE INFORMATION | |
| | | <IMAGE DATA><br>S O I<br>⋮<br>S O F<br>⋮<br>S O S<br>⋮<br>E O I | Ex. JPEG<br>BASELINE |
| | CONTROL FILE | ATTRIBUTE INFORMATION<br>RELATIONAL INFORMATION<br>ADDITIONAL DATA(VARIOUS<br>TABLE INFORMATION) | A S C II CODE<br>BINARY DATA |

FIG. 87

| Address | Value | Description |
|---|---|---|
| 0000h | A0h | ← ID (POINTER) |
| | 03h | ← NUMBER OF BYTES TO NEXT ID |
| | 04h | ← START OF IMAGE DATA |
| | 00h | 0400h : 1KB |
| | A1h | ← ID (STANDARD) |
| | 09h | ← NUMBER OF BYTES TO NEXT ID |
| | 44h | ← "D" OF STANDARD |
| | 53h | ← "S" OF STANDARD |
| | 43h | ← "C" OF STANDARD |
| | ⋮ | (DSC V1.0) |
| | A2h | ← ID (PIXEL SIZE) |
| | 02h | ← NUMBER OF BYTES TO NEXT ID |
| | 02h | ← SIZE : 768 × 480 |
| | A3h | ← ID (SIGNAL FORMAT) |
| | 02h | ← NUMBER OF BYTES TO NEXT ID |
| | 02h | ← SIGNAL FORMAT : Y/C |
| | A4h | |
| | ⋮ | |
| 0400h | START OF IMAGE DATA | ←SOI |
| | IMAGE DATA | |
| | END OF IMAGE DATA | ←EOI |

(0000h to 0400h spans 1KB)

FIG. 88

```
ROOT DIRECTORY
|
|—DSC00001.J6C    ← CONTROL FILE FOR NORMAL STORAGE (ROOT DIRECTORY) #1
|—DSC00002.J61  ⎫
|—DSC00003.J61  ⎬ #2 ← NORMALLY STORED IMAGE FILE
|—DSC00004.J61  ⎭
|—DSC00001.J6S  ⎫
|—DSC00002.J6S  ⎬ #3 ← NOMALLY STORED SOUND FILE
|—DSC00003.J6S  ⎭
|
|—SUB01 (SUB DIRECTORY 01)  ← SUB DIRECTORY FOR CONTINUOUS HIGH SPEED STORAGE
    |
    |—DSCS0101.J61  ⎫
    |—DSCS0102.J61  ⎪
    |—DSCS0103.J61  ⎬ #4 ← CONTINUOUSLY STORED IMAGE FILE
    |     —         ⎪
    |     —         ⎪
    |—DSCS0111.J61  ⎭
```

FIG. 90

```
START
  INFO. TABLE #1
    DISP. REZO.
      1:640×480, 2:768×480, 3:1024×768
    SIGNAL TYPE
      1:RGB, 2:Y/C, 3:YMCB
    HUFFMAN TABLE
      1:STANDARD, 2:CUSTOM TABLE1, 3:CUSTOM TABLE2
    Q-TABLE TYPE
      1:STANDARD, 2:CUSTOM TABLE1, 3:CUSTOM TABLE2, 4:CUSTOM TABLE3
    SOUND SAMPLING CLOCK
      1:44KHz, 2:22KHz, 3:11KHz, 4:5.5KHz

END
  TABLE           ⇐START OF FILE MANAGEMENT INFORMATION
    ROOT IMAGE      #21    #22  #23  #24  #25 ┐ #2
      1. DSC00001.J6I  0400   2    2    1    1
      2. DSC00002.J6I  0800   2    1    2    2
      3. DSC00003.J6I  0400   2    2    1    1
      4. DSC00004.J6I  0800   3    1    3    3
      5. DSC00005.J6I  0400   2    2    1    1 ┘
    END
    ROOT SOUND      #31    #32                ┐ #3
      1. DSC00001.J6S  0200   3
      2. DSC00002.J6S  0200   3
      3. DSC00003.J6S  0200   3               ┘
    END
    ROOT SOUND                                  #4
      1. DSC00001.J6C
    END
    SUB01 IMAGE
      1. DSCS0101.J6I  0400   2    2    1    1 ┐ #5
      2. DSCS0102.J6I  0400   2    2    1    1
      3. DSCS0103.J6I  0400   2    2    1    1
      4. DSCS0104.J6I  0400   2    2    1    1
      5. DSCS0105.J6I  0400   2    2    1    1  ←768×480, Y/C, STANDARD TABLE
      6. DSCS0106.J6I  0400   2    2    1    1
      7. DSCS0107.J6I  0400   2    2    1    1
      8. DSCS0108.J6I  0400   2    2    1    1 ┘
    END
```

FIG. 91

```
INFO.
  SUB01 REC DRIVE        # 1
    TIME=01              # 2
      1. DSCS0101.J6I  ⎫
      2. DSCS0102.J6I  ⎪
      3. DSCS0103.J6I  ⎪
      4. DSCS0104.J6I  ⎬ # 3
      5. DSCS0105.J6I  ⎪
      6. DSCS0106.J6I  ⎪
      7. DSCS0107.J6I  ⎪
      8. DSCS0108.J6I  ⎭
    END
  END
  TABLE POINTER          # 4
    HUFFMAN TABLE1   ⎫
      POINTER:0400   ⎭ # 4 1
    HUFFMAN TABLE2   ⎫
      POINTER:0500   ⎭ # 4 2
    QUANT1.TABLE1    ⎫
      POINTER:0600   ⎭ # 4 3
    QUANT1.TABLE2    ⎫
      POINTER:0700   ⎭ # 4 4
    QUANT1.TABLE3    ⎫
      POINTER:0800   ⎭ # 4 5
  END
END
  DATA AREA                    ⎫
01,01,01,01,01,02 ········     ⎪
01,01, ···················     ⎪
                               ⎬ # 5
  ⋮                            ⎪
01,01,01, ················     ⎪
01,01, ···················     ⎭
  ⋮
END
```

FIG. 94

| | | | |
|---|---|---|---|
| 0 0 : | 8 0 h | ← | TUPLE ID OF SPECIFICATION TUPLE |
| 0 1 : | 1 0 h | ← | OFFSET TO NEXT TUPLE (16) |
| 0 2 : | 4 4 h | ← | ASCII "D" |
| 0 3 : | 5 3 h | ← | ASCII "S" |
| 0 4 : | 4 3 h | ← | ASCII "C" |
| 0 5 : | 2 0 h | ← | ASCII " " |
| 0 6 : | 5 6 h | ← | ASCII "V" |
| 0 7 : | 4 9 h | ← | ASCII "1" |
| 0 8 : | 4 4 h | ← | ASCII "D" |
| 0 9 : | 4 5 h | ← | ASCII "E" |
| 0 A : | 4 F h | ← | ASCII "O" |
| 0 B : | 3 1 h | ← | ASCII "1" |
| 0 C : | 2 0 h | ← | ASCII " " |
| 0 D : | 5 6 h | ← | ASCII "V" |
| 0 E : | 3 1 h | ← | ASCII "1" |
| 0 F : | 2 C h | ← | ASCII "." |
| 1 0 : | 3 0 h | ← | ASCII "0" |
| 1 1 : | 3 0 h | ← | ASCII "0" |

FIG. 95

| | | | |
|---|---|---|---|
| 0 0 : | 8 1 h | ← | TUPLE ID OF INFORMATION TUPLE |
| 0 1 : | 0 2 h | ← | OFFSET TO NEXT TUPLE (2) |
| 0 2 : | 0 0 h | ← | TOTAL NUMBER OF BYTES OF HEADER(LOW-ORDER BYTE) |
| 0 3 : | 0 2 h | ← | TOTAL NUMBER BYTES OF HEADER(HIGH-ORDER BYTE)(STANDARD:512B) |

FIG. 96

| | | | |
|---|---|---|---|
| 0 0 : | 8 2 h | ← TUPLE ID OF MAST TUPLE | |
| 0 1 : | E 8 h | ← OFFSET TO NEXT TUPLE (232) | |
| 0 2 : | 3 9 h | ← PICK-UP DATE YEAR | 9 |
| 0 3 : | 3 2 h | ← PICK-UP DATE YEAR | 2 |
| 0 4 : | 3 0 h | ← PICK-UP DATE MONTH | 0 |
| 0 5 : | 3 6 h | ← PICK-UP DATE MONTH | 6 |
| 0 6 : | 3 0 h | ← PICK-UP DATE DAY | 0 |
| 0 7 : | 3 1 h | ← PICK-UP DATE DAY | 1 |
| 0 8 : | 3 0 h | ← PICK-UP DATE HOUR | 0 |
| 0 9 : | 3 9 h | ← PICK-UP DATE HOUR | 9 |
| 0 A : | 3 0 h | ← PICK-UP DATE MINUTE | 0 |
| 0 B : | 3 0 h | ← PICK-UP DATE MINUTE | 0 |
| 0 C : | 3 0 h | ← PICK-UP DATE SEC. | 0 |
| 0 D : | 3 0 h | ← PICK-UP DATE SEC. | 0 |
| : | | | |
| 1 0 : | 8 0 h | ← FIELD/FRAME | |
| 1 1 : | 7 4 h | ← $\gamma$ CHARACTERISTIC | |
| 1 2 : | D 5 h | ← WHITE LEVEL | |
| 1 3 : | 0 0 h | ← BLACK LEVEL | |
| : | | | |
| 2 0 : | 8 1 h | ← CODING SYSTEM STANDARD | |
| 2 1 : | 0 0 h | ← COMPRESSION RATIO UNNECESSARY | |
| 2 2 : | 0 1 h | ← IMAGE MODE Y／Cb／Cr | |

FIG. 97

| | | |
|---|---|---|
| 0 0 : | 8 3 h | ← TUPLE ID OF COMMENT TUPLE |
| 0 1 : | F F h | ← OFFSET TO NEXT TUPLE ( F F h : END CODE) |
| 0 2 : | 4 1 h | ← COMMENT "A" |
| 0 3 : | 4 2 h | ← COMMENT "B" |
| : | | |
| 1 8 : | 0 0 h | ← TUPLE END CODE |

FIG. 98

| BITE No. | CONTENT |
|---|---|
| 0 0 | TUPLE ID TO MAST TUPLE (82) |
| 0 1 | OFFSET TO NEXT TUPLE (E8:232) |
| 0 2 | PICK-UP DATE (YEAR:DIGIT OF 10) |
| 0 3 | PICK-UP DATE (YEAR:DIGIT OF 1) |
| 0 4 | PICK-UP DATE (MONTH:10) |
| 0 5 | PICK-UP DATE (MONTH:1) |
| 0 6 | PICK-UP DATE (DAY:10) |
| 0 7 | PICK-UP DATE (DAY:1) |
| 0 8 | PICK-UP DATE (HOUR:10) |
| 0 9 | PICK-UP DATE (HOUR:1) |
| 0 A | PICK-UP DATE (MINUTE:10) |
| 0 B | PICK-UP DATE (MINUTE:1) |
| 0 C | PICK-UP DATE (SEC.:10) |
| 0 D | PICK-UP DATE (SEC.:1) |
| 0 E | RESERVATION |
| ... | ... |
| 1 0 | FIELD/FRAME |
| 1 1 | $\gamma$ CHARACTERISTIC |
| 1 2 | WHITE LEVEL |
| 1 3 | BLACK LEVEL |
| 1 4 | RESERVATION |
| ... | ... |
| 2 0 | CODING SYSTEM |
| 2 1 | COMPRESSION RATIO |
| 2 2 | IMAGE MODE |
| 2 3 | COMPONENT STORAGE ORDER |
| 2 4 | NUMBER OF FIRST COMPONENT VERTICAL PIXELS(LOW-ORDER BYTE) |
| 2 5 | NUMBER OF FIRST COMPONENT VERTICAL PIXELS(HIGH-ORDER BYTE) |
| 2 6 | NUMBER OF FIRST COMPONENT HORIZONTAL PIXELS(LOW-ORDER) |
| 2 7 | NUMBER OF FIRST COMPONENT HORIZONTAL PIXELS(HIGH-ORDER) |
| 2 8 | NUMBER OF SECOND COMPONENT VERTICAL PIXELS(LOW-ORDER) |
| 2 9 | NUMBER OF SECOND COMPONENT VERTICAL PIXELS(HIGH-ORDER) |
| 2 A | NUMBER OF SECOND COMPONENT HORIZONTAL PIXELS(LOW-ORDER) |
| 2 B | NUMBER OF SECOND COMPONENT HORIZONTAL PIXELS(HIGH-ORDER) |
| 2 C | NUMBER OF THIRD COMPONENT VERTICAL PIXELS(LOW-ORDER) |
| 2 D | NUMBER OF THIRD COMPONENT VERTICAL PIXELS(HIGH-ORDER) |
| 2 E | NUMBER OF THIRD COMPONENT HORIZONTAL PIXELS(LOW-ORDER) |
| 2 F | NUMBER OF THIRD COMPONENT HORIZONTAL PIXELS(HIGH-ORDER) |
| 3 0 | NUMBER OF FOURTH COMPONENT VERTICAL PIXELS(LOW-ORDER) |
| 3 1 | NUMBER OF FOURTH COMPONENT VERTICAL PIXELS(HIGH-ORDER) |
| 3 2 | NUMBER OF FOURTH COMPONENT HORIZONTAL PIXELS(LOW-ORDER) |
| 3 3 | NUMBER OF FOURTH COMPONENT HORIZONTAL PIXELS(HIGH-ORDER) |
| 3 4 | VERTICAL HORIZONTAL SIZE RATIO OF FIRST COMPONENT(LOW-ORDER BYTE) |
| 3 5 | VERTICAL HORIZONTAL SIZE RATIO OF FIRST COMPONENT(HIGH-ORDER) |
| 3 6 | VERTICAL HORIZONTAL SIZE RATIO OF SECOND COMPONENT(LOW-ORDER BYTE) |
| 3 7 | VERTICAL HORIZONTAL SIZE RATIO OF SECOND COMPONENT(HIGH-ORDER) |
| 3 8 | VERTICAL HORIZONTAL SIZE RATIO OF THIRD COMPONENT(LOW-ORDER BYTE) |
| 3 9 | VERTICAL HORIZONTAL SIZE RATIO OF THIRD COMPONENT(HIGH-ORDER) |
| 3 A | VERTICAL HORIZONTAL SIZE RATIO OF FOURTH COMPONENT(LOW-ORDER BYTE) |
| 3 B | VERTICAL HORIZONTAL SIZE RATIO OF FOURTH COMPONENT(HIGH-ORDER) |
| 3 C | RESERVATION |
| ... | ... |
| F E | RESERVATION |

FIG. 99

| BYTE No. | CONTENT |
|---|---|
| 0 0 | ID OF COMMENT TUPLE (83h) |
| 0 1 | OFFSET TO NEXT TUPLE (F F h : END CODE) |
| 0 2 | COMMENT |
| 0 3 | : |
| : | : |
| | TUPLE END CODE (00h) |

FIG. 100

| | |
|---|---|
| IMAGE MODE | Y／Cb／Cr |
| WHITE LEVEL | 2 1 3 |
| BLACK LEVEL | 0 |
| COMPONENT STORAGE ORDER | Y→Cb→Cr |
| NUMBER OF FIRST COMPONENT HORIZONTAL PIXELS | 7 6 8 |
| NUMBER OF FIRST COMPONENT VERTICAL PIXELS | 4 8 0 OR 2 4 0 |
| NUMBER OF SECOND AND THIRD COMPONENT HORIZONTAL PIXELS | 3 8 4 |
| NUMBER OF SECOND AND THIRD VERTICAL HORIZONTAL PIXELS | 4 8 0 OR 2 4 0 |
| VERTICAL AND HORIZONTAL SIZE RATIO OF FIRST COMPONENT | 3 4 1 3 ÷ 4 0 9 6 |
| VERTICAL AND HORIZONTAL SIZE RATIO OF SECOND AND THIRD COMPONENTS | 6 8 2 6 ÷ 4 0 9 6 |

FIG. 101

MINIMUM UNIT

| Y0 | Y1 | Y2 | Y3 | Y4 | Y5 | Y6 | Y7 | Y8 | Y9 | |
|---|---|---|---|---|---|---|---|---|---|---|

| Cb0 | Cb1 | Cb2 | Cb3 | Cb4 | |
|---|---|---|---|---|---|

| Cr0 | Cr1 | Cr2 | Cr3 | Cr4 | |
|---|---|---|---|---|---|

FIG. 102

SOI marker
  table/misc. (APPn. COM. DQT. DHT. DRI)
  SOF0marker・frame header
  table/misc. (APPn. COM. DQT. DHT. DRI)
  SOSmarker・scan header
    entropy-coded segment0
    (RSTn marker)
    entropy-coded segment1
    (RSTn marker)
    entropy-coded segment2
    ...
    entropy-coded segmentlast
    (DNLmarker)
EOI marker

FIG. 103

| MCU0 | Y0, Y1, Cb0, Cr0 |
| MCU1 | Y2, Y3, Cb1, Cr1 |
| MCU2 | Y4, Y5, Cb2, Cr2 |
| MCU3 | Y6, Y7, Cb3, Cr3 |
| ... | ... |

FIG. 104

| | |
|---|---|
| F F | S O F 0 (H) |
| C 0 | S O F 0 (L) |
| 0 0 | L f (H) |
| 1 1 | L f (L) |
| 0 8 | P |
| 0 1 (0 0 : field mode) | Y (H) |
| E 0 (F 0 : field mode) | Y (L) |
| 0 3 | X (H) |
| 0 0 | X (L) |
| 0 3 | N f |
| 5 9 | C 1 |
| 2 1 | H 1, V 1 |
| 0 0 | T q 1 |
| 4 2 | C 2 |
| 1 1 | H 2, V 2 |
| 0 1 | T q 2 |
| 5 2 | C 3 |
| 1 1 | H 3, V 3 |
| 0 1 {0 2} | T q 3 |

FIG. 105

| | |
|---|---|
| F F | S O S (H) |
| D A | S O S (L) |
| 0 0 | L s (H) |
| 0 C | L s (L) |
| 0 3 | N s |
| 5 9 | C s 1 |
| 0 0 | T d 1, T a 1 |
| 4 2 | C s 2 |
| 1 1 | T d 2, T a 2 |
| 5 2 | C s 3 |
| 1 1 | T d 3, T a 3 |
| 0 0 | S s |
| 3 F | S e |
| 0 0 | A h, A l |

| | |
|---|---|
| F F | D Q T (H) |
| D B | D Q T (L) |
| 0 0 | L q (H) |
| 8 4, | L q (L) |
| 0 0 | P q . T q |
| q q | Q 0 |
| ... | |
| q q | Q 6 3 |
| 0 1 | P q . T q |
| q q | Q 0 |
| ... | |
| q q | Q 6 3 |

FIG. 109

| | | |
|---|---|---|
| 0 0 : 8 0 h | ← | TUPLE ID OF SPECIFICATION TUPLE |
| 0 1 : 1 0 h | ← | OFFSET TO NEXT TUPLE (16) |
| 0 2 : 4 4 h | ← | ASCII "D" |
| 0 3 : 5 3 h | ← | ASCII "S" |
| 0 4 : 4 3 h | ← | ASCII "C" |
| 0 5 : 2 0 h | ← | ASCII " " |
| 0 6 : 5 3 h | ← | ASCII "S" |
| 0 7 : 4 F h | ← | ASCII "O" |
| 0 8 : 5 5 h | ← | ASCII "U" |
| 0 9 : 4 E h | ← | ASCII "N" |
| 0 A : 4 4 h | ← | ASCII "D" |
| 0 B : 3 1 h | ← | ASCII "1" |
| 0 C : 2 0 h | ← | ASCII " " |
| 0 D : 5 6 h | ← | ASCII "V" |
| 0 E : 3 1 h | ← | ASCII "1" |
| 0 F : 2 C h | ← | ASCII "." |
| 1 0 : 3 0 h | ← | ASCII "0" |
| 1 1 : 3 0 h | ← | ASCII "0" |

FIG. 110

| | | |
|---|---|---|
| 0 0 : 8 0 h | ← | TUPLE ID OF INFORMATION TUPLE |
| 0 1 : 0 2 h | ← | OFFSET TO NEXT TUPLE (2) |
| 0 2 : 0 0 h | ← | TOTAL BYTE NUMBER OF HEADERS(HIGH-ORDER BYTE) |
| 0 3 : 0 2 h | ← | TOTAL BYTE NUMBER OF HEADERS(HIGH-ORDER BYTE)(STANDARD:512B) |

FIG. 111

```
00 : 82 h   ← TUPLE ID OF MAST TUPLE
01 : E8 h   ← OFFSET TO NEXT TUPLE (232)
02 : 39 h   ← PICK-UP DATE YEAR    9
03 : 32 h   ← PICK-UP DATE YEAR    2
04 : 30 h   ← PICK-UP DATE MONTH   0
05 : 36 h   ← PICK-UP DATE MONTH   6
06 : 30 h   ← PICK-UP DATE DAY     0
07 : 31 h   ← PICK-UP DATE DAY     1
08 : 30 h   ← PICK-UP DATE HOUR    0
09 : 39 h   ← PICK-UP DATE HOUR    9
0A : 30 h   ← PICK-UP DATE MINUTE  0
0B : 30 h   ← PICK-UP DATE MINUTE  0
0C : 30 h   ← PICK-UP DATE SEC.    0
0D : 30 h   ← PICK-UP DATE SEC.    0
   :
   :
20 : 81 h   ← CODING SYSTEM
21 : 00 h   ← NUMBER OF BITS/SAMPLE
22 : 01 h   ← SOUND MODE
23 : 00 h   ← SAMPLING FREQUENCY
24   00 h   ← RECORDING TIME (HOUR)
25 : 00 h   ← RECORDING TIME (MINUTE)
26 : 10 h   ← RECORDING TIME (SEC)
27 : 00 h   ← COMPONENT STORAGE ORDER
   :
```

FIG. 112

```
00 : 83 h   ← TUPLE ID OF COMMENT TUPLE
01 : FF h   ← OFFSET TO NEXT TUPLE ( F F h : END CODE)
02 : 41 h   ← COMMENT  "A"
03 : 42 h   ← COMMENT  "B"
   :
18 : 00 h   ← TUPLE END CODE
```

FIG. 113

| BYTE No. | CONTENT |
|---|---|
| 0 0 | TUPLE ID TO MAST TUPLE (82h) |
| 0 1 | OFFSET TO NEXT TUPLE (E8h:232) |
| 0 2 | PICK-UP DATE (YEAR:DIGIT OF 10) |
| 0 3 | PICK-UP DATE (YEAR:DIGIT OF 1) |
| 0 4 | PICK-UP DATE (MONTH:10) |
| 0 5 | PICK-UP DATE (MONTH:1) |
| 0 6 | PICK-UP DATE (DAY:10) |
| 0 7 | PICK-UP DATE (DAY:1) |
| 0 8 | PICK-UP DATE (HOUR:10) |
| 0 9 | PICK-UP DATE (HOUR:1) |
| 0 A | PICK-UP DATE (MINUTE:10) |
| 0 B | PICK-UP DATE (MINUTE:1) |
| 0 C | PICK-UP DATE (SEC.:10) |
| 0 D | PICK-UP DATE (SEC.:1) |
| 0 E | RESERVATION |
| ... | ... |
| 2 0 | CODING SYSTEM |
| 2 1 | NUMBER OF BITS/SAMPLE |
| 2 2 | SOUND MODE |
| 2 3 | SAMPLING FREQUENCY |
| 2 4 | RECORDING TIME (HOUR) |
| 2 5 | RECORDING TIME (MINUTE) |
| 2 6 | RECORDING TIME (SEC.) |
| 2 7 | COMPONENT STORAGE ORDER |
| 2 8 | RESERVATION |
| ... | ... |
| F E | RESERVATION |

FIG. 114

| | |
|---|---|
| CODING SYSTEM | ADPCM (CCITT/G.726) |
| COMPRESSION RATIO | 32 kbit/s |
| NUMBER OF BITS/SAMPLE | 8 bit |
| SOUND MODE | MONO. |
| SAMPLING FREQUENCY | 8 kHz |
| RECORDING TIME | 10 s |
| COMPONENT STORAGE ORDER | LEFT (MONO.) |

FIG. 115

MONO.

(A) | S 0 | S 1 | S 2 | S 3 | S 4 | S 5 | S 6 | S 7 | ... ...

STEREO (B) | SL 0 | SR 0 | SL 1 | SR 1 | SL 2 | SR 2 | SL 3 | SR 3 | ... ...

FIG. 116

MONO.

(A) | S 0 | S 1 | S 2 | S 3 | S 4 | S 5 | S 6 | S 7 | ... ...

STEREO (B) | SL 0 | SR 0 | SL 1 | SR 1 | SL 2 | SR 2 | SL 3 | SR 3 | ... ...

FIG. 117

MONO.
LSB    MSB (A) | S 0 | S 1 | S 2 | S 3 | S 4 | S 5 | S 6 | S 7 | ... ...
    4bit  4bit  4bit  4bit  4bit  4bit  4bit  4bit  ... ...
    |≪ 8bit ≫|≪ 8bit ≫|≪ 8bit ≫|≪ 8bit ≫| ... ...

STEREO
LSB    MSB (B) | SL 0 | SR 0 | SL 1 | SR 1 | SL 2 | SR 2 | SL 3 | SR 3 | ... ...
    4bit  4bit  4bit  4bit  4bit  4bit  4bit  4bit  ... ...
    |≪ 8bit ≫|≪ 8bit ≫|≪ 8bit ≫|≪ 8bit ≫| ... ...

FIG. 120

```
0 0 : 8 0 h  ← TUPLE ID OF SPECIFICATION TUPLE
0 1 : 1 1 h  ← OFFSET TO NEXT TUPLE  (16)
0 2 : 4 4 h  ← ASCII "D"
0 3 : 5 3 h  ← ASCII "S"
0 4 : 4 3 h  ← ASCII "C"
0 5 : 2 0 h  ← ASCII " "
0 6 : 4 3 h  ← ASCII "C"
0 7 : 4 F h  ← ASCII "O"
0 8 : 4 E h  ← ASCII "N"
0 9 : 5 4 h  ← ASCII "T"
0 A : 5 2 h  ← ASCII "R"
0 B : 4 F h  ← ASCII "O"
0 C : 4 C h  ← ASCII "L"
0 D : 2 0 h  ← ASCII " "
0 E : 5 6 h  ← ASCII "V"
0 F : 3 1 h  ← ASCII "1"
1 0 : 2 C h  ← ASCII "."
1 1 : 3 0 h  ← ASCII "0"
1 2 : 3 0 h  ← ASCII "0"
```

FIG. 121

```
0 0 : 8 1 h  ← TUPLE ID OF INFORMATION TUPLE
0 1 : 0 2 h  ← OFFSET TO NEXT TUPLE  (2)
0 2 : 0 0 h  ← TOTAL NUMBER OF BYTES OF HEADER (HIGH-ORDER BYTE)
0 3 : 0 2 h  ← TOTAL NUMBER OF BYTES OF HEADER (HIGH-ORDER BYTE)
```

FIG. 122

| | |
|---|---|
| INFO. | ← START OF FILE MANAGEMENT INFORMATION |
|   PROGRAM1 | ← PROGRAM 1 REPRODUCTION INFORMATION |
|     TIME=5 | ← INTERVAL REPRODUCTION TIME (SEC) |
|       1. DSC00001.J6I, DSC00001.J6S | ← SIMULTANEOUS REPRODUCTION OF STORED IMAGE |
|       2. DSC00002.J6I, DSC00002.J6S |    AND SOUND FILE |
|       3. DSC00003.J6I, DSC00003.J6S | |
|       4. DSC00004.J6I, DSC00003.J6S | |
|       5. DSC00005.J6I, DSC00003.J6S | |
|       6. DSC00006.J6I, DSC00003.J6S | |
|       7. DSC00007.J6I, DSC00003.J6S | |
|       8. DSC00008.J6I | |
|   END | |
|   DRIVE1 | ← CONTINUOUS RECORD 1 |
|     TIME=1 | ← INTERVAL RECORD TIME (SEC) |
|       1. DSC00011.J6I | ← CONTINUOUSLY RECORDED IMAGE |
|       2. DSC00012.J6I | |
|       3. DSC00013.J6I | |
|       4. DSC00014.J6I | |
|       5. DSC00015.J6I | |
|       6. DSC00016.J6I | |
|       7. DSC00017.J6I | |
|   END | |
|   DRIVE2 | ← CONTINUOUS RECORD 1 |
|     TIME=5 | ← INTERVAL RECORD TIME (SEC) |
|       1. ¥SUB1¥DSC00021.J6I | ← CONTINUOUSLY RECORDED IMAGE FILE |
|       2. ¥SUB1¥DSC00022.J6I |    (SUB DIRECTORY : FILE IN SUB 1) |
|       3. ¥SUB1¥DSC00023.J6I | |
|       4. ¥SUB1¥DSC00024.J6I | |
|       5. ¥SUB1¥DSC00025.J6I | |
|       6. ¥SUB1¥DSC00026.J6I | |
|       7. ¥SUB1¥DSC00027.J6I | |
|   END | |
| END | |

FIG. 123

REC. MODE

1:NORMAL, 2:CONTINUOUS, 3:M.EXP-4:MONO

NOMAL : NORMAL RECORD (SINGLE PICK-UP)
CONTINUOUS : CONTINUOUS RECORD
M.EXP : MULTI EXPOSURE
MONO : MONOCHRO IMAGE RECORD

FIG. 124

TABLE ADDED FLAG
ROOT IMAGE ↓
1. DSC00001.J61  0400   2  2  1  1  (2-01-01)
   FIRST OF GROUP 01 OF CONTINUOUS RECORD
2. DSC00002.J61  0400   2  1  2  2  (2,3-01-01)
   FIRST OF GROUP 01 OF MULTI EXPOSURE CONTINUOUS RECORD
3. DSC00001.J61  0400   2  2  1  1  (3,4-01-01)
   FIRST OF GROUP 01 OF MULTI EXPOSURE MONOCHRO RECORD

FIG. 125

FILE NAME

☐☐☐ ☐☐ ☐ ☐☐. J61
KIND  GROUP   SER. NO.

(A)
| KIND | NORMAL REC | : NOM |
| | CONTINUOUS REC | : CON |
| | MULTI EXPOSURE | : MEX |
| | MONOCHRO IMAGE | : MON |
| | MULTI CONTINUOUS PICK-UP RECORD | : MEC |
| | MONOCHRO CONTINUOUS PICK-UP | : MOC |

(B)  CON01_01.J61  FIRST IMAGE DATA OF FIRST CONTINUOUS PICK-UP RECORD

MEX02_04.J61  FOURTH IMAGE DATA OF SECOND MULTI EXPOSURE

FIG. 126

MODE :  ←START OF RECORD MODE
CON     CONTINUOUS PICK-UP RECORD ⎫
NOM     NORMAL RECORD              ⎬ IF NECESSARY, RECORD
MEX     MULTI EXPOSURES            ⎭
01 —    GROUP NO.
01      SER. NO.

FIG. 128

(A)
REC. MODE
1:NORMAL, 2:CONTINUOUS, 3:M.EXP, 4:MONO, 5:V.REALITY
↑
FLAG FOR VR (B)
TABLE
ROOT IMAGE
ADDED FLAG
↓
1. DSC00001.J61  0400   2  2  1  1  (5-30, 45, 10)

$$\begin{cases} \theta = 30 \\ \psi = 45 \\ \omega = 10 \end{cases}$$

FIG. 129

<FILE HEADER DESCRIPTION>

MODE: ←START OF RECORD MODE INFORMATION
- CON  CONTINUOUS PICK-UP RECORD
- NOM  NORMAL RECORD
- MEX  MULTI EXPOSURES
- V.R ($\theta$, $\psi$, $\omega$)  IMAGE FOR VR

} IF NECESSARY, RECORD

01 –   GROUP NO.
01     SER. NO.

FIG. 130

| | |
|---|---|
| NORMAL | ORIGINAL IMAGE |
| MULTI | ORIGINAL IMAGE |
| MANU | ORIGINAL IMAGE |
| COPY | ORIGINAL IMAGE |
| COMPOSITION | ORIGINAL IMAGE |
| TRANSMIT | ORIGINAL IMAGE |

FIG. 131

| | | |
|---|---|---|
| PLO: | ←START OF PROCESS INFORMATION | |
| NOM | NORMAL RECORD | ⎫ |
| MLT | MULTI SCENE | ⎪ |
| MANU | MENU SCENE | ⎬ IF NECESSARY, RECORD |
| COPY | COPY IMAGE | ⎪ |
| COMP | SYNTHESIZED IMAGE | ⎪ |
| TRAN | TRANSMITTED IMAGE | ⎭ |
| 01 – | GROUP NO. | |
| 01 | SER. NO. | |

FIG. 132

(A)
COMPLEMENT. Y          ← Y-INTERPOLATED INFORMATION
 1:NORMAL, 2:EVEN, 3:ODD

COMPLEMENT. C          ← C-INTERPOLATED INFORMATION
 1:NORMAL, 2:EVEN, 3:ODD (B)
NORMAL   NO INTERPOLATION
EVEN     INTERPOLATION FOR EVEN FIELDS
ODD      INTERPOLATION FOR ODD FIELDS (C)
TABLE                                            ADDED FLAG
ROOT IMAGE                                           ↓   ↓
1, DSC00001.J61  0400    2    2    1    1    2    2
                     ← INTERPOLATED FOR Y AND C
                       EVEN FIELDS

FIG. 133

COM. Y:   ← START OF Y-INTERPOLATION INFORMATION

NOM       ORIGINAL IMAGE

EVEN  ⎫                          IF NECCESSARY, RECORD
      ⎬ FIELD INTERPOLATION
ODD   ⎭

COM. C:   ← START OF C-INTERPOLATION INFORMATION

NOM       ORIGINAL IMAGE

EVEN                             IF NECCESSARY, RECORD
        FIELD INTERPOLATION
ODD

| ROOT DIRECTORY | FRAME No. |
|---|---|
| ENTRY 0 | 1 |
| ENTRY 1 | 2 |
| ENTRY 2 | 3 |
| ENTRY 3 | 4 |
| ENTRY 4 | 5 |

FIG. 143

| 0 | 0BH | 0CH | 16H | 18H | 1AH | 1CH  1FH |
|---|---|---|---|---|---|---|
| FILE NAME | ATTRIB-UTE | RESERV-ATION | TIME | DATE | START CLUSTER | FILE SIZE |

FIG. 144

```
D  S  C  1  2  3  4  5  .  J  6  1
└──┘  └──────┘  └──┘     └──┘
FIXED  CALCULATED  SER. NO.
       DATE AND TIME
```

FIG. 145

```
FOR  92. 09. 26    13 : 19

9       1 0 0 1
        2        0 0 1 0
        0         0 0 0 0
        9          1 0 0 1
        2           0 0 1 0
        6            0 1 1 0
        1             0 0 0 1
        3              0 0 1 1
        1               0 0 0 1
        9                1 0 0 1
                ─────────────────────
                1 0 0 1 0 0 1 1 0 1 1 1 1
                └──┘ └───┘ └───┘ └┘
                  9    3     7   └─ NOT USED
```

| DSC 93701 . J61 |
|---|
| DSC 93702 . J61 |
| ⋮ |

ENTRY 0
1
2
3 DSC93702. J61
4

A — DSC93701. J61
B — DSC93703. J61    DSC93702.J61 IS DOUBLED
C — DSC93702. J61

FRAME NUMBER SECTION

FIG. 152

```
1  2  3  4  5  6  7  8   J61
|_____| |____|
 MANUAL SET           SER NO.
 PORTION
```

MANUAL SET SW

DISPLAY OF SER NO. AND FIXED PATTERN

RETURN NORMAL DISPLAY

FIG. 154
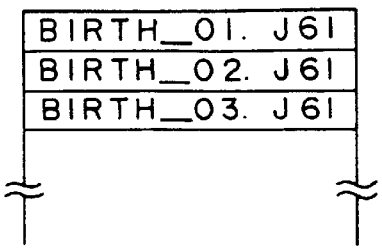
FIG. 155(A)
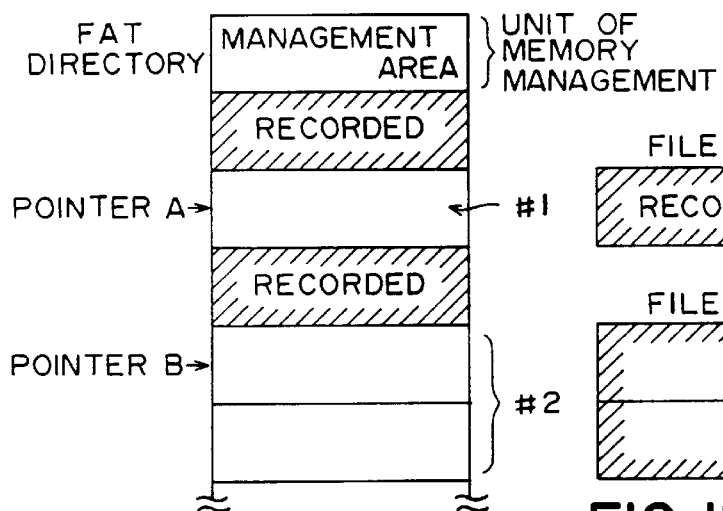
FIG. 155(B)
FIG. 155(C)
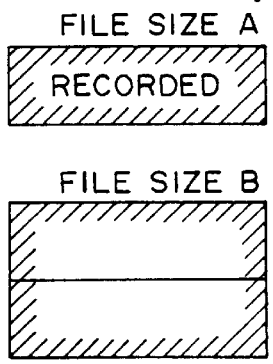
FIG. 156
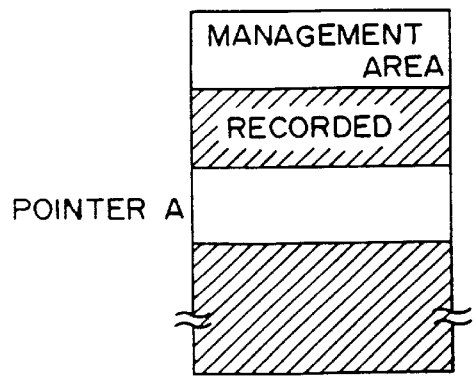

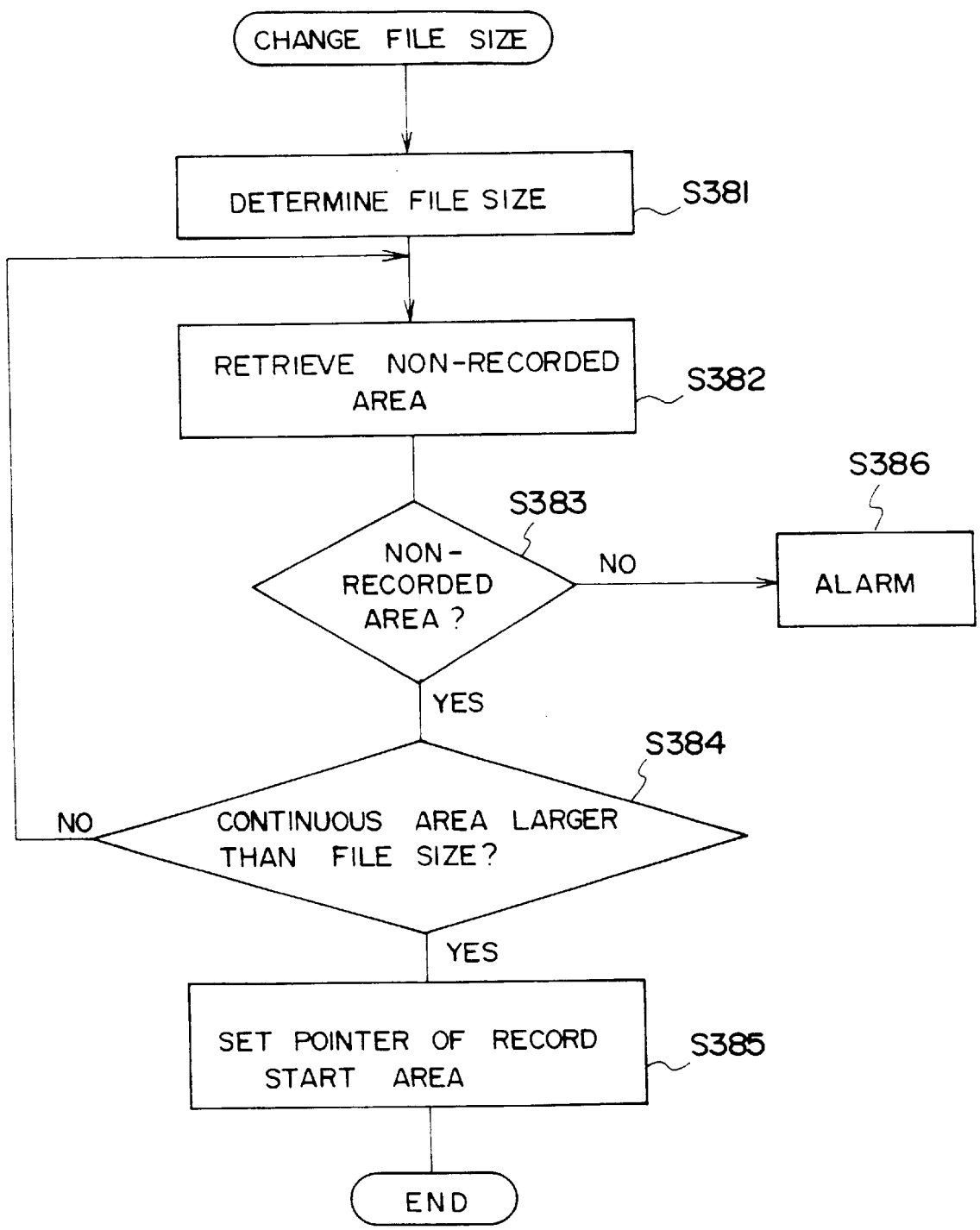
F I G. 157

ELECTRONIC IMAGING APPARATUS HAVING HIERARCHICAL IMAGE DATA STORAGE STRUCTURE FOR COMPUTER-COMPATIBLE IMAGE DATA MANAGEMENT

BACKGROUND OF THE INVENTION

The present invention relates to an electronic imaging apparatus and, more particularly, to an electronic imaging apparatus which is compatible with personal computers and the like.

In recent years, an image information storing or recording and/or retrieving or reproducing apparatus such as an electronic still camera or an electronic image data filing apparatus for storing or retrieving image data on or from an applied storage device or medium has been developed. Electronic still cameras of a conventional type generally employ solid state electronic imaging devices such as CCD imagers for photoelectric conversion to obtain a picture signal corresponding to objects intended to be picked-up or photographed. The picture signal issued from the imaging device is processed by a conventional circuit for processing to obtain a video or TV signal able to be recorded or stored, and the processed signal is converted into a digital form representative of the image information intended to be stored. In the above-mentioned cameras, the image information is represented and conveyed in the form of digital data, and the data is stored on a semiconductor memory card.

Electronic imaging systems such as various electronic still cameras (called "SMCs" hereinafter) are available as commercial products for various applications. Following the above-mentioned trend, an electronic still camera whose image data output format may be made compatible with either the IBM PC and compatible device, or the Apple Macintosh have been proposed. Such a device is disclosed, for example, in U.S. Pat. No. 5,138,459 to Roberts et al. However, such systems still fail to provide facilities for image data retrieval. In such SMCs, a great number of still pictures or image data are stored on recorded in the form of data files in the storage media (i.e., memory cards or floppy disks). Therefore, the image data retrieval capabilities determine the commercial value or utility value of the SMC.

Meanwhile, the personal computer DOS (Disk Operating System) currently popular in various fields usually makes use of hierarchical directories, i.e., directories in a hierarchical organization for managing data files to meet a demand for quick retrieval or selection of many databases or programs. In a method of managing data files with hierarchical directories, the location of the file data recording area in the memory and the name of each data file are registered in a register or commonly-named directory. These files are classified as desired into a tree-like hierarchy with hierarchical directories according to their kind or content, and the desired data files are retrieved by designating the corresponding directory names and file names.

When it is desired to observe the status of data file classification with hierarchical directories, a hierarchical directory tree is displayed on a monitor, whereby the operator of the personal computer can know the location of data file registration. FIG. 20 shows an example of the tree display. Mark "¥" designates a root directory which branches into three subdirectories named "DOS", "BAT" and "USR". The subdirectory "USR" branches into low-order level subdirectories "C" and "PASCAL". The operator can easily confirm an intended data file designate by operating a keyboard while observing the directory tree display. Such method of file designation and selection is very useful, particularly in the case of a file structure which has many complicated branches.

In the above personal computer file system, individual stored files are not identical. Therefore, for economic utilization of the memory areas the file data are recorded successively by searching the memory areas, usually clusters as unit memory areas, that are vacant or empty. Information of the succession of the storage areas allocated to the file is stored and it reproduced or output as a file. Information indicative of the succession of the file storage areas is referred to as a FAT (File Allocation Table).

With the conventional SMC, the image data are picked-up for each theme such as a sports meeting, a picnic or a trip and are merely stored successively in the storage areas of the medium. Therefore, when the picked-up picture is to be reproduced, the pertinent theme or date data has to be selected from a large number of picture information records. Searching data solely by a button operation is inefficient. Further inconvenience is encountered in the case of the storage media, in which the stored data can be deleted or the superimposition stored image data are present.

If the above hierarchical directories and tree display method are used for the management and display of the image data stored in the SMC, it will be suitable for managing image data of a large number of still pictures. In addition, this will extend the scope of utility of the SMC itself.

However, the SMC should have a compact shape in view of its portability and therefore cannot provide a monitor section wide enough to display the tree structure. Further, it is impossible to provide a keyboard with enough switches for the tree display operation. For these reasons, the selection of pictures to be reproduced has relied on the conventional solely button operation.

In the electronic imaging apparatuses which are applied to personal computers and the like and have no large size monitor section or keyboard section, there is a demand for being able to display the file structure, such as the tree structure and directory, of the stored image data by making use of the hierarchical organization in a limited size display section and with a method utilizing the merits of the tree display, thus permitting efficient and quick selection of the reproduced pictures of the image data required for the electronic image pick-up apparatus.

Meanwhile, in the past the magnetic disk was the sole storage medium, but different kinds of storage media such as IC memory card and optical magnetic disk have been developed. With these increases in the kinds of storage media the quantity of the data that can be stored in a single storage medium is being increased remarkably. Thus, increasing importance is being attached to the retrieval function for finding desired image data among a great quantity of image data stored in the single storage medium.

As for such retrieval means, there has been a multi-screen display as shown in FIG. 21(A), in which the display screen is divided into a plurality of, for instance 4×4=16, divisions or sections for displaying the content of information as the subject of retrieval on each division. Further, interval, successive or continuous reproduction has been used, in which the image data is switched at a constant time interval for display on the monitor display screen, as shown in FIG. 25(A).

Concerning cameras, for instance, there are various ways of storing data in the single storage medium, such as the still picture storage in a single picture mode in the SMC, the motion picture storage by the movie technique and more commonly called successive or continuous storage, in which the motion of a golf club being swung, for instance, is stored as successive (continuously) still pictures at a rate of 10 or 20 pictures per minute.

The multi-screen display shown in FIG. 21(A) permits retrieval of the data stored successively in the storage medium to find the intended image data. However, in order to display all stored data it is necessary to repeat the multi-screen display a certain number of times because of a limitation on the number of sections in the multi-section display. This is the case with the interval reproduction or continuous reproduction as well. Although it is desirable to reduce the interval time, due to the recognition power limitation of the human eye, considerable retrieving time is required until the end of the retrieving.

There are many cases in which the data stored in the storage medium can be retrieved as a set of data mutually related in a predetermined mode such as successively stored data, for instance picture numbers 2 to 8 in FIG. 21(A) and interval reproduction picture numbers 32 to 35 in FIG. 25(A). In such cases, retrieving and displaying the individual data are unnecessary.

Meanwhile, it has been a common practice to store the image data picked-up with the SMC in the recording medium, reproduce the stored image data and edit the data in an electronic album style, for instance.

The storage medium for such SMC may be an IC memory card which conforms to the storage format of the IC card, i.e., JEIDA (IC memory card guide line Ver. 4.1 and DOS interface guide line Ver. 1.1), and comprises an attribute memory and a common memory. The common memory has a memory arrangement comprising an attribute information area and a data area. In the attribute information area is written a set of information including a data start address, block length and initialization date, and in the data area various data are written. The data area comprises a memory management area and an image data file area.

When an object is successively picked-up with the SMC having an IC memory card of the above storage format, the file names in the root directories in the memory management area are called in the order of the pick-up. The actual image data, however, are stored randomly in the vacant data file areas searched by a system controller to be described later among areas as a plurality of clusters, and the start cluster is stored in a root directory. In other words, while the directory entry of the file names and the start clusters are produced in the order of the pick-up, the actual image data of each picked-up frame is stored in a random location. Further, with the card, in which the order of the pick-up and the order of the storage is made out of correspondence by copying or the like, the order of reproduction is determined according to the order of the entry in the root directory.

In the meantime, Japanese Patent Laid-Open No. 313382/88 discloses a program reproduction apparatus which permits reproduction of the video stored in a video storage medium such as a video tape under program control and holds the content of control in a form easily recognizable by the user. Also, Japanese Utility Model Laid-Open No. 564/88 discloses an on-screen display apparatus in which date data is provided for each picked-up frame and retrieved with reference to a screen display. Further, Japanese Patent Laid-Open No. 62983/89 discloses an SMC in which the pick-up date is stored together with the video signal to permit the pick-up date to be observed together with the video being reproduced on the monitor or the like.

In the case of the memory card, in which the picked-up data are stored without correspondence to the order of the pick-up, however, if the stored data are to be reproduced with the above conventional SMC, the data are reproduced in the order of the storage. Since the order of pick-up and the order of data storage are out of correspondence, the obtained picture reproduction is out of order. That is, it is impossible to edit the data into the electronic album or the like in the order of the pick-up dates or the order of the pick-up without great effort by the user.

This is also the case with the data stored by successive pick-up or interval pick-up of the data at a constant time interval. That is, with the memory card in which the order of the successive pick-up and the order of the storage are made out of correspondence by copying or the like, the successive video data are reproduced without order.

According to the Japanese Patent Laid-Open No. 313382/1988 concerning the program reproduction, separate reproduction control information is necessary. However, the data is not reproduced according to any stored header information and the reproduction order is only designated manually. According to the Japanese Utility Model Laid-Open No. 564/1988 concerning the apparatus having a function of retrieval according to the date data, the data is retrieved according to the particular given date data only, and the data are not rearranged when reproduced. Further, according to the Japanese Patent Laid-Open No. 62983/89 concerning a technique of storing video signals together with date information and superimposing the data information at the time of the reproduction, only stored data is displayed on a screen, and data is displayed when stored data is changed.

Meanwhile, computerized apparatuses such as personal computers, word processors and electronic notebooks utilize memory cards of the same specifications. Naturally, it is possible to use utilize such memory cards in both the SMC and the personal computer or the like. For example, it is possible to use a certain memory card for image storage in the SMC, subject the stored image data on the memory card to a process of classification and rearrangement or image synthesis in the personal computer and then reproduce the resultant image data in the SMC. Alternatively, a single memory card may be used in both the SMC and the personal computer.

In the case of using a memory card with both of the SMC and the personal computer, it is necessary to work out the format of the memory card used in the SMC to conform to the personal computer DOS (disk operating system). At present, JEIDA Ver. 4.1 noted above serves as a memory card standard, and standardized memory cards are used with the SMC. FIG. 46 shows a logical format of a memory card for the SMC, conforming to the above standardized memory card capable of use in a personal computer as well. This format is the same as the personal computer DOS format. As is shown, a first portion of the memory is a boot sector area 51, in which management area size information and parameters for file management are stored. Following the boot sector area 51 are a FAT (file allocation table) 52, a root directory area 53 and then a data area 54, in which image data are stored. In the FAT area 52 is written a FAT entry, i.e., the information about the succession of locations of the file data storage. The location of the data stored in the memory is represented by a cluster number which serves as a data write unit number. In the root directory area 53 is written a directory entry, i.e., information indicative of the registration of hierarchically highest-order level directories among files registered after classification with a hierarchical organization. In the data area 54, the picked-up image data are written in the form of files. In addition, when a subdirectory is formed in a directory, its directory entry is also written. In a personal computer, the data area 54 corresponds to the file data area.

FIG. 47 shows a specific example of a FAT entry. This FAT entry is formulated for the case where the data is stored in a data area such as the one shown in FIG. 48. The number of the FAT corresponds to the cluster number in the data area. It is now assumed that the first frame image data are stored in locations of the cluster numbers 2 to 4 while the second frame image data are stored in locations of cluster numbers 5 to 7. In this case, as shown in FIG. 47, as the FAT entry the value of the cluster number 3 in the first frame is entered as the FAT value of FAT number 2 corresponding to the preceding cluster number 2 in the first frame. As the FAT value of the FAT number 3, the value of the succeeding cluster number 4 is entered. As the FAT value of the FAT number 4 corresponding to the last cluster number in the first frame, FFFH (H representing the hexadecimal system) is written. For the second frame, FAT values are written similarly. For the out-of-use data area the FAT value is zero.

The directory entry, as shown in FIG. 49, has 32 bytes. In this entry are stored the name, attribute, time of production, date of production, storage location and first cluster number (of the same value as that of the FAT number noted above) of the pertinent file or subdirectory entry, size, etc. of a file. As the file name of the data file, the file name including extension information as one part of the file attribute information is stored, and in case of the subdirectory, the directory name is stored. In the case of the image data which is not stored, a value of 0 or 0E5H is written as the file name. The above-mentioned part of the file attribute information is represented by one byte data, as shown in FIG. 50. For the pertinent file, bits 0 to 5 are respectively assigned to read only file, invisible file, system file, volume label information, subdirectory, and archive file for discriminating ordinary image data or another type of file. Bits 6 and 7 are system reservation bits. The above set of the file attribute information is represented in terms of whether the values of the bits 0 to 7 are "0" or "1". For example, if the bit 0 is "1", it represents a file for read only that is incapable of being written to. Likewise, the other bits represent file attributes. For subdirectories, the entry information is written in an area provided in the data area when a directory is produced.

The image data stored in the data area has a memory configuration as shown in FIG. 51. The header information is stored in a first portion 61. In the header, the file information as shown in FIG. 52 is written. That is, as the file attribute information of "SMC Ver. 1.0" of the like, file identifier 63, storage time 64, image data compression parameters 65 used for data compression, pick-up conditions 66 such as the shutter speed and character row option 67 are written. The numbers written as file names in the directory entries correspond to the pick-up frame numbers, as shown in FIG. 53.

Where it is made possible to use the same memory card for both an SMC and a personal computer, there arises a problem. If a designated file is other than an image data file, for instance a personal computer text or program file, it is displayed without forming any image, and the display is very unsightly. Further, the selection is once again a cumbersome one.

Meanwhile, in conventional digital cameras or the like, the image data are stored directly on the storage media. However, there are many different kinds of image data, and it is often desired that the image data of each kind be managed collectively. For example, it is desired to process the picked-up image data by classifying them for individual dates, events and cameras. Further, for the picked-up image data to be utilized at the computer level of the personal computer or the like, they have to be written in memory by using exclusive write means.

In still picture cameras and image file apparatuses, the image data are stored on the recording media together with a variety of information related to them to permit effective reproduction. The variety of information includes image data form, pixel size, image compression system and so forth.

When successively storing a plurality of the image data files in the conventional image data storage apparatus as noted above, the attribute information and image data are stored respectively in a header section and a data section to form a file in each storage apparatus; for instance, see the header sections 1 to 4 and the image data sections 1 to 4 as shown in FIG. 84. During reproduction, the attribution information is read out from the header sections and the image data from the image data sections for successive reproduction.

In the above way, in the conventional image data storage apparatus the image data is stored as each file in the storage medium together with the attribute information and other related information necessary for reproduction. This means that when reproducing the image data stored by high speed successive storing in the still picture camera or like apparatus, the attribute information, other relevant information and image data are read out for each file, thus spending considerable time for the retrieval of attribute information or the like described in the file. This is undesirable from the standpoint of high speed reproduction. Further, since the attribute information and other information are written in each image data file, it is necessary to read all the image data for the image data file arrangement. This is a problem in the management of the information.

In a further aspect concerning pictures picked-up in a successive pick-up mode or the like, it is desirable to be able to collectively edit or otherwise process a series or group of successively picked-up images. For instance, when rearranging the picked-up image data into the form of image files, a process of collective copying of group image data picked-up in the successive pick-up mode will promote an increase in efficiency.

In the above conventional apparatus, the data of each image file header has to be read out from the storage medium and analyzed to discriminate whether or not the data was picked-up in the successive pick-up mode. In this case, however, the greater the quantity of image data, the greater the time required for the discrimination. This is undesirable in view of retrieval operations.

Further, with the still picture camera, various pick-up modes are conceivable beside the successive pick-up mode, for instance those dealing with data picked-up sequentially by multiplex exposure, processed data recorded on a multi screen, and monochromatic image data. If it is possible to process such data in the same manner as with the successively the picked-up image data as noted above, it will be very effective.

In the above-mentioned SMC and the like, names are necessary for recognizing the data. In addition, the memory management in DOS has a management rule that double names are not allowed. On the other hand, if data exchange with personal computers is made easier, file names of the data stored in the card with a personal computer may contain file names, those which are other than file names expected from the camera. In a still further aspect, when utilizing the stored data files using the camera, the data is transmitted to the personal computer's storage medium. In this case, if there is a double data file name, one of the files is overwritten, thus resulting in rupture of the storage medium integrity.

As described above, in an SMC or other electronic imaging apparatus, the digital data stored in the semiconductor memory card is preferably compressed, utilizing an encoding data compression technique (see U.S. Pat. No. 5,034,804) or variable-length encoding data compression technique (see U.S. Pat. No. 5,027,214). According to such variable-length data compression encoding, since image data can be compressed in accordance with the contents of the image to be reduced in size, a large number of electronic still images can be stored in the semiconductor memory card while the memory area on the memory card required to store one electronic still image is reduced.

On the other hand, the capacity of the storage device or medium, such as the semiconductor memory card, is rapidly improving, as the semiconductor memory technique develops.

Therefore, more and more, large numbers of electronic still images can be stored in the semiconductor memory card, and the problem is how to provide an electronic imaging apparatus capable of conveniently retrieving or reproducing desired still image.

It is desired that the image data stored on a semiconductor memory card of the above mentioned type be compatible with a data file of a personal computer to conveniently edit, duplicate, or transfer image data by utilizing the pertinent functions of the personal computer.

However, the conventional electronic imaging apparatus of the above mentioned type, such as the SMC disclosed in U.S. Pat. No. 5034,804, has data files of a unique construction in spite of its likeness to the DOS file at a glance, and has no compatibility with personal computers in the construction of the data files. This conventional SMC cannot provide the hierarchical file system and therefore cannot conveniently retrieve or reproduce desired still images from a large number of electronic still images stored in a semiconductor memory card of large capacity.

SUMMARY OF THE INVENTION

According to the present invention, there is provided an electronic imaging apparatus including a data storing means which solves the above-mentioned problems. The data storing means provided in this electronic imaging apparatus stores image data on an applied storage device or medium, such as the semiconductor memory card of large capacity, in the form of a file organized by the directory or subdirectory supported by DOS, thereby capable of storing said image data in a hierarchical structure.

According to an aspect of the present invention, a construction of the data files can be provided as the hierarchical file system fully compatible with the DOS files of personal computers being currently used today. In this aspect, the electronic imaging apparatus of the present invention is essentially distinct from the above mentioned conventional SMC (U.S. Pat. No. 5,034,804).

According to another aspect of the present invention, there is provided a means for storing or recognizing information indicative of whether or not the corresponding image data to be stored or to be retrieved belongs to a predetermined group by referring to the header portion of files allocated on an applied storage device or medium to retrieve a series of image files of the group possibly concerning a series of repetitive photographs.

According to still another aspect of the present invention, there is provided a means for storing or recognizing subsidiary information, that is, time information to represent a sequence of time when the corresponding image has been picked-up. The subsidiary information is stored in the header portion of the image file allocated on an applied storage device or medium to retrieve or reproduce a series of images defined by the subsidiary information.

According to a still further aspect of the present invention, there is provided a means for discriminating whether or not data to be read out from said applied storage device or medium is image data, in terms of attribute information thereof, to notify a user that the data to be read out is not an image data, thereby preventing user confusion.

According to still another aspect of the present invention, there is provided a means for providing a control file to be utilized for collectively storing information required for a reproduction or retrieval operation, so as to perform the retrieval operation rapidly.

According to still another aspect of the present invention, there is provided a means for producing the names of files in such a manner that at least a partial section of the name is generated by means of a calculation based on the time data clocked in this apparatus, so as to provide the names of the files automatically, for preventing the duplication of names.

BRIEF DESCRIPTION OF THE DRAWINGS

FIG. 26 shows a flow chart of a reproduction routine of the second embodiment;

FIG. 27 shows write and reproduction orders for the storage medium of the embodiment of FIG. 26;

FIG. 29 shows displayed examples of a series of reproduction image frames of the embodiment of FIG. 28;

FIG. 32 shows the rearrangement procedure of the recorded data in the IC memory card by using supplementary memory;

FIG. 48 shows a relationship between the frame number and cluster in the memory card of the conventional SMC;

FIG. 49 shows contents of the directory entry of the memory card in the conventional SMC;

FIG. 50 shows the contents of the attribute of the directory entry of the memory card in the conventional SMC;

FIG. 62 shows an example of a relational information description of the embodiment;

FIG. 63 shows an example of an editing procedure of the embodiment;

FIG. 64 shows an example of a file description of the embodiment;

FIG. 65 shows an example of the relational information reproduction of the embodiment;

FIG. 66 shows a display example of the file information of the embodiment;

FIG. 69 shows a file structure recorded in the memory medium of the embodiment;

FIG. 70 shows a control file structure of the embodiment;

FIG. 71 shows an image file structure of the embodiment;

FIG. 73 shows a description example of the relational information file of the control file of the route directory of the embodiment;

FIG. 74 shows an example of a relational information file of the control file of the subdirectory of the embodiment;

FIG. 85 shows an example of the file structure according to the present invention;

FIG. 86 shows a description example of the memory region in the IC card memory of the embodiment;

FIG. 87 shows an image file structure representing an example of the pointer of the embodiment;

FIG. 88 shows an example of the data structure in the IC memory card of the embodiment;

FIG. 90 shows a description example of the relational information file of the embodiment;

FIG. 91 shows description examples of the relational information file and table pointer of the embodiment;

FIG. 94 shows a description example of the specification tuple of the embodiment;

FIG. 95 shows a description example of the header information tuple of the embodiment;

FIG. 96 shows a description example of the mast tuple of the embodiment;

FIG. 97 shows a description example of the option tuple regions of the embodiment;

FIG. 98 shows contents of examples of the header description (mast tuple) of the embodiment;

FIG. 99 shows contents of examples of the header description (option tuple) of the embodiment;

FIG. 100 shows a standard example of the header contents of the embodiment;

FIG. 101 shows an arrangement example of the image element where a horizontal Y/C ratio is 2:1 and a vertical ratio is 1:1;

FIG. 102 shows JPEG data in accordance with the condition of the embodiment;

FIG. 103 shows a description example of SMC of the embodiment;

FIG. 104 shows a frame header of the embodiment;

FIG. 105 shows an example of assignment of AC·DC Hoffman table to the respective Y·C of the embodiment;

FIG. 109 shows a description example of the specification tuple of the embodiment;

FIG. 110 shows a description example of the header information tuple of the embodiment;

FIG. 111 shows a description example of the mast tuple of the embodiment;

FIG. 112 shows a description example of the option tuple region of the embodiment;

FIG. 113 shows contents of the mast tuple of the embodiment;

FIG. 114 shows a drawing representing standard values of the embodiment;

FIG. 115 shows an example of the non-compressed data structure of the embodiment;

FIGS. 116 and 117 show examples of the compressed structure of the embodiment;

FIG. 120 shows an example of the specification tuple of the embodiment;

FIG. 121 shows an example of the header information tuple of the embodiment;

FIG. 122 shows a data structure example of the embodiment;

FIG. 123 shows a grouping by the control file of the embodiment;

FIG. 124 shows file control information of the embodiment;

FIG. 125 shows an example of the grouping by the file name of the embodiment;

FIG. 126 shows a description example of each recording mode by using a comment tuple in the option tuple of the embodiment;

FIG. 127 shows a drawing explaining the definition of a virtual reality mode according to this embodiment;

FIG. 128 shows an example of the control file of FIG. 127;

FIG. 129 shows a file header of FIG. 127;

FIG. 130 shows an example of the control file of the embodiment;

FIG. 131 shows an example of the file header of the image data of the embodiment;

FIG. 132 shows an example of the control file of the embodiment;

FIG. 133 shows an example of the file header of the image data of the embodiment;

Figure 134:
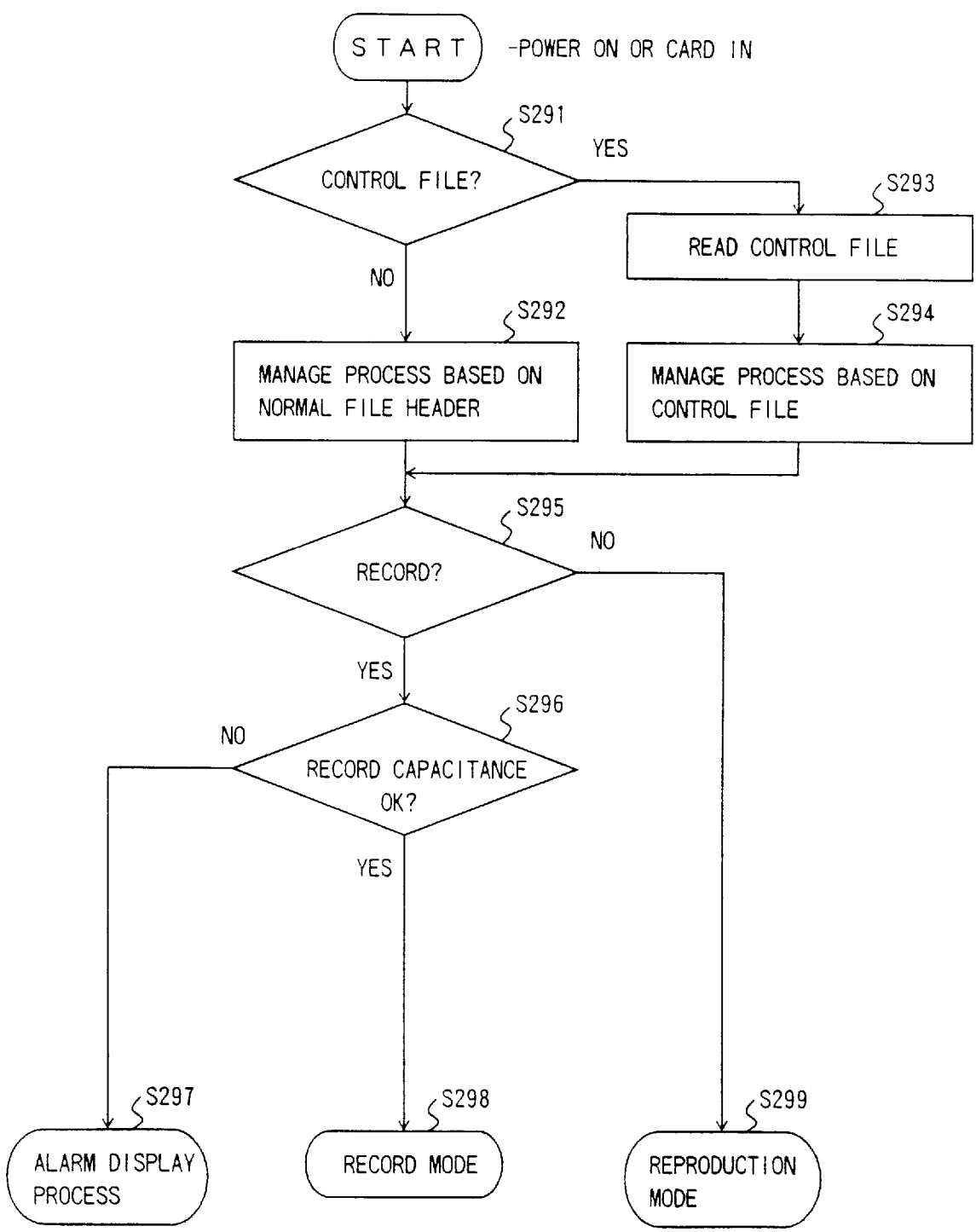
Figure 135:
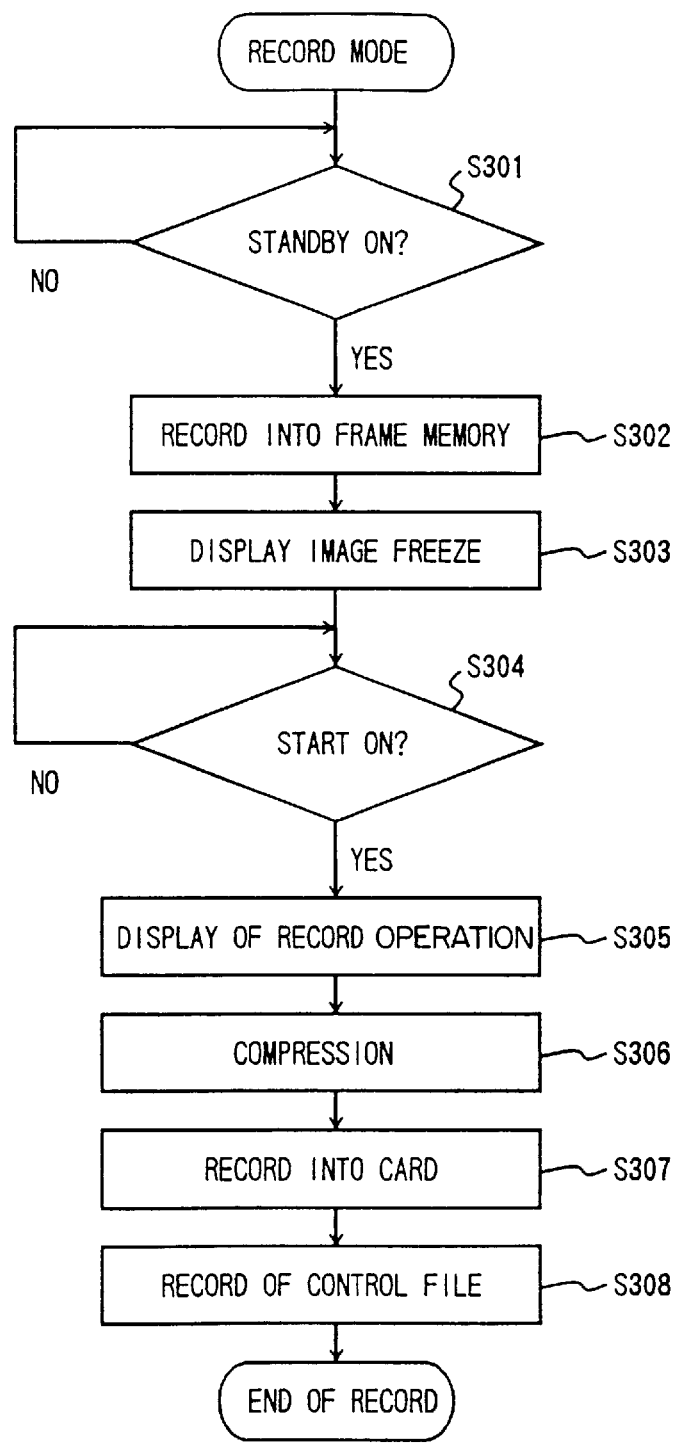
Figure 136:
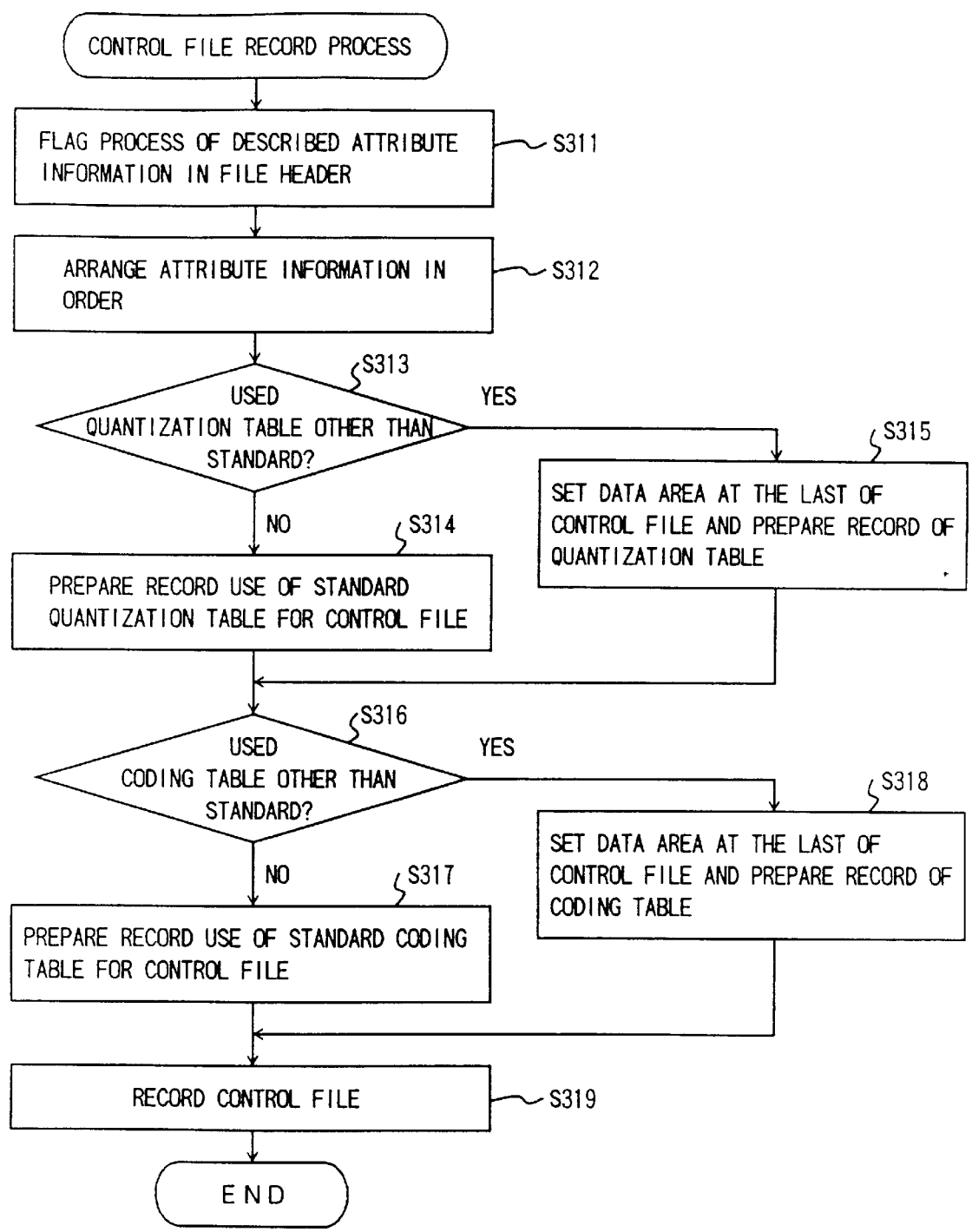
Figure 137:
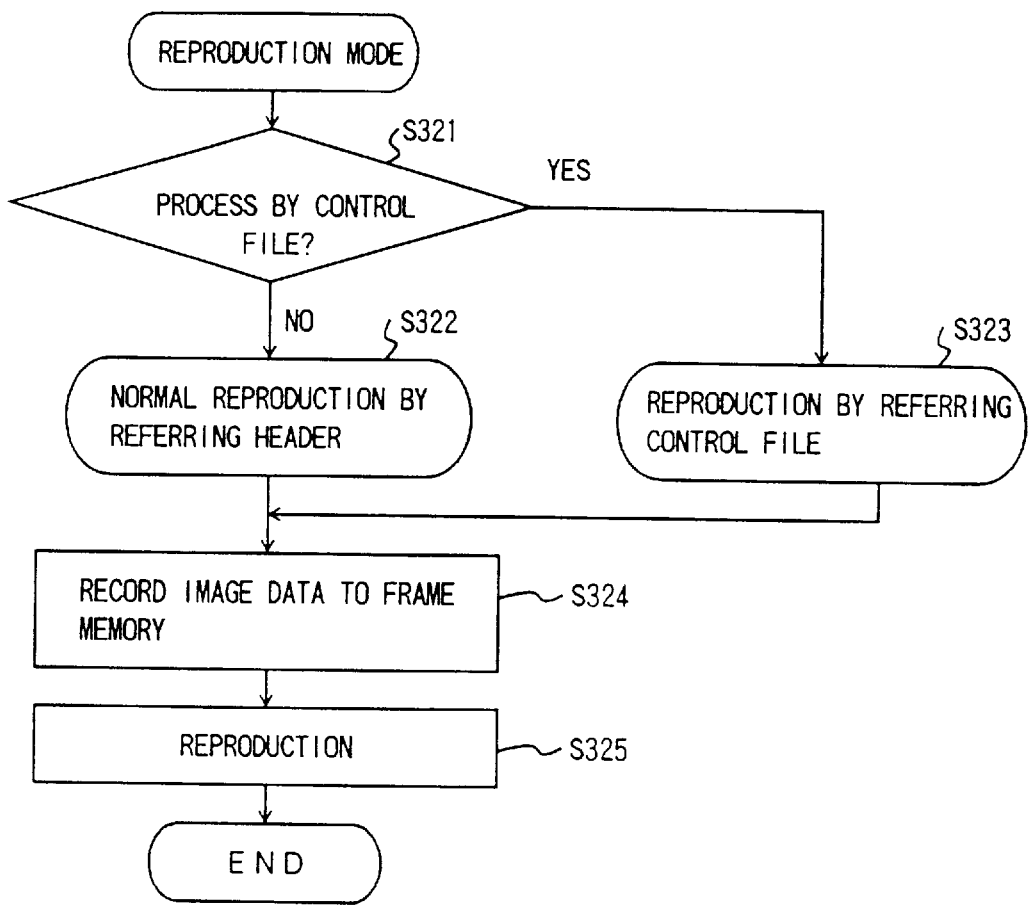
Figure 138:
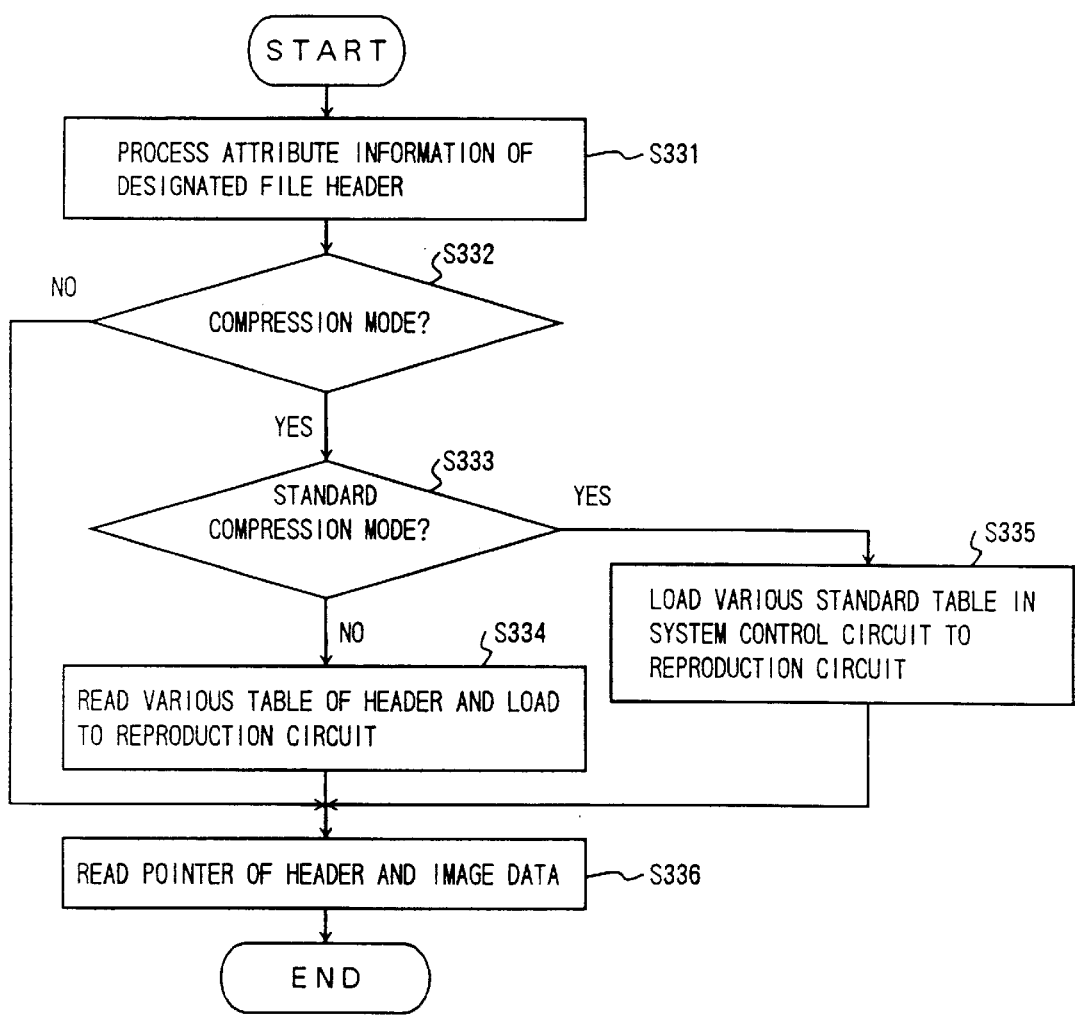
Figure 139:
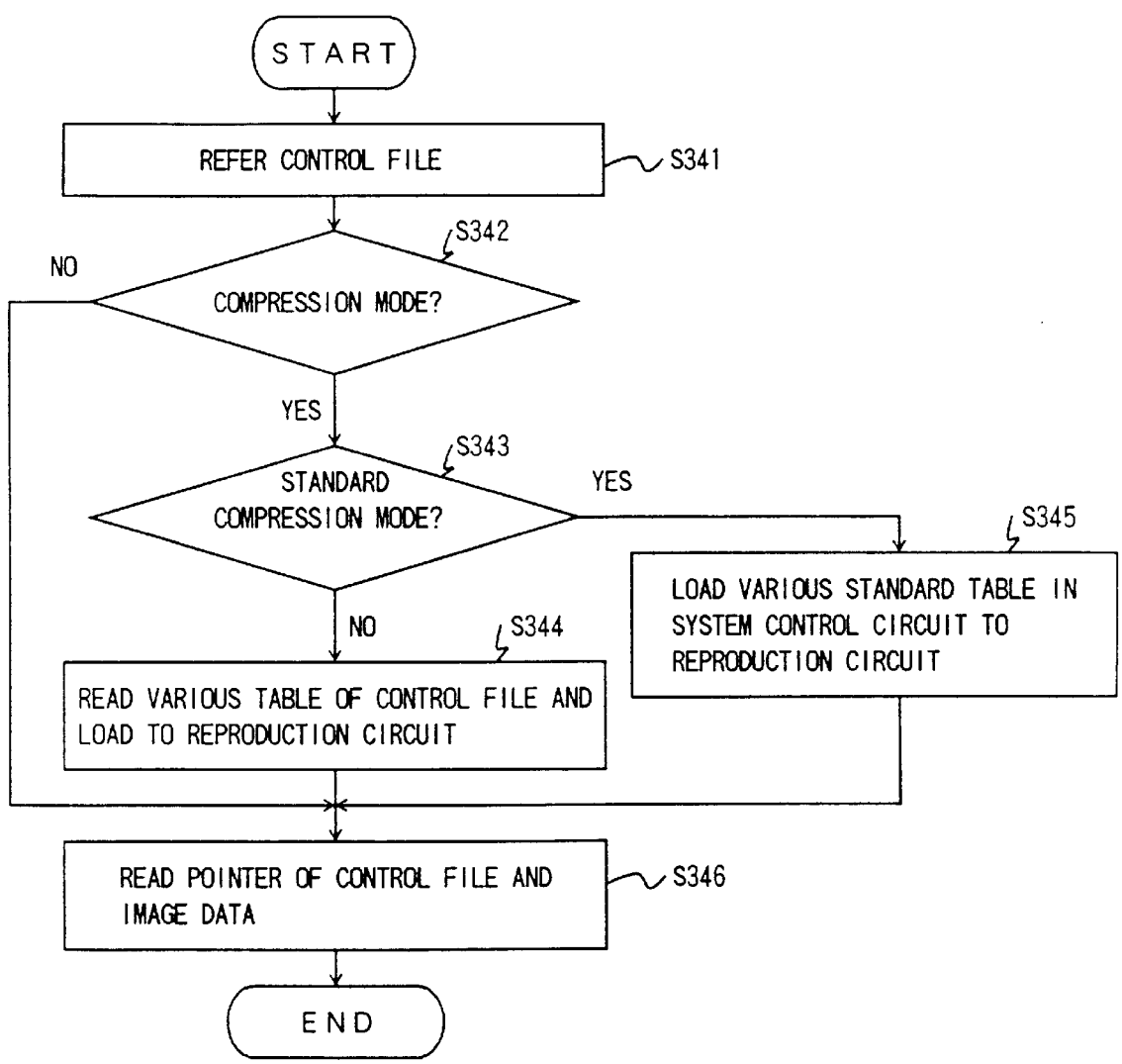
Figure 140:
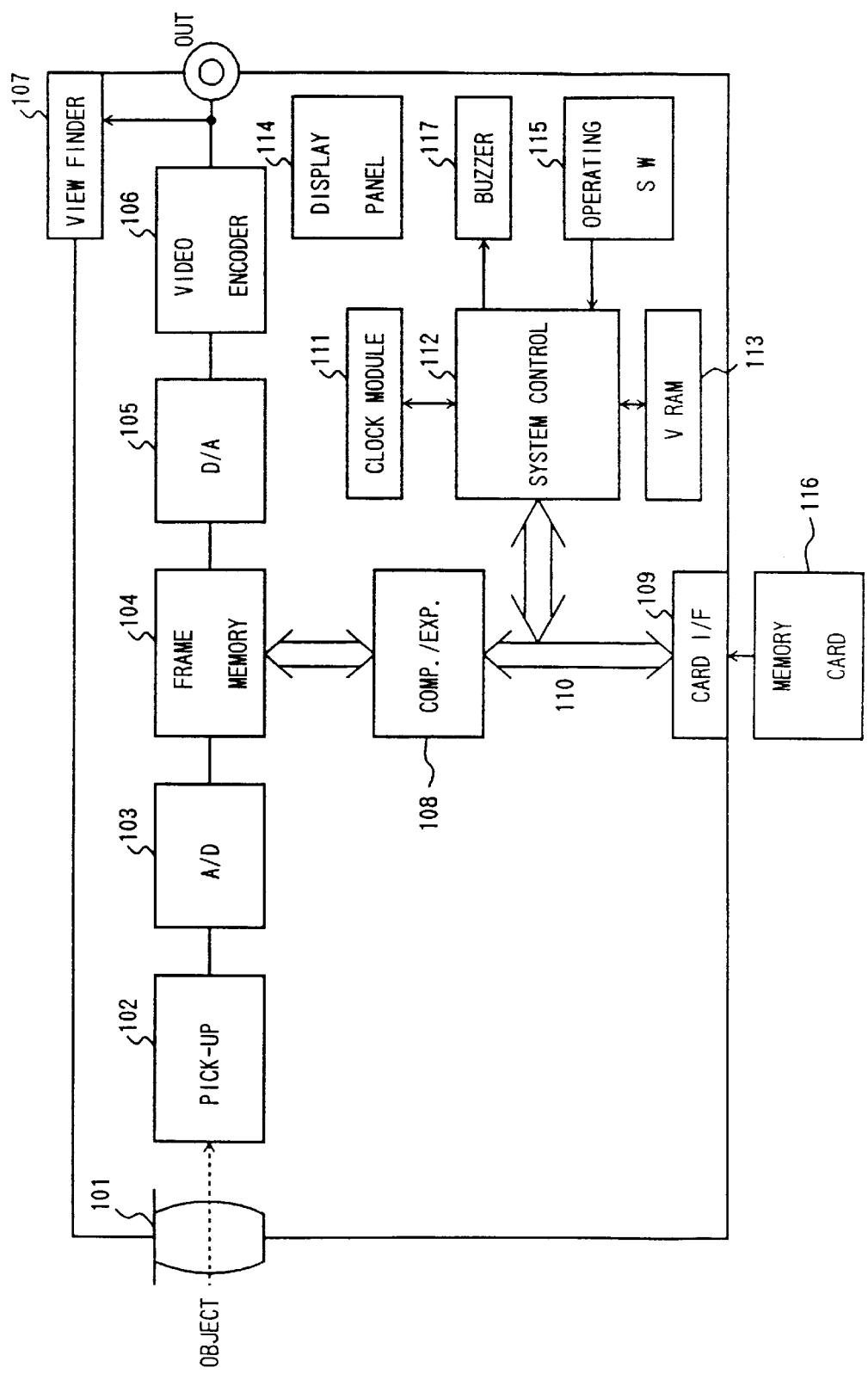
Figures 141, 142:
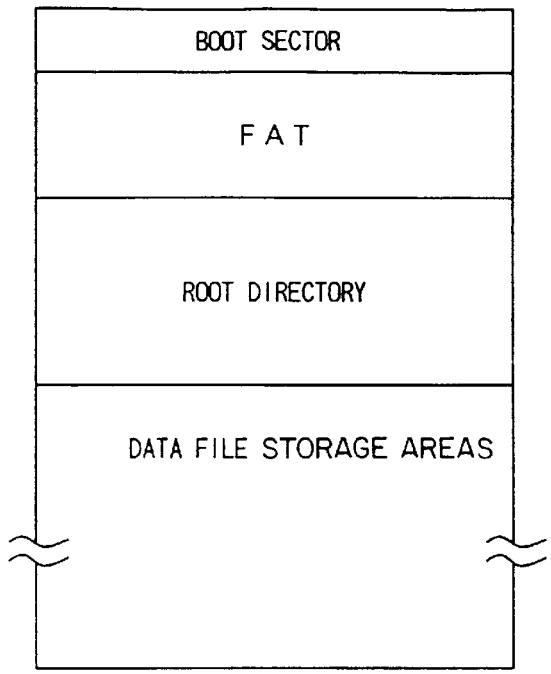
Figures 146, 147, 148, 150:
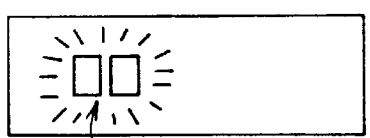
Figure 149:
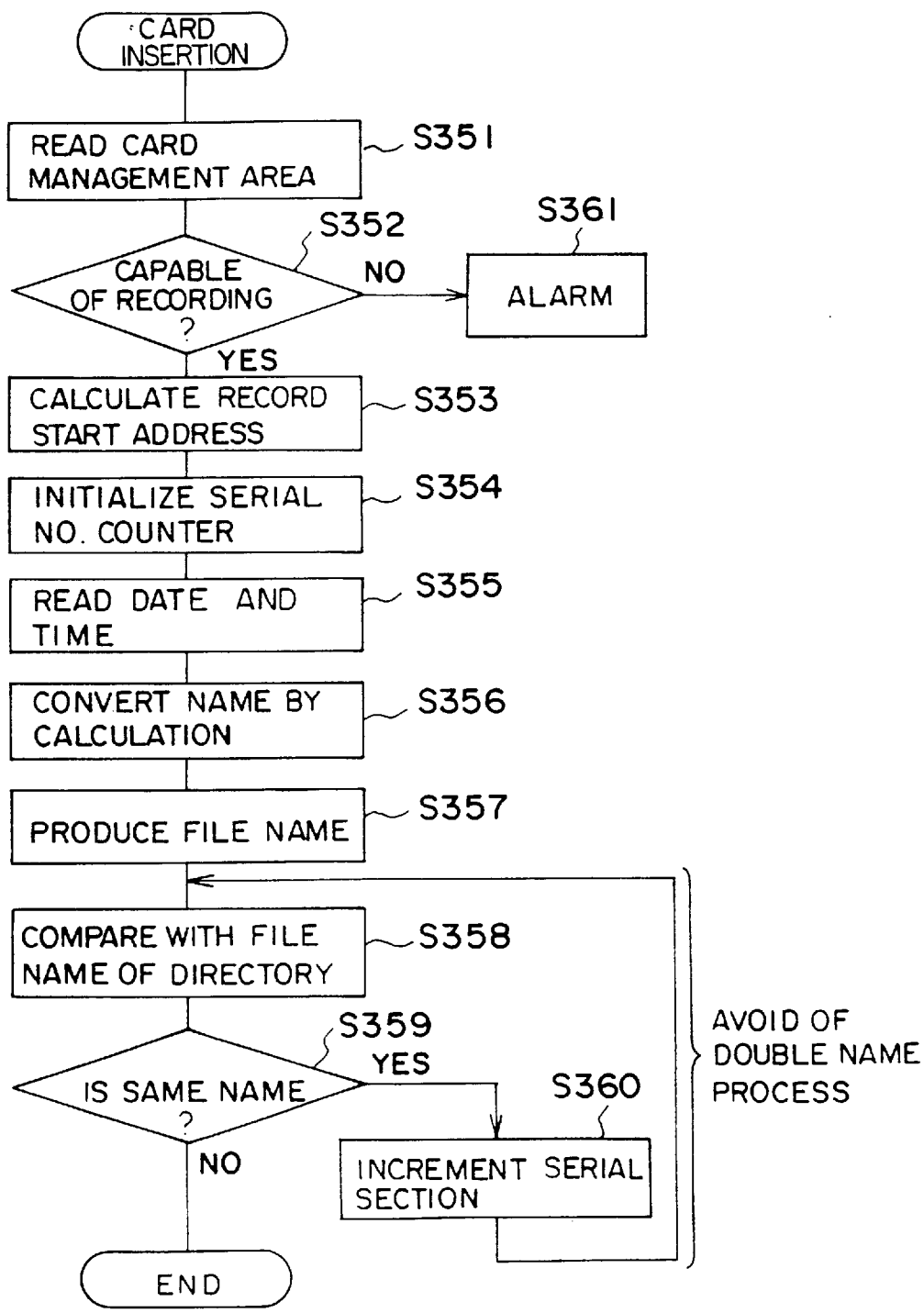
Figure 151:
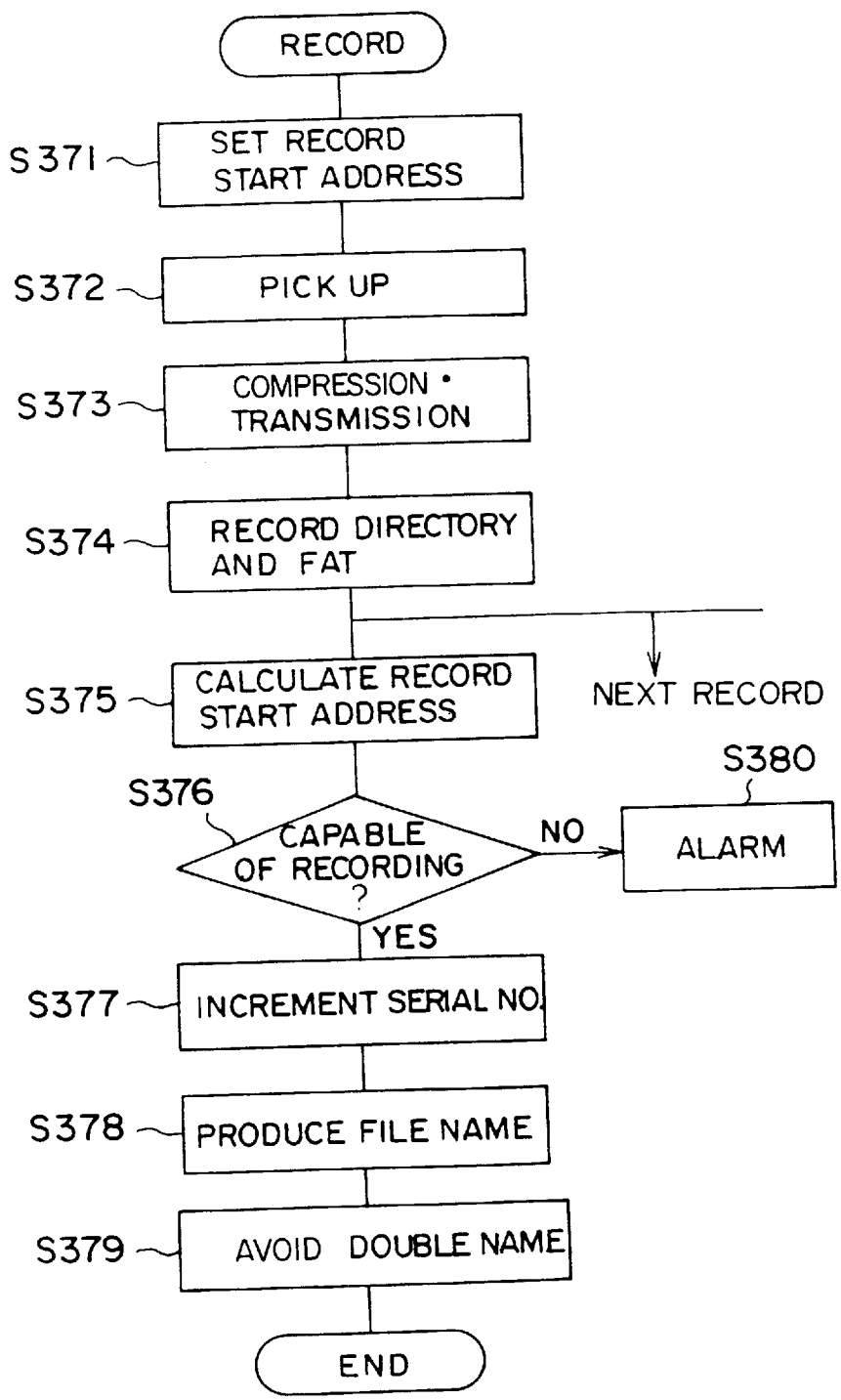

FIG. 134 shows a flow chart representing the recording/reproducing operation procedures of the embodiment;

FIG. 135 shows a flow chart representing the operation procedures of the recording mode of the embodiment;

FIG. 136 shows a flow chart representing the control file recording procedures of the embodiment;

FIG. 137 shows a flow chart representing the operation procedures in the reproducing mode of the embodiment;

FIG. 138 shows a flow chart representing the normal reproducing procedures by the header of the embodiment;

FIG. 139 shows a flow chart representing the reproducing procedures by the control file of the embodiment;

FIG. 140 shows a block diagram of the embodiment according to the invention;

FIG. 141 shows a region arrangement in the memory card of FIG. 140;

FIG. 142 shows a structure of the root directory of FIG. 141;

FIG. 143 shows a structure of the directory entry in FIG. 142;

FIG. 144 shows a structure example of the file name of the embodiment;

FIG. 145 shows a drawing for explaining production of the file name of the embodiment;

FIG. 146 shows a file name of the embodiment;

FIG. 147 shows an example of the directory in the memory card of the embodiment;

FIG. 148 shows a directory after recording two images to the memory card of FIG. 147;

FIG. 149 shows a flow chart representing the procedures for memory card insertion according to the embodiment;

FIG. 150 shows a display example on the monitor for the alarm condition of FIG. 149;

FIG. 151 shows a flow chart representing the operation procedures for the recording condition of the embodiment;

FIG. 152 shows a file name example capable of changing the file name according to the other embodiment;

FIG. 153 shows a display change on the monitor for the operation instruction and setting operation in FIG. 152;

FIG. 154 shows a directory at the end of the recording in FIG. 152;

FIG. 155 shows change procedures of the target file size according to this embodiment;

FIG. 156 shows a state where there is not enough vacant area; and

FIG. 157 shows a flow chart representing the operation procedures for the file size change according to the other embodiment.

DETAILED DESCRIPTION OF THE PRESENTLY PREFERRED EXEMPLARY EMBODIMENTS

Figure 1:
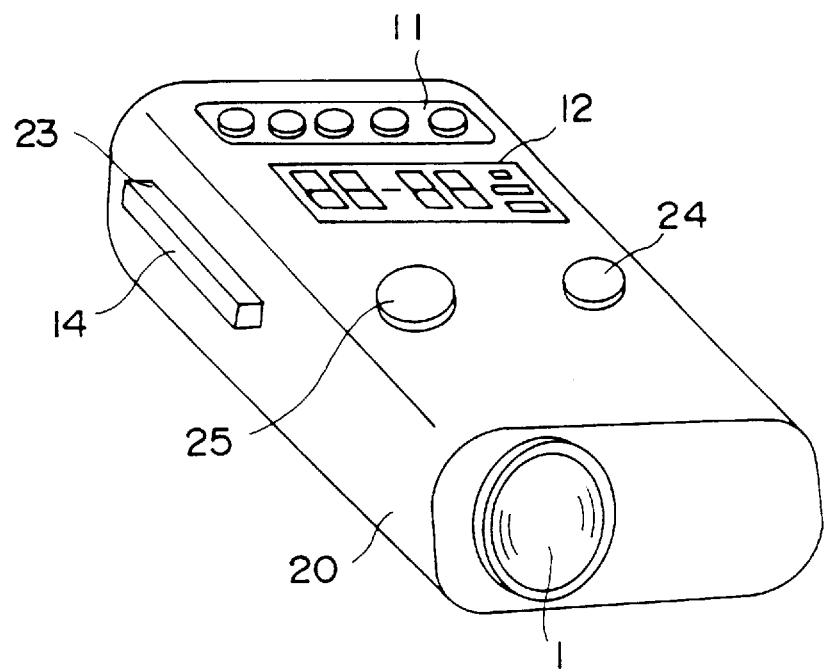
FIG. 1 shows a perspective view of an SMC according to the present invention.
Figure 8:
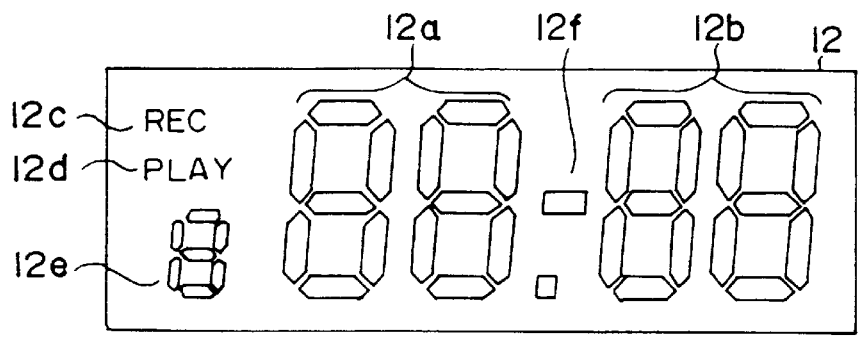
FIG. 8 shows a plan view of the LCD display in FIG. 1.
Figure 9A:
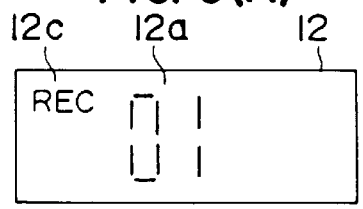
FIG. 9 shows exemplified displays on the LCD in FIG. 1.
Figure 9C:
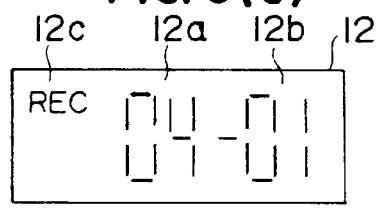
Figure 9B:
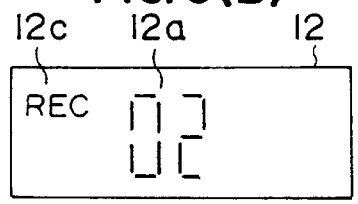
Figure 9D:
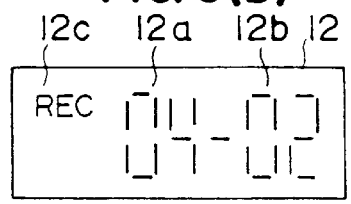

FIG. 1 is a perspective view showing an SMC as an embodiment of the electronic imaging apparatus according to the invention. It is assumed that the SMC as embodiment is used with a fixed memory card serving as the image data storage medium. In this SMC, the picked-up image data of each picture is stored as an allocated data file in the memory card. The file storage makes use of allocation information in a hierarchical organization, i.e., a hierarchical directory file structure such as a tree structure, and directory information which is utilized for personal computer DOS for image data storage and reproduction. Further, the display of file information in hierarchical directories is made by using a LCD display unit 12 as shown in FIG. 8, which is a one-line hierarchical organization information display comprising a first and second display sections 12a and 12b.

Referring to FIG. 1 again, the SMC has a pick-up lens 1 provided on the front face of its casing 20. One side of the casing has a card insertion slit 23, through which a memory card 14 can be inserted. The top of the casing 20 is provided with a power switch 24 for turning on and off the power source and a store switch 25 which serves as a shutter release switch. Further, a rear portion of the top of the casing 20 is provided with a set of switches 11 for storing and reproducing operations and the LCD display section 12 for displaying information about the storing and reproduction and also image data file information with hierarchical directories.

Figure 2:
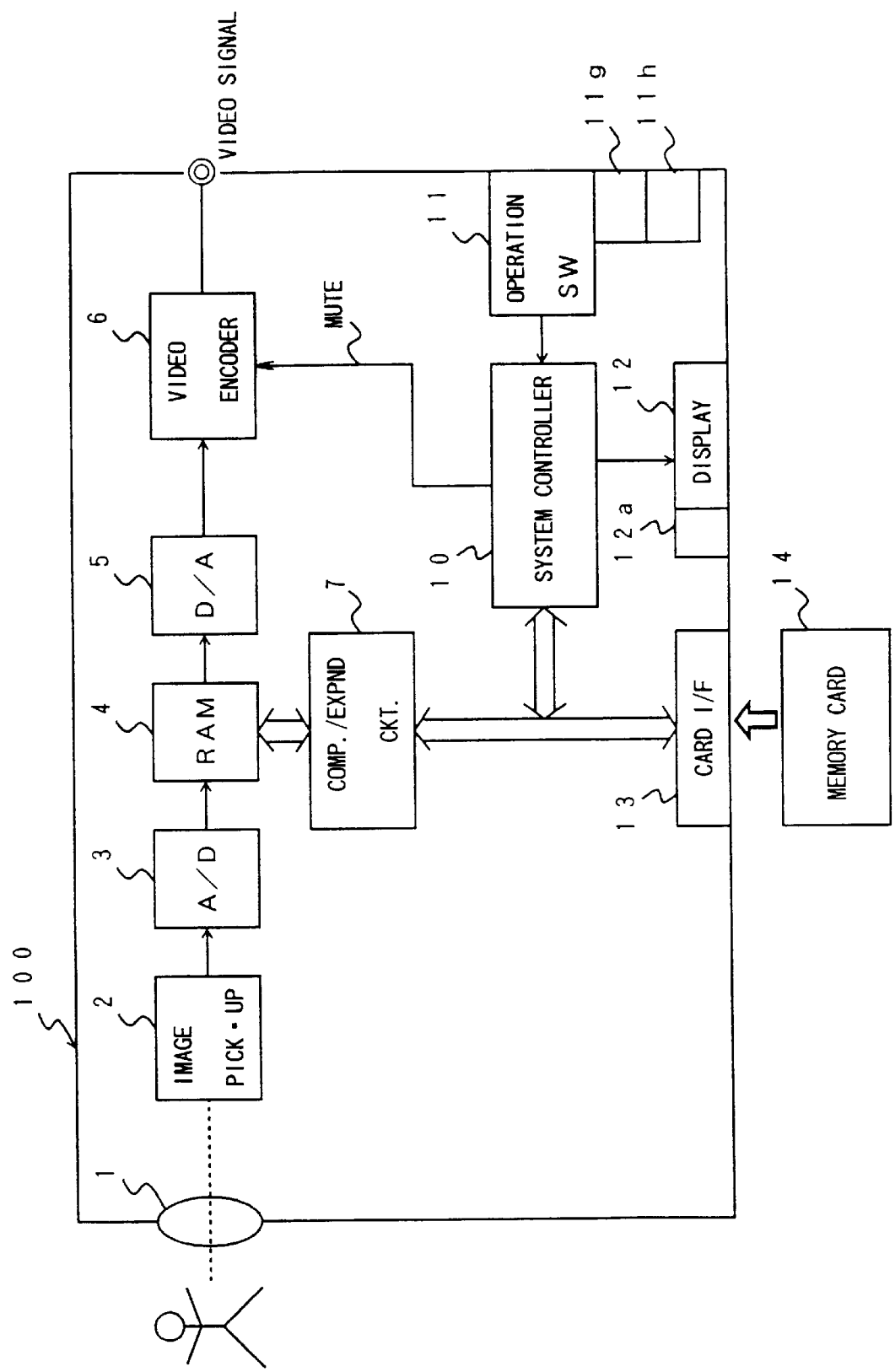
FIG. 2 shows a block diagram of the image processing section of an SMC according to the present invention.

FIG. 2 is a block diagram showing an image processing section of the SMC. As shown, when storing or reproducing the images in the SMC, the memory card 14 is inserted in a card interface (I/F) 13 to be ready for storage and reproduction. First, in a pick-up state an object image is focused through the pick-up lens 1 on an image pick-up element such as a CCD in an image pick-up circuit 2 to be output as image signal to an A/D converter 3. The A/D converter 3 outputs digital image data to be temporarily stored in a RAM 4. Image data in the RAM 4 is converted again in a D/A converter 5 into an analog signal and then subjected in a video encoder 6 to a predetermined encoding process to be provided as a video signal. When the image data is in a non-storage area, it is subjected to a muting process in the video encoder 6 according to the muting signal from a system controller 10.

When storing (recording) image data in the memory card, the data is read out block by block from the RAM 4 and supplied to a compression/expansion circuit 7 for compression using an orthogonal conversion process such as DCT (discrete cosine transform). The compressed data is input to the card I/F 13 through a bus to be stored in a designated area of the memory card 14. This storage area is designated by the hierarchical directory noted above.

In reproduction, an image file to be reproduced is designated with reference to the hierarchical directory information of the image file displayed on the LCD display 12. According to the designation, a memory area of the memory card 14 is selected, and the corresponding image data is read out through the card I/F 13 and input to the compression/expansion circuit 7 through the bus. In the circuit 7 the image data is expanded to be stored in the RAM 4. The image data is then read out from the RAM 4 to be converted in the D/A converter 5 into an analog signal. The analog signal is then encoded in the video encoder to be output as a video signal.

The system controller 10 supplies predetermined control signals to various parts of the SMC according to instructions from the switches 11. It executes hierarchical organization storage/reproduction control based on the image data directories and also hierarchical organization display control.

Figure 3:
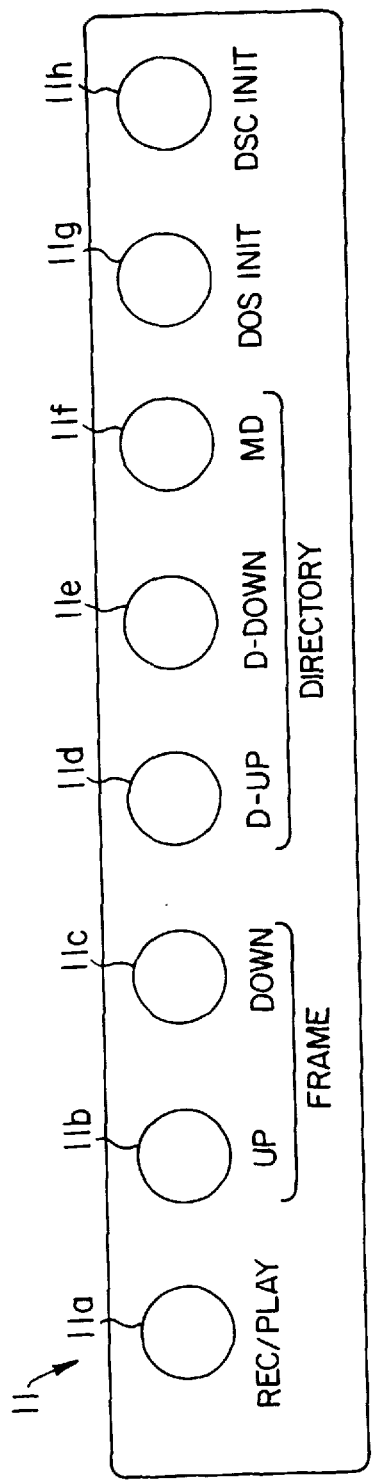
FIG. 3 shows a plan view of the group of the operation switches of an SMC according to the present invention.

FIG. 3 shows the arrangement of the switches 11. The switches 11 are a REC/PLAY switch 11a for switching recording and play modes, an UP switch 11b for frame-up accessing image data files registered in hierarchical directories at the time of the recording and play in the order of directories, a DOWN switch 11c for frame-down accessing image data likewise, a D-UP 11d switch for ascending the hierarchy of hierarchical directories of the image data files as the subject of retrieval for recording or play, a D-DOWN switch 11e for descending the hierarchy of the hierarchical directories likewise, an MD switch 11f for producing a hierarchical directory area to permit an image file to be stored in the pertinent directory, a DOD INIT switch 11g for DOS initialization and formatting of memory card 14, and a DSC INIT switch I/h for DSC (digital still camera) initialization and formatting of memory card 14.

Figure 4:
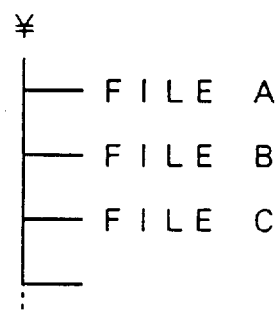
FIG. 4 shows a tree structure of the root directory of the memory card of an SMC according to the present invention.
Figure 5:
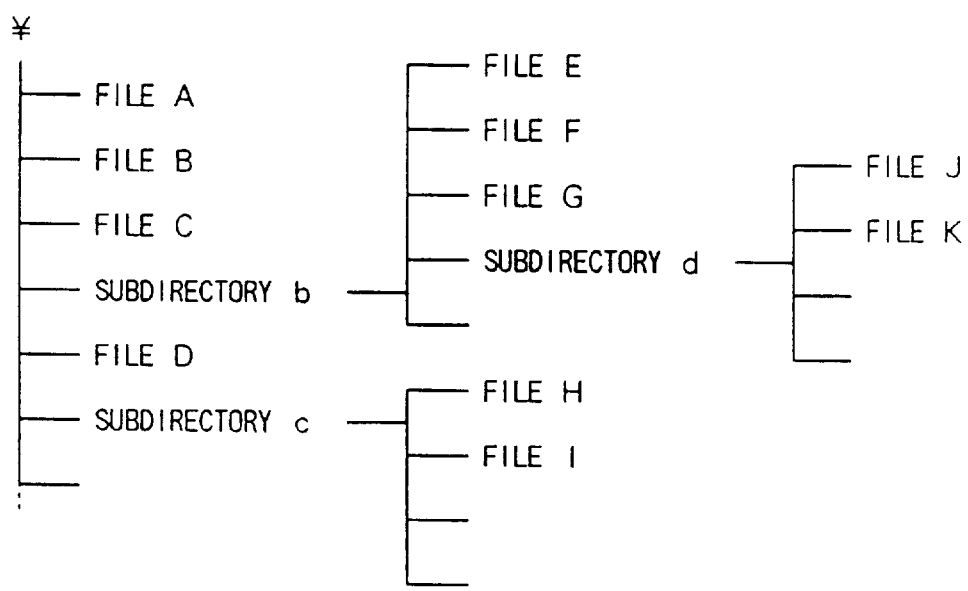
FIG. 5 shows tree structures of the root directory and the subdirectory of an SMC according to the present invention.

As image data of the SMC, a frame of the image data is dealt with as a file as noted above. The recording and play of the image files are managed by utilizing the hierarchical directory file system. The file system of the SMC will now be described briefly. In the memory card 14, memory areas are allocated as a set of sections, i.e., a FAT section, in which the FAT information noted above is stored, a root directory section, in which basic directory information is stored, and a data section, in which the image data is stored. When storing image data in an out-of-use state, i.e., in a state without any new directory area provided, file name, file A, file B, . . . are registered in a root directory as shown in FIG. 4, and the image data are stored successively in designated memory areas. In FIG. 4, mark ¥ designates a root directory. When a subdirectory b is produced in the root directory as shown in FIG. 5, it is registered in the root directory, and a second hierarchical level subdirectory of directory name b is secured under the root directory. In the subdirectory b, the image data files with file names of E to G can be registered. As their directory information, cluster Nos. indicative of the positions of memory areas with the file data stored therein are written in a directory entry to be described later, and files are accessed according to this information.

In the same subdirectory, a third hierarchical level subdirectory d can be produced. In the subdirectory d, file J, file K, . . . can be stored. Further, as shown in FIG. 5, a separate subdirectory c may be produced as a second hierarchical level subdirectory in the root directory ¥ to register file H, file I, . . . in this subdirectory. In the above subdirectories may be stored image files concerning pictures of scenes belonging to the same theme or those classified for pick-up periods or as to whether pictures are advancement or retreat storage pictures.

When reproducing the image data, it may be desired not only to successively reproduce files A to C of the image data in the root directory but also to reproduce only the classified image data files E, F and G. In such a case, the subdirectory c can be selected for reproduction. By so doing, an intended image can be reproduced quickly.

Figure 6:
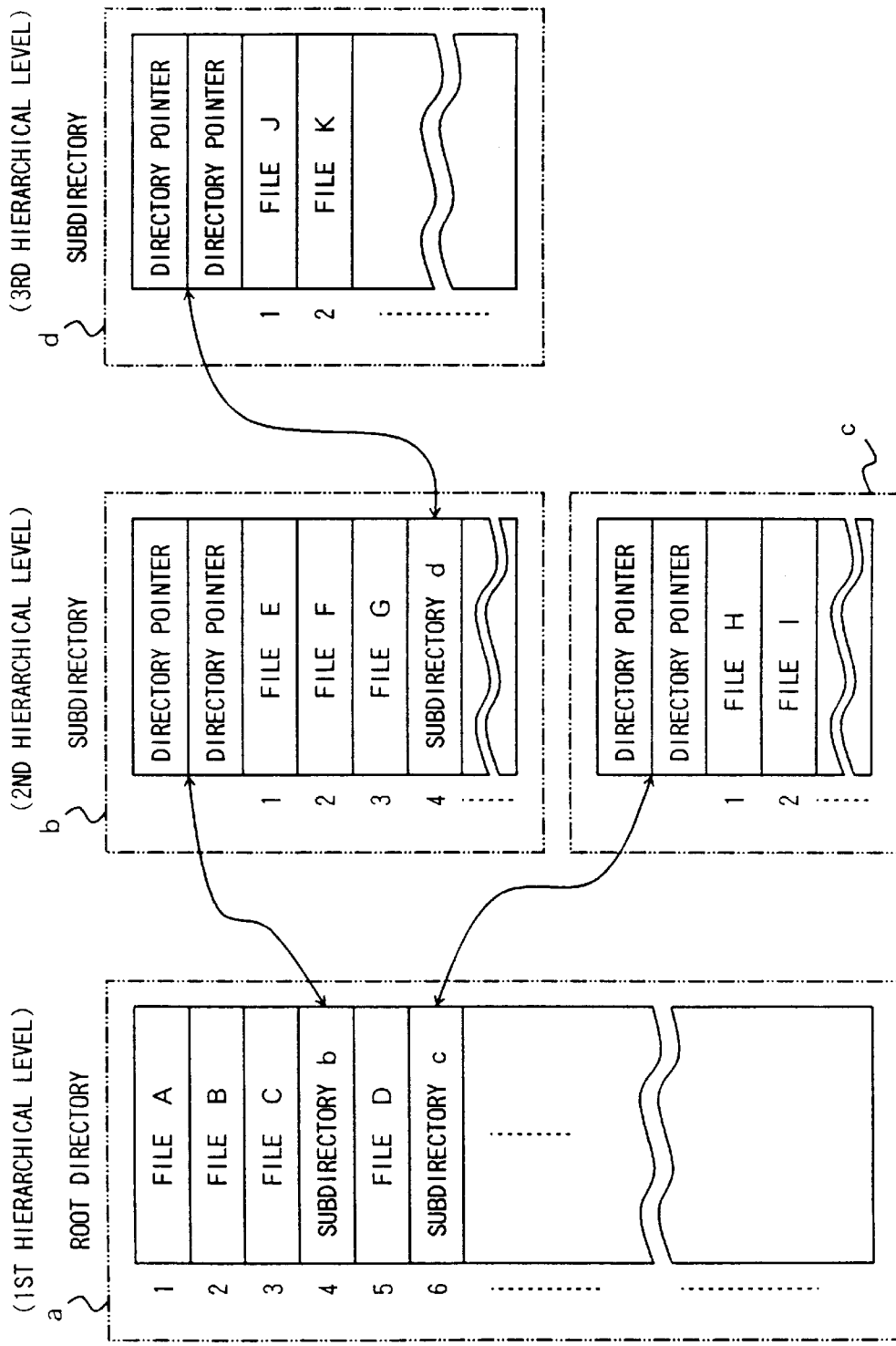
FIG. 6 shows drawings for explaining the registration of the root directory and subdirectory of an SMC according to the present invention.

FIG. 6 shows a specific example of the hierarchical directory structure of FIG. 5 for SMC image data files. In this hierarchical directory structure, a root directory a, second hierarchical level subdirectories b and c and a third hierarchical level subdirectory d are organized in a tree-like relation to one another. In a first portion of each directory information storage area except for the root directory, a 2-byte directory pointer indicative of the high-order level directory information storage address is written. This pointer permits returning to the high-order level directory position. In the following area, the directory entry is stored as the subdirectory or image data file directory information.

Figure 7:
FIG. 7 shows a format of the directory entry of an SMC according to the present invention.

In the directory entry, as shown in FIG. 7, file name, attribute, time of production, date of production, start cluster No. of the storage location of the pertinent file or subdirectory and file size are stored. As the file name, a file name is registered if the pertinent file is a data file, while a directory name is registered if the file is a subdirectory. The attribute indicates the file data or subdirectory, or it indicates a kind of file. The first cluster No. permits accessing image file data or the subdirectory. In the case of the image file as the cluster No. of the area in which the data constituting a file is stored, the first cluster No. noted above and following cluster No. information are written in the FAT area noted above. The directory entry information noted above of the subdirectory is written in an area provided in the file data area of the memory card 14 when producing the directory.

When registering the image data file to be stored in the subdirectory by using the hierarchical directory structure noted above, a directory is produced by operating the MD switch 11f in the set of switches 11 shown in FIG. 3 to secure an image file storage area. Then, to shift up or down the directory position for file accessing the hierarchical directory retrieval position is shifted up or down by operating the D-UP switch 11d or the D-DOWN switch 11e. Then, the data file to be stored is selected by operating the UP and DOWN switches 11d and 11c. A tree traversal system access can be obtained by continuously operating the UP and DOWN switches 11b and 11c. More specifically, when the subdirectory is accessed during successive accessing of files in the directory, files in the pertinent low-order level hierarchical subdirectory are now accessed. When the subdirectory file accessing is over, now high-order level directory files are accessed.

As the direct entry file name of an image file, which is not stored, a value of zero is written. Whenever image data is written, a serial No. is given and registered as the file name of the pertinent directory entry. The file is stored in a non-use area which is searched according to the FAT information noted above. More particularly, FIG. 1 depicts an embodiment of the electronic still camera according to the present invention.

When reproducing image data, the hierarchical position of the hierarchical directory to which the image file to be reproduced belongs is shifted up or down by operating the D-UP switch 11d or the D-DOWN switch 11e. When the image file to be reproduced is selected by operating the UP and DOWN switches 11b and 11c. The recording or play mode is designated by operating the REC/PLAY switch 11a.

FIG. 8 is a plan view showing the display 12. When the recording mode of the camera is set, a display REC 12c is turned on. When the play mode is set, a display PLAY 12d is turned on. First and second display sections 12a and 12b form a one-line 7-segment display section. The directory name or file name of the image data file for recording or playback corresponds to the number, such as 1, 2, . . . , of the file or a subdirectory in the directory information shown in FIG. 6 in this embodiment of the SMC. A hyphen display 12f is a connection symbol between the first and second display sections 12a and 12b. The first and second display sections 12a and 12b altogether can display only two hierarchical levels. A single-digit display section 12e serves to display the number of concealed hierarchical levels above that of the hierarchical directory displayed on the first display section 12a.

FIG. 9 shows states the display 12 when the storage file is shifted by operating the UP and DOWN switches 11b and 11c in the recording mode. In the display shown in 9(A), "01" is displayed on the first display section 12a, indicating that the image file to be stored is a file of file name 1 in the root directory (which corresponds to file A in FIG. 6). In the display shown in FIG. 9(B), "02" is displayed on the first display section 12a, indicating that the image file to be stored is of file name 2 in the root directory (which corresponds to file B in FIG. 6). It is to be appreciated that the displayed file name may correspond to the frame No., which is a feature of this embodiment. In the display shown in FIG. 9(C), "04" and "01" are displayed in the respective first and second display sections 12a and 12b, indicating that the designated image file to be stored is of file name 1 (corresponding to file E in FIG. 6) in a subdirectory designated by directory name 4 in the root directory (corresponding to directory b in FIG. 6). The display shown in FIG. 9(D) indicates that the designated image file to be stored is a file of the file name 2 (corresponding to file F in FIG. 6) in a subdirectory designated by directory name 4 in the root directory (corresponding to directory b in FIG. 6). The switching of the files shown in FIGS. 9(A) to 9(D) is effected by operating the UP and DOWN switches 11b and 11c in the set of switches 11. When the UP switch 11b is further held depressed, the directory information shown in FIG. 6 returns from subdirectory b to the root directory, and thus file D is accessed.

Figure 10A:
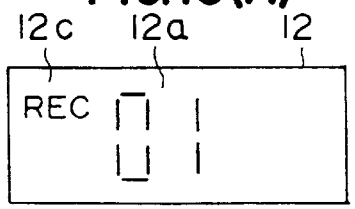
FIG. 10 shows exemplified displays on the LCD on making the directory in FIG. 1.
Figure 10C:
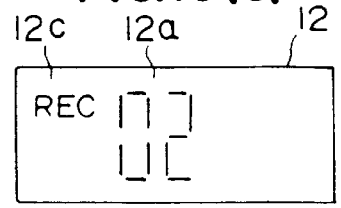
Figure 10B:
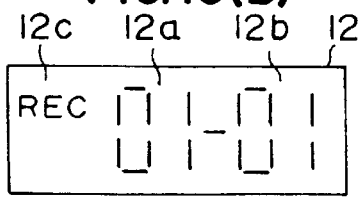

FIG. 10(A) shows a directory display when the recording mode is set up after the power is turned on subsequent to the loading of a new memory card 14 in the SMC. At this time, no subdirectory has been produced yet, and it is indicated by "01" in the first display section 12a that the pertinent directory is of the first file name 1 in the root directory. By depressing the MD switch 11f for directory production in this state, subdirectory 1 is produced in the first directory of the root directory, and "01" is displayed on the second display section 12b, indicating that the file of file name 1 in the subdirectory 1 is ready for storing (FIG. 10(B)). When the storing is continued up to a limit of file registration in an allowable registration area of the subdirectory, the directory hierarchy is returned to the high-order level, in the instant case the root directory, and "02" is displayed as the next file storage position (FIG. 10(C)).

If it is desired to go to a different directory before the subdirectory file registration limit is reached, the directory position may be ascended, to the root directory for instance, by operating the D-UP switch 11d. The designated file is successively switched by operating the UP and DOWN switches 11b and 11c. When a subdirectory is present, it is accessed, and successive directory designation is effected. When no subdirectory is present, however, the root directory files are successively accessed.

While the above description has been concerned with directory or file designation in the recording mode, in the playback mode, image file accessing by the operation of the UP and DOWN switches 11b and 11c and the directory ascending and descending by the operation of the D-UP and D-DOWN switches 11d and 11e are effected likewise.

The subdirectory position is not limited to the above two hierarchical levels, but it is possible to shift the access position to hierarchically lower-order subdirectories.

Figure 11A:
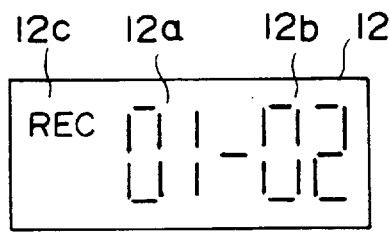
FIG. 11 shows exemplified displays on the LCD in FIG. 1.
Figure 11C:
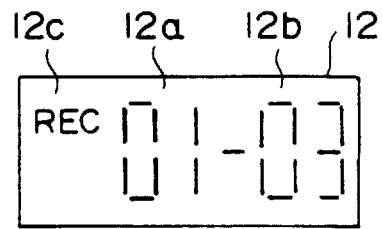
Figure 11B:
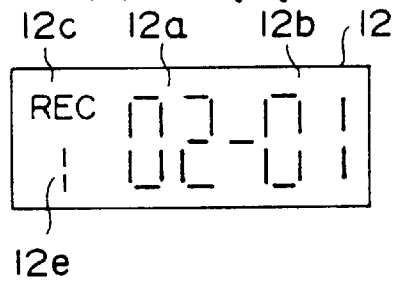

FIG. 11(A) shows the LCD display 12 displaying a hierarchically second level subdirectory registered in the root directory. In this state, "01" indicates a subdirectory produced in the root directory, and "02" indicates the hierarchically second level directory in that subdirectory. When the D-DOWN switch 11e is operated in this state, the directory position is descended as shown in FIG. 11(B). At this instance, the previous display "02" of the hierarchically second level is shifted to the first display section 12a, and "01" is newly displayed to indicate the first file in a new hierarchically third level subdirectory. At this time, the previous display "01" on the first display section 12a, indicating the designated position of the root directory, vanishes. However, "1" is displayed in the display section 12e to permit confirmation of the presence of one concealed hierarchical level. By subsequently effecting directory return to high-order level by operating the D-UP switch 11d, "01", indicating the subdirectory name in the root directory, is displayed in the first display section 12a, while in the second display section 12b the hierarchically second level subdirectory file access position is incremented by one to display the file name of "03" (FIG. 11(C)).

The plural hierarchical level directory display can be made easier to observe by increasing the number of digits in the display sections.

While in the embodiment numbers are displayed to indicate file or directory names, it is possible to display alphabet letters as well. Further, it is possible to use dot matrix LCDs for display sections and display alphabet letters or Japanese characters thereon.

Now, the operations of storing and reproduction of this embodiment of the SMC having the above construction under hierarchical directory image data file management will be described with reference to the flow charts of FIGS. 12 to 18.

Figure 12:
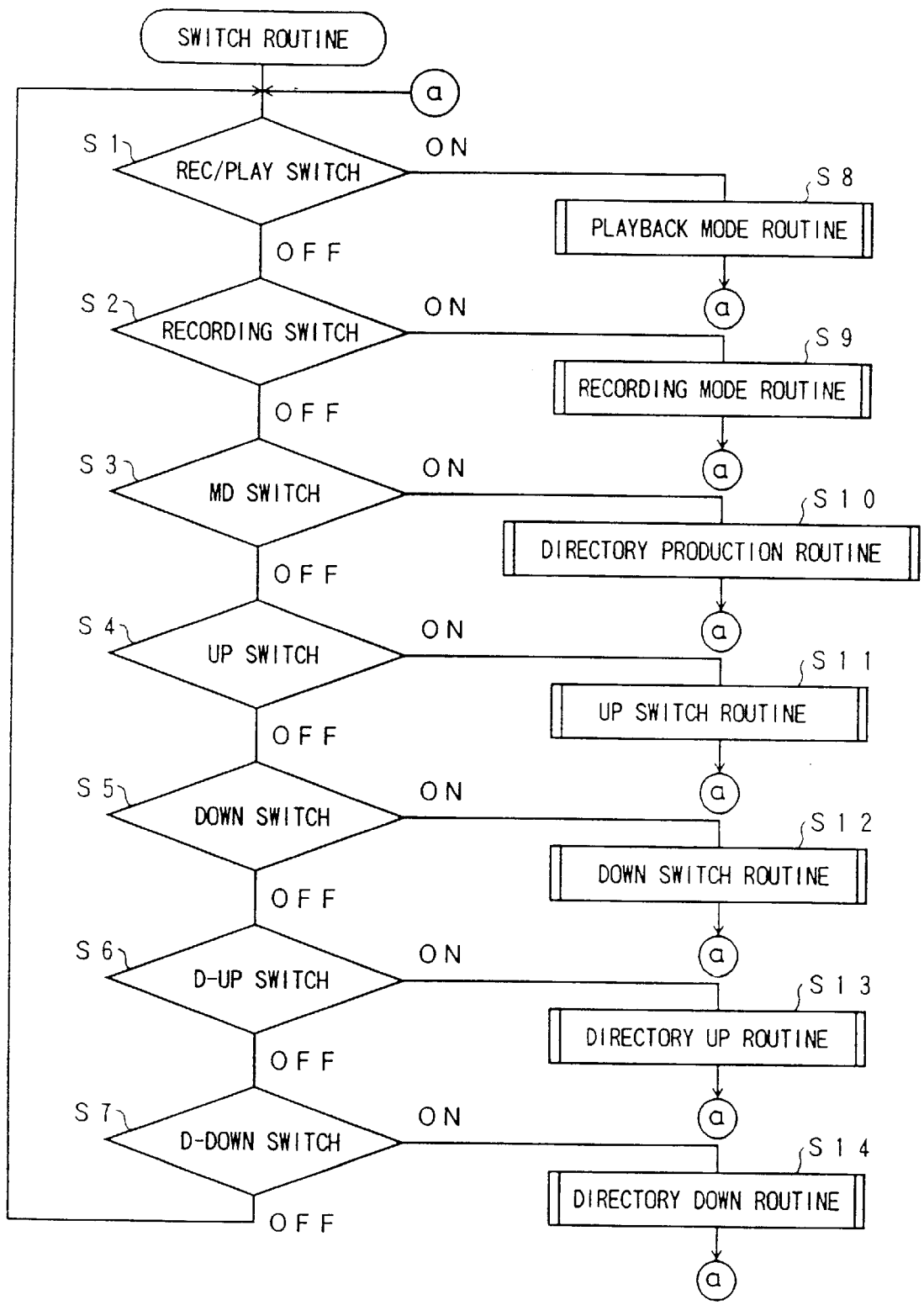
FIG. 12 shows a flow chart of switch routine by the switch operation of an SMC according to the present invention.

FIG. 12 shows a flow chart of a "switch routine". In this routine, the switches 11, recording switch 25, etc. are operated to produce the image data file management directories or access image data files by utilizing the directory information for the execution of storing or reproduction. In a step S1, a check is made as to whether the REC/PLAY switch 11a is "on" or "off". If it is found that the switching is "on" and the playback mode is selected, the routine jumps to a step S8 to call a "playback mode routine", which is a subroutine for reproducing the accessed image data file. If the switch is "off", the routine goes to a step S2 to check whether the recording switch 25 is "on" of "off". If the switch is found to be "on", it is determined that a pick-up instruction is provided, and the routine jumps to a step S9 to call a "recording mode routine", a subroutine for the pick-up. If the switch is "off", the routine goes to a step S3.

In the step S3, a check is made as to whether the MD switch 11f is "on" or "off". If the switch is found to be "on", it is determined that an instruction for directory production is provided, and the routine jumps to a step S10 to call a "directory production routine" (see FIG. 13), a subroutine to be described later. If the switch is "off", the routine goes to a step S4. In the step S4 a check is made as to whether the UP switch lib is "on" or "off". If it is found that the switch is "on", it is determined that an instruction for incrementing the pertinent directory access position is provided, thus calling a "PU switch routine" (see FIG. 14), a subroutine to be described later. If the switch is "off", the routine goes to a step S5. In the step S5 a check is made as to whether the DOWN switch 11c is "on" or "off". If it is found that the switch is "on", the routine jumps to a step S12 to call a "DOWN switch routine" to be described later. If the switch is "off", the routine goes to a step S6.

In the step S6 a check is made as to whether the D-UP switch 11d is "on" or "off". If it is found that the switch is "on", it is determined that an instruction for ascending the hierarchy for a directory to be accessed is provided, and the routine jumps to a step S13 to call a "directory UP routine" (see FIG. 16), a subroutine to be described later. If the switch is "off", the routine goes to a step S7. In the step S7 a check is made as to whether the D-DOWN switch 11e is "on" or "off". If it is found that the switch is "on", it is determined that an instruction for descending the hierarchy for a directory to be accessed is provided, and the routine jumps to a step S14 to call a "directory DOWN routine", a subroutine to be described later. If the switch is "off", the routine returns to the step S1 and is repeated.

Figure 13:
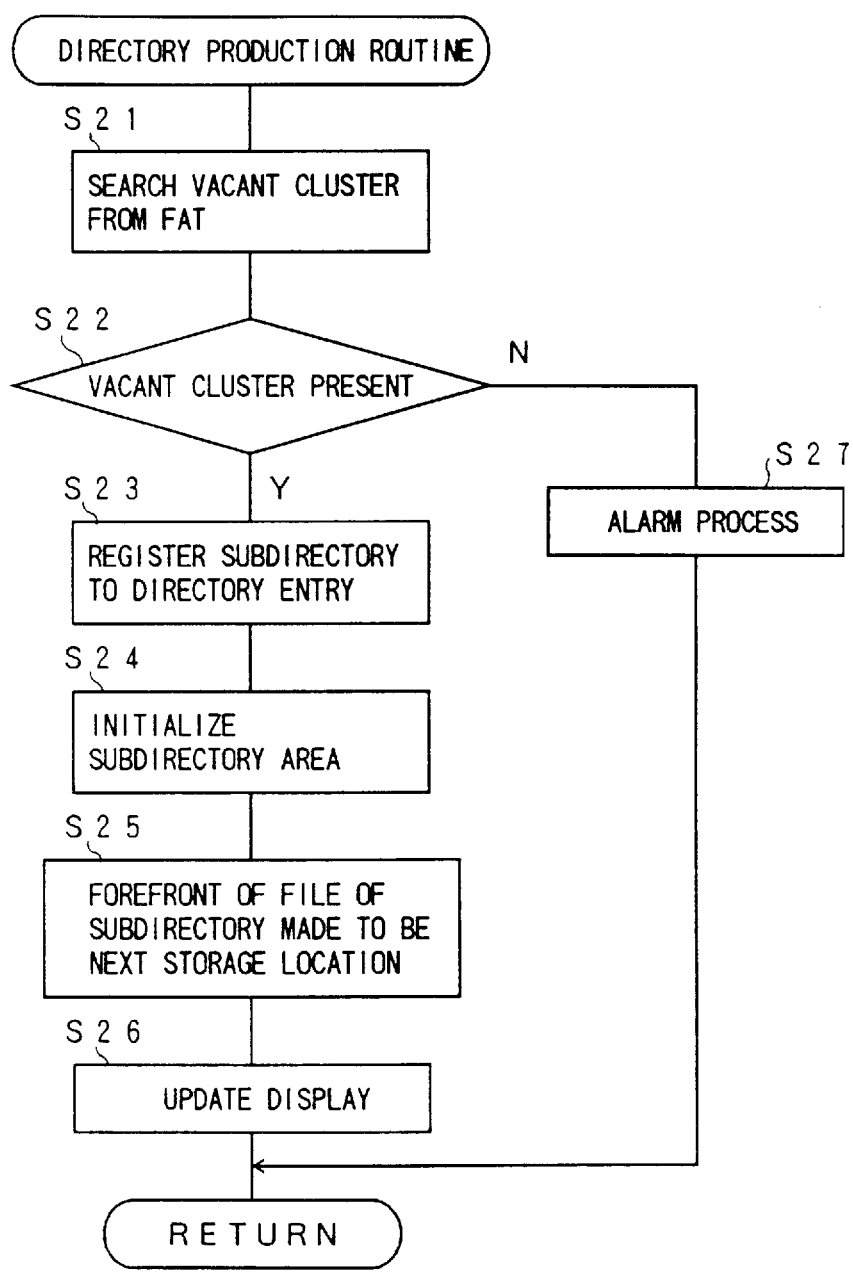
FIG. 13 shows a flow chart of subroutine "directory producing routine" called by the "switch routine" of FIG. 12.

FIG. 13 shows a flow chart of the "directory production routine" as the subroutine noted above. In this routine, in a first step S21 a vacant (empty) storage area, i.e., a vacant cluster, is searched from the FAT in the memory card 14, and in a step S22 a check is made as to whether a vacant cluster is present. If there is no vacant cluster, the routine jumps to a step S27 to generate an alarm such as flashing of the display 12, thus bringing an end to this routine. If a vacant cluster is found, the routine goes to a step S23 to write the subdirectory information in the pertinent directory entry and then to step S24 to initialize the subdirectory area. At this time, code "0" is written in a header portion of file directory entry. Then, in a step S25 the forefront file of the subdirectory thus produced is made to be the next storage position. In a subsequent step S26 the display of the directory name and file name on the display 12 are updated, thus bringing an end to this routine.

Figure 14:
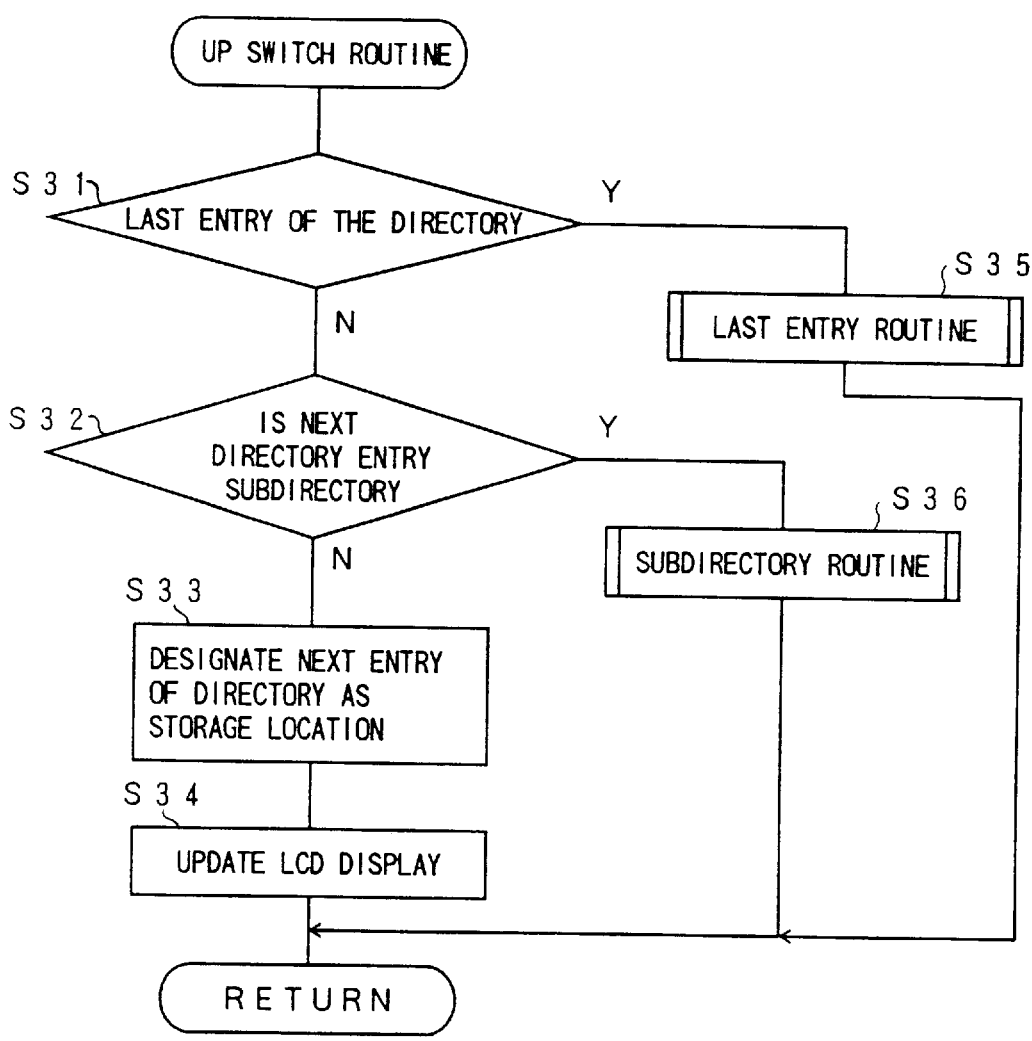
FIG. 14 shows a flow chart of subroutine "UP switch routine" called by the "switch routine" of FIG. 12.

FIG. 14 shows a flow chart of the "UP switch routine" as the subroutine noted above. In this routine, in a first step S31 a check is made as to whether the prevailing directory is the last entry. If the directory is the last entry, no file can be registered in the pertinent subdirectory, and thus the routine jumps to a step S35 to execute a "last entry routine" (see FIG. 15), a subroutine to be described later. If the directory is not the last entry, the routine goes to a step S32 to check whether the next directory entry attribute represents a subdirectory. If so, the routine goes to a step S36 to call a "subdirectory routine" (see FIG. 17), a subroutine to be described later. Otherwise, the attribute represents a image data file, and the routine goes to a step S33 to designate the next directory entry as a storage position (a storage frame position). Then, in a step S34 the display on the LCD display 12 is updated, thus bringing an end to this routine. While this routine is concerned with the recording mode, a similar routine is executed in the playback mode. The "DOWN switch routine" as the above subroutine is executed in the inverse access direction with respect to the above "UP switch routine".

Figure 15:
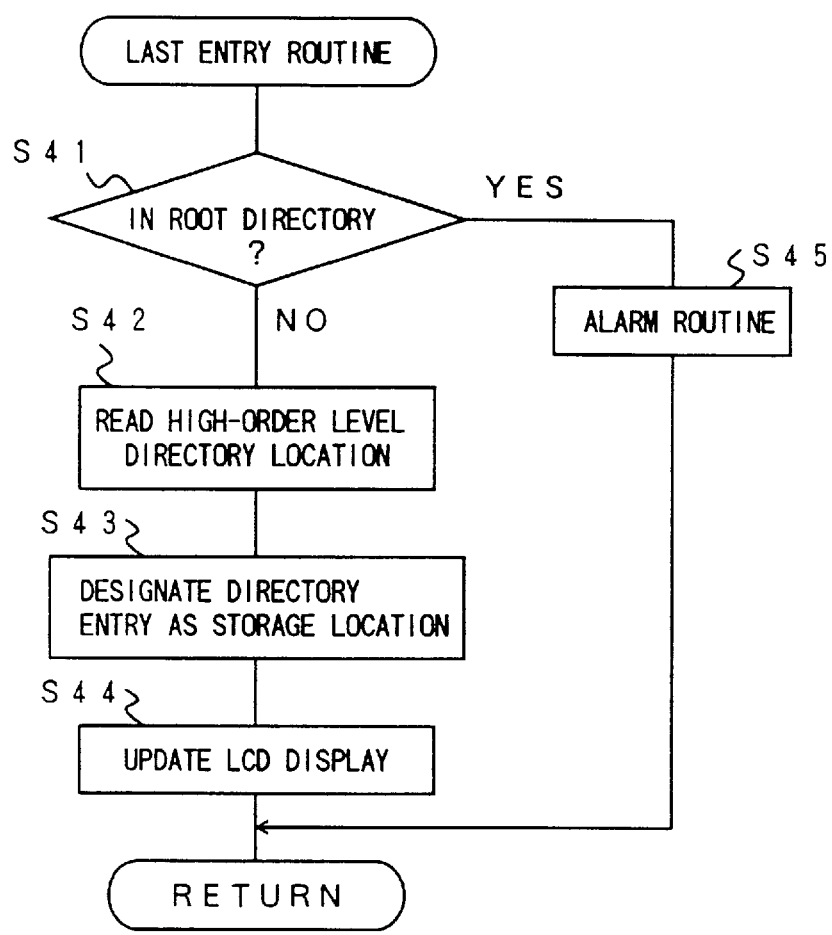
FIG. 15 shows a flow chart of the subroutine "final entry routine" called by the "UP switch routine" of FIG. 14.

FIG. 15 is a flow chart of the "last entry routine" as the above subroutine. In this routine, in a first step S41 a check is made as to whether the prevailing storage position is in the root directory. If the position is in the root directory, the routine jumps to a step S45 to generate an alarm, thus bringing an end to this routine. If the position is not in the root directory, the routine goes to a step S42 to read out a high-order level directory pointer for switching over to a hierarchically high-order level directory. In a subsequent step S43 switching over to the high-order level directory is performed, and the file shown by the next directory entry to the switched directory is designated as the file to be stored. Then, in a step S44 the display on the LCD display 12 is updated, thus bringing an end to this routine. While this subroutine was the "UP switch routine" in the recording mode, a similar routine is executed in the playback mode.

Figure 16:
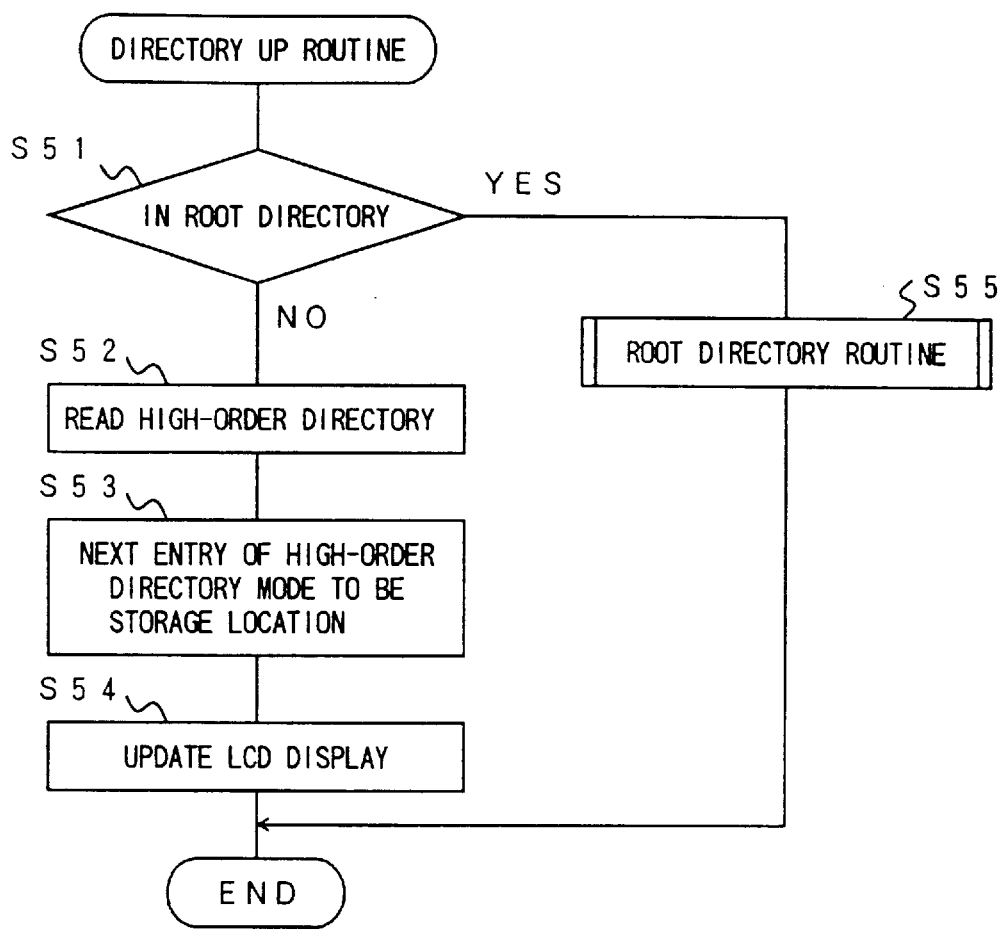
FIG. 16 shows a flow chart of the subroutine "directory UP routine" called by the "switch routine" of FIG. 12.

FIG. 16 shows the "directory UP routine" as the subroutine noted above. In this routine, in a first step S51 a check is made as to whether the prevailing directory is the root directory. If so, the routine jumps to a step S55 to call a "root directory routine" (see FIG. 18), which is a subroutine to be described later. If the prevailing directory is not the root directory, the routine goes to a step S52 to read out a high-order level directory pointer for switching over to a hierarchically high-order level directory. Then, in a step S54 the display on the LCD display 12 is updated, thus bringing an end to this subroutine. While this subroutine was the "directory UP routine" in the recording mode, a similar routine is executed in the playback mode. The "directory DOWN routine" noted above is similar to the "directory UP routine". In this case, switch-down to low-order level directory is effected.

Figure 17:
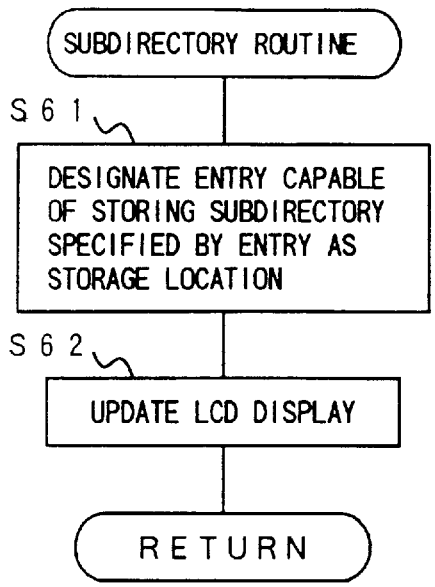
FIG. 17 shows a flow chart of the subroutine "subdirectory routine" called by the "UP switch routine" of FIG. 14.

FIG. 17 is a flow chart of the "subdirectory routine" as the subroutine noted above. In this routine, in a first step S61 an entry capable of storing the subdirectory designated by the directory entry is designated as the storage position. In a subsequent step S62 the display on the LCD display is updated, thus bringing an end to this subroutine.

Figure 18:
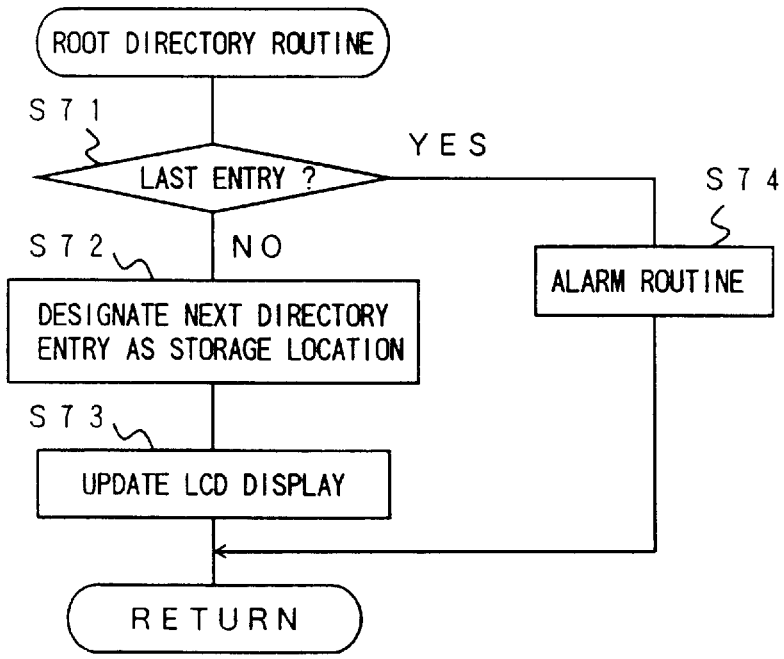
FIG. 18 shows a flow chart of the subroutine "root directory routine" called by the "directory UP routine" of FIG. 16.

FIG. 18 is a flow chart of the "root directory routine" as the subroutine noted above. In this routine, in a first step S71 a check is made as to whether the prevailing directory is the last entry. If so, no file can be registered in the pertinent subdirectory, and the routine jumps to a step S74 to generate an alarm, thus bringing an end to this routine. If the prevailing directory is not the last entry, the routine goes to a step S72 to designate the next directory entry as the storage position (storage frame position). Then, in a step S73 the display on the LCD display 12 is updated, thus bringing an end to this routine.

Concerning whether the memory card 14 in FIG. 2 is initialized or formatted or not, it is possible to check this when inserting the card and, if the card is not initialized or formatted yet, cause display of this fact on the display 12 while formatting the card 14 by operating a DOS initializing or formatting switch 11g or a DSC (digital still camera) initializing or formatting switch 11h.

Figure 19:
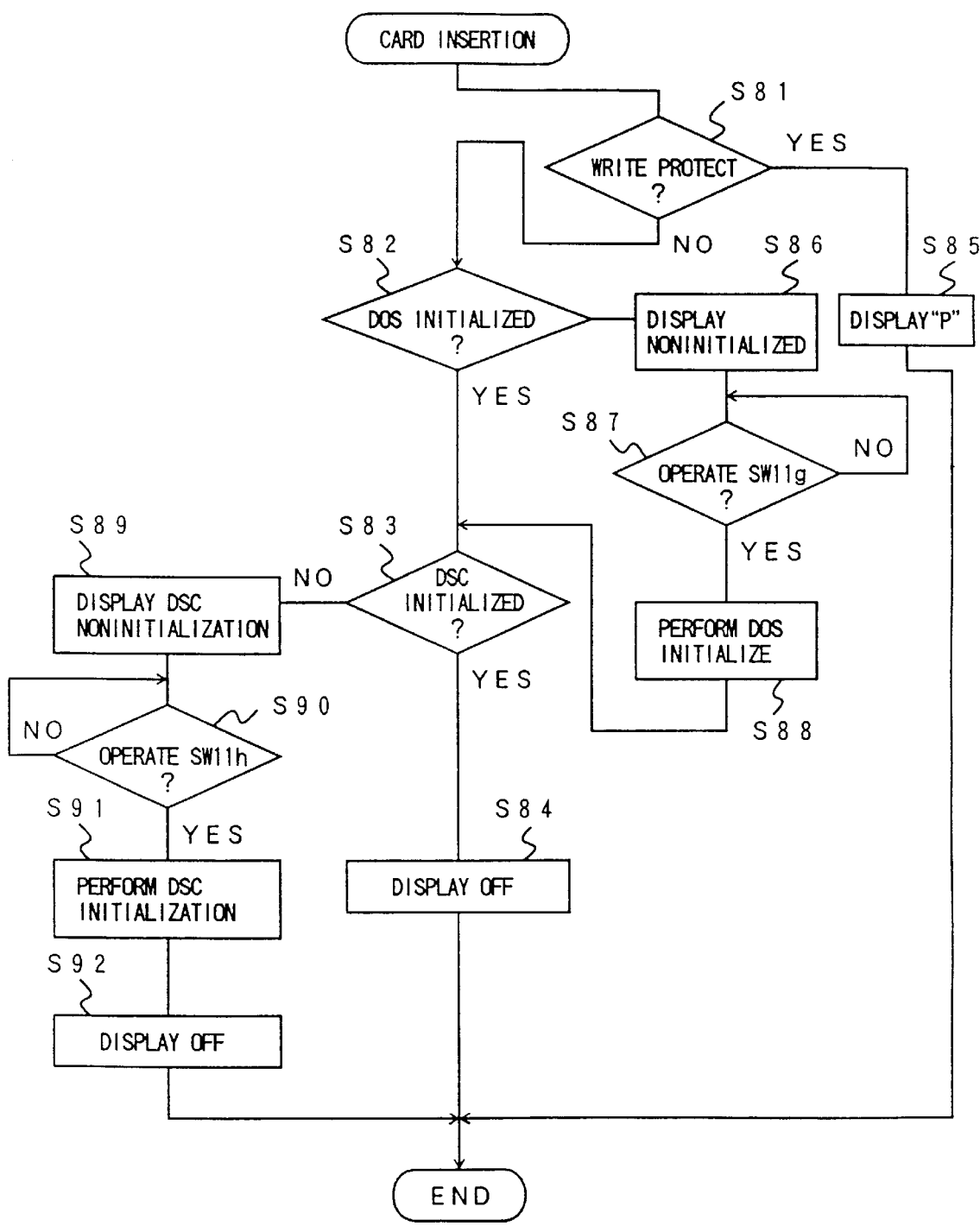
FIG. 19 shows a flow chart of a second embodiment of the present invention.
Figure 20:
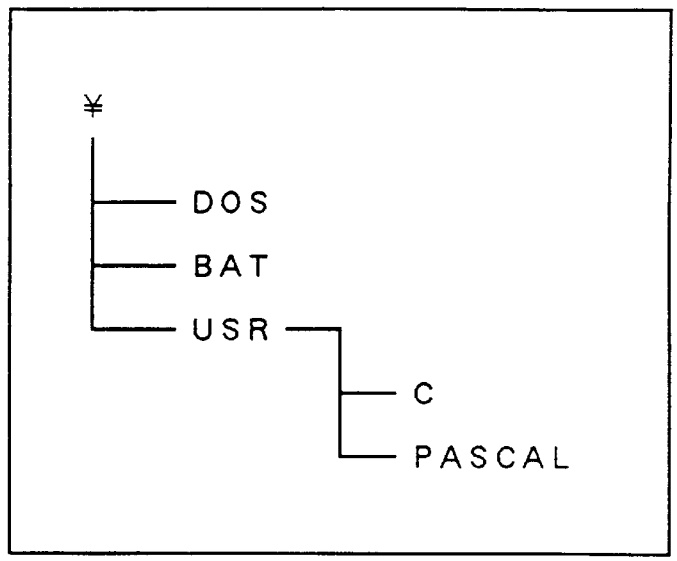
FIG. 20 shows an example of the tree organization for a conventional DOS file system.

Referring to FIG. 19, when inserting the card, a check is made as to whether there is no write protection (step S81). If there is no write protection, it is checked whether the card is DOS initialized or formatted and DSC initialized or formatted (steps S82 and S83). If both kinds of formatting are present, the display is turned off, thus bringing an end to the routine.

If write protection is present, a "P" display is made on display 12 (step S85). If DOS initializing (formatting) has not been made, a non-format display is made on the display 12 (step S86), and the depression of the switch 11g is awaited (step S87). When the switch is depressed, DOS formatting is executed, and then the routine goes to a step S83. In the step S83 a check is made as to whether or not the DSC formatting has been made. If not, a non-DOS format display is made on display 12 (step S89). Then, in response to the depression of switch 11h (step S90), the DSC formatting is executed (step S91), and the display is turned off (step S92).

As has been shown, the above embodiment of the SMC permits image data file classification and rearrangement with the DOS FAT system and subdirectory organization, thus permitting image data file directory processing on the result of the classification and rearrangement with a limited number of switches and a display having few digits, capable of being mounted on the camera, and by making use of the merits of the tree display. For example, it is possible to produce subdirectories classified for each theme such as a picture-taking trip and a sports meeting. Also, it is possible to make successively picked-up image data files distinct from other general image data files. Further, it is possible to know the registration status of the files with the above limited number of switches and the display of few digits. These effects are comparable with the effects of the tree display.

Further, it is possible to subject the memory card directory information of the above embodiment of the SMC to hierarchical directory processing in a personal computer by inputting the information thereto.

Figure 21A:
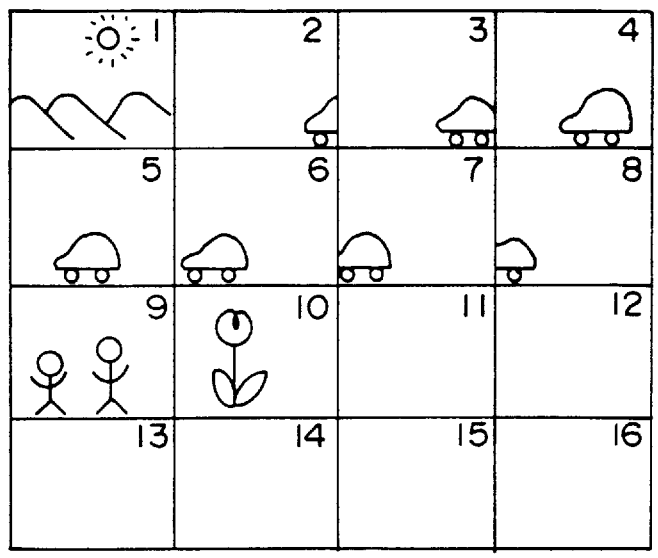
FIG. 21 shows a drawing for explaining the second embodiment.
Figure 21B:
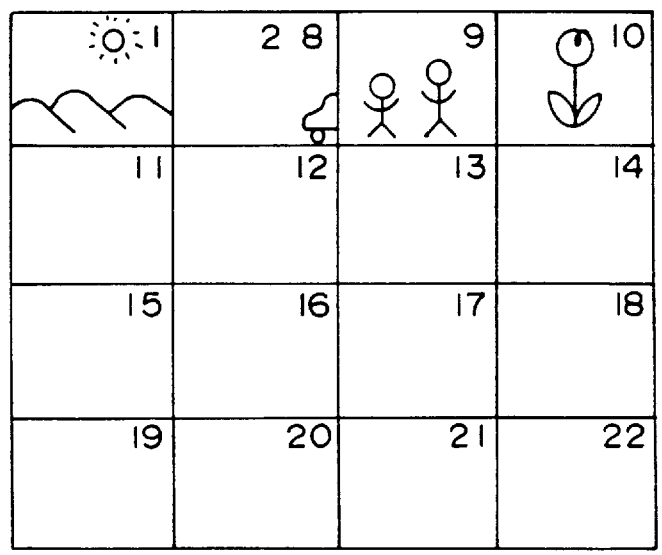

According to the invention, to increase the stored image data retrieval efficiency for a group of data in a predetermined relation to one another such as those stored by successive storage, for instance, data in sections 2 to 8 in the multi-section display shown in FIG. 21(A), only a single frame is displayed typically for the retrieval as shown in FIG. 21(B). It is possible to define the way of relating data into a group variously (the way being hereinafter referred to as grouping), for instance, one concerning pick-up in a series or succession and one concerning a series of interval pick-ups. The grouping itself is possible either automatically or by a suitable operation at the time of the storing or the reproduction of the data as the subject of the retrieval. Some relevant embodiments will be described hereinafter. The hardware is common to the individual embodiments, and it will first be described in conjunction with an IC memory card camera, to which the invention is applied, with reference to the block diagram of FIG. 22.

Figure 22:
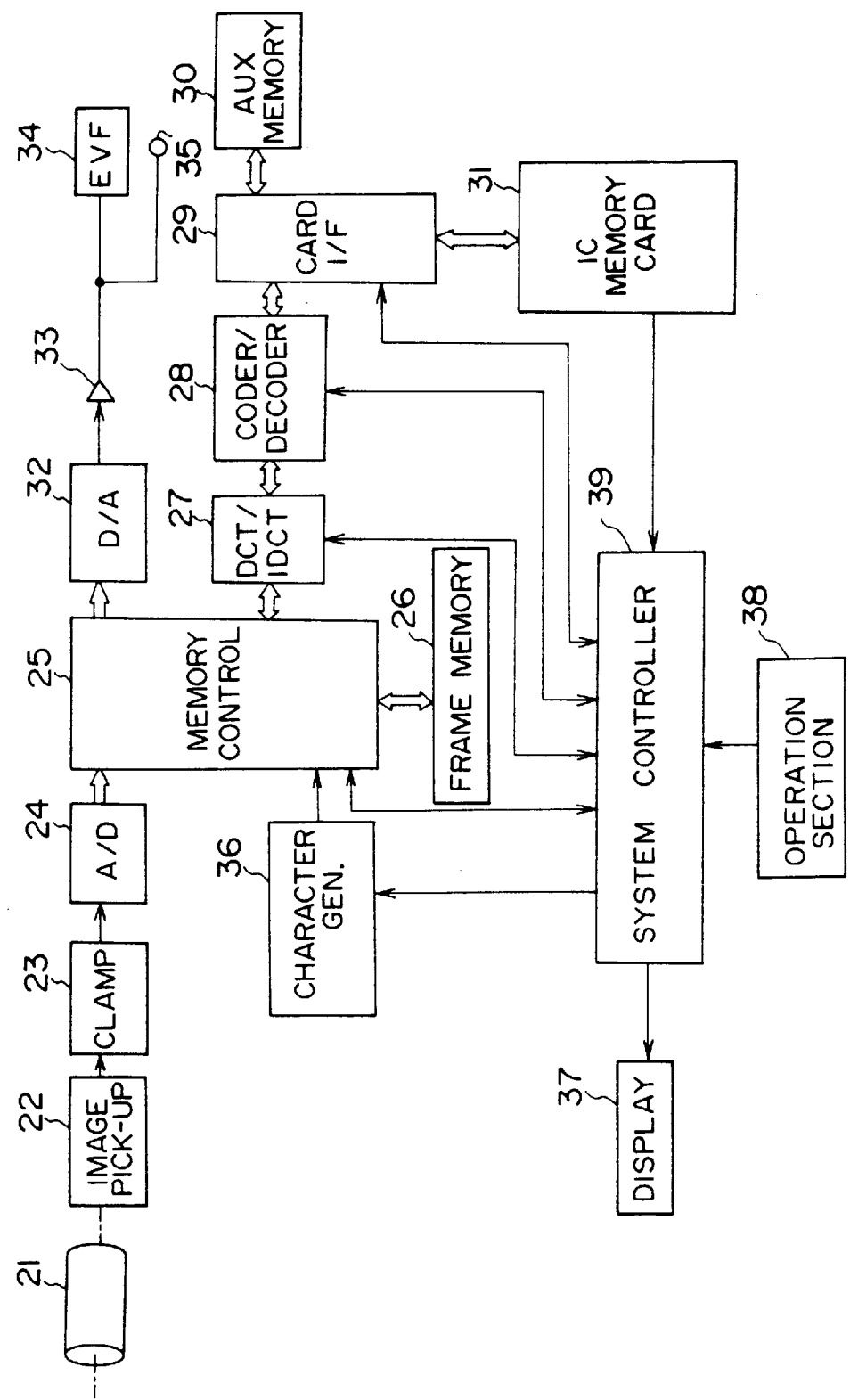
FIG. 22 shows a block diagram of the embodiment of FIG. 21.

Referring to FIG. 22, when a recording mode of the camera is set, a subject image transmitted through an optical system 21 is photo-electrically converted in an imaging system 22 comprising CCDs or the like into an electric signal. The electric signal is clamped in a clamping circuit 23 to a constant DC level and then converted in an A/D (analog-to-digital) converter 24 into a digital signal. The digital signal is coupled through a memory control circuit 25 and written in a frame memory 26.

When all the digital signals as image data are written in the frame memory 26, they are read out therefrom by the memory control circuit 25 to be fed to a DCT (discrete cosine transform)/IDCT (inverse discrete cosine transform) circuit 27 for conversion necessary for data compression and then fed to a coder/decoder 28. The coder/decoder 28 compresses the data by using an auxiliary memory 30 through a card I/F circuit 29 and writes the compressed data in an IC memory card 31.

Now, a case when a playback mode of the camera is set will be described. In this mode, data read out from the IC card 31 is coupled through the card I/F circuit 29 to the coder/decoder 28 for decompression. The decompressed data from the coder/decoder 28 is inversely DCT processed in the DCT/IDCT circuit 27 and then written in the frame memory 26 through the memory control circuit 25. When the decompression of all the data is complete, data is now read out from the frame memory 32 by the memory control circuit 25 to be converted in a D/A (digital-to-analog) converter 32 into an analog signal, which is coupled through a 75 Ω (ohm) driver 33 to an EVF (electronic viewfinder) 34 for image reproduction. The output of the driver 33 is also fed to an external output terminal 35. Further, a character generator 36 performs display of date, time, etc. on a screen. The hardware further comprises a display 37 for displaying various operation modes, an operation unit 38 for causing various operations, and a system controller 39 for controlling the above various constituent elements.

Figure 23A:
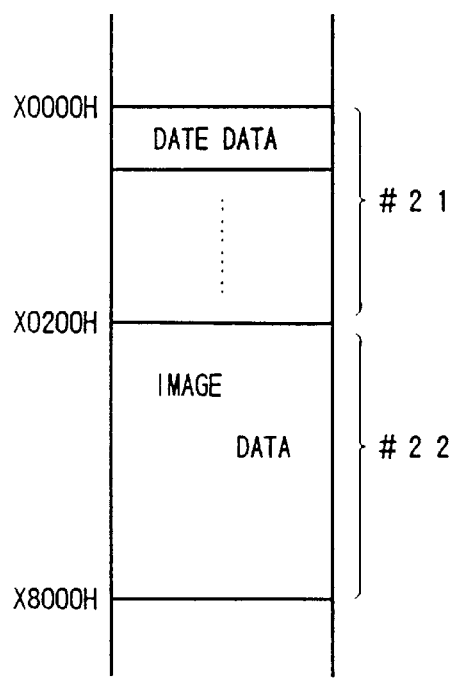
FIG. 23 shows a storage region of the IC card memory.

It has been known to store dates and like data in a storage area of the IC memory card 14 in a header separate from the intrinsic image data storage area 22, as shown in FIG. 23(A). For example, where 32 kB of data is stored in one pick-up, 512 bytes in the 32 kB is allocated as a header section 21 to various records of information. A plurality of such data storage areas are formed in one IC memory card.

Figure 23B:
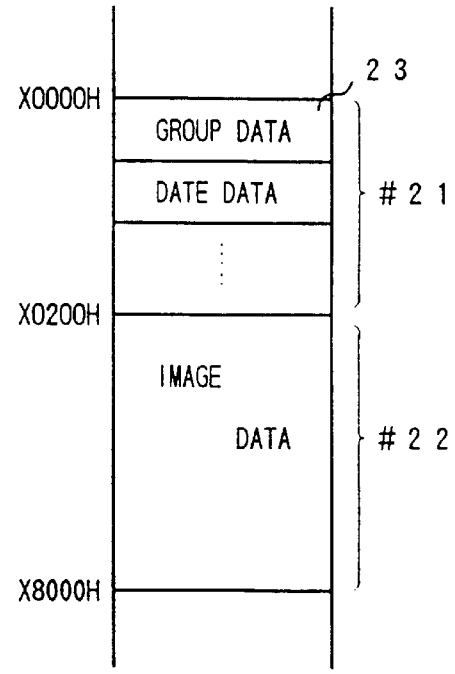

It is now assumed that group information 23 as shown in FIG. 23(B) is newly stored in the header section 21 in addition to conventional date and other record information. It may be considered that the group information is indicative of whether data is group data or independent data and, in the case of group data, the serial number of the data in the group. This will now be described with reference to FIG. 24.

Figure 24:
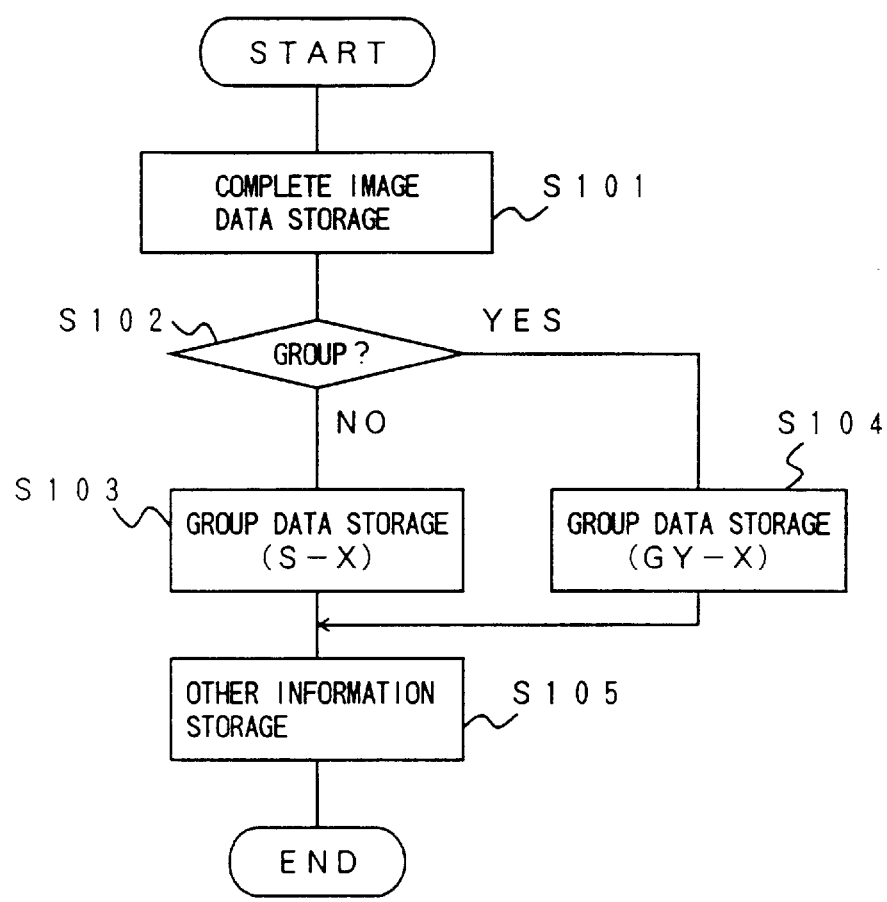
FIG. 24 shows a flowchart of the write operation to the group data display region.

FIG. 24 is a flow chart of the operation of storing the group information 23, centered on the interface with the IC memory card. When the storing of image data after pick-up is done (step S101), a judgment is made as to whether the data is to be stored such as to be recognized as group data in a retrieval or it is to be stored as independent data (step S102). If the data is to be stored as group data, it is stored as, for instance, "GY-X", indicating X-th data in Y-th group (step S104). If the data is to be stored as independent data for display for retrieval, it is stored as, for instance, "S-X", indicating X-th independent data, in the group information display area 23. After the group information 23, date and other necessary records are stored in the header section 21 (step S105), thus completing the recording of one set of data.

In the above embodiment, an area for storing information as to whether the image data to be stored is independent data or group data is provided in the header section in the IC memory card, and information indicative of group data is stored as, for instance, "GY-X" in that area. Thus, when displaying the stored image data for retrieval by the multi-section display, only a typical image (or only a plurality of typical images) can be displayed automatically. Thus, greater image data stored can be displayed for retrieval in a limited retrieval display screen, thus improving the efficiency of the retrieval.

Figure 25:
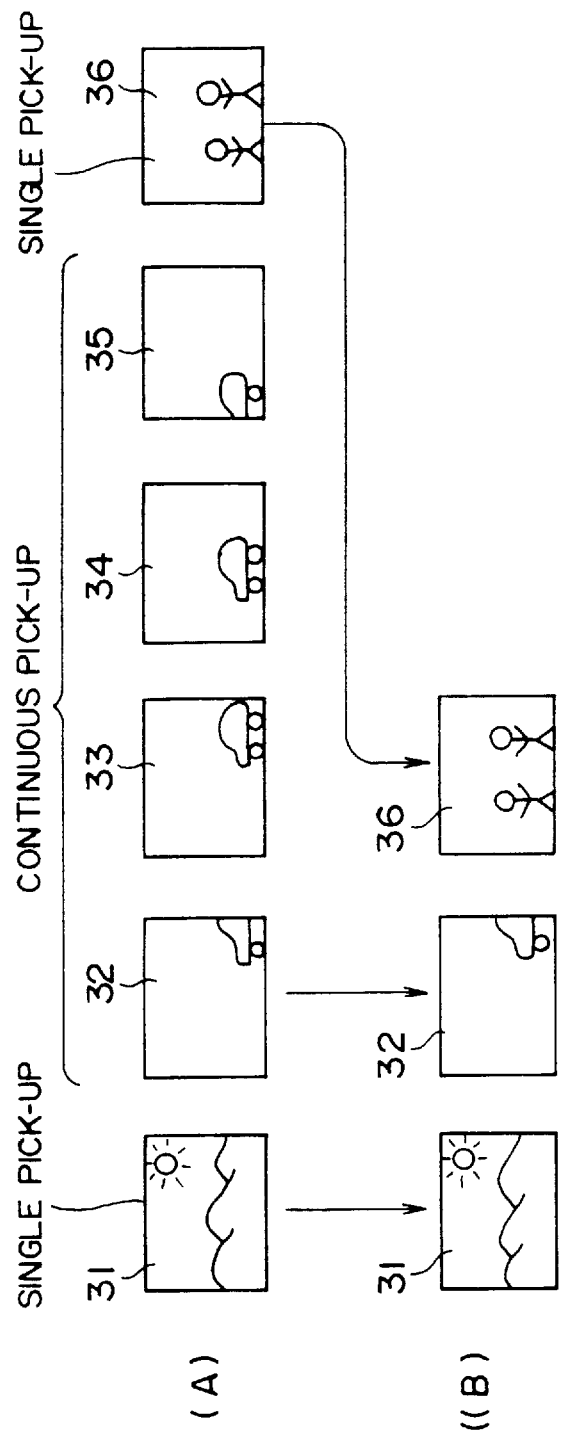
FIG. 25 shows an interval reproduction.

While the above description concerned multi-section display of the image data for retrieval, similar display can be applied to the interval reproduction shown in FIG. 25(A). More specifically, for records 32 to 35 obtained in a successive pick-up mode, only the record 32 is displayed typically before the next independent record 36 for retrieval, as shown in FIG. 25(B). In this way, the efficiency of the retrieval can be improved. The display for retrieval in the interval playback mode as shown in FIG. 25(B) is a modification of the embodiment.

While the above case concerned image data stored in the successive pick-up mode, it is also possible to group image data in dependence on the pick-up date. That is, the image data of the same pick-up date may be grouped, and only typical image data in the group may be displayed on a monitor for retrieval, permitting improvement of the efficiency of retrieval depending on the date. It is possible to utilize this method of retrieval when using the image data as an electronic album or the like. Further, it is possible to realize grouping by a manual operation. For example, grouping with respect to a particular person is possible by displaying typical image data concerning a particular person for retrieval, and thereby, the retrieval efficiency can be improved. The grouping is usually made by manual operation after the image data have been stored. However, it is possible to arrange the data such that a grouping of all image data is obtained subsequent to the operation of an operating unit when such a unit is operated in the recording mode and the grouping is released by operating the operating unit once again. This arrangement is a modification of the embodiment.

In a further modification, the header section 21 (see FIG. 23) does not include the group information storage area 23, and in reproduction the system controller 19 (see FIG. 22) effects grouping software-wise by interpreting the image data and header information which are stored in the conventional way. In this case, the group information storage area 23 can be dispensed with, and also it is possible to improve the freedom of the grouping. Further, a desired grouping can be obtained in the reproduction without the need of intending any grouping when storing data. It is thus possible to improve the retrieval efficiency.

The use of the header section 21 (see FIG. 23) for grouping is shown in detail as group information 27. It is further possible to effect grouping with file names in the "root directory" in memory management area.

When effecting the grouping with the root directory, it is possible to use file names (extender names) and subdirectories.

While the above description concerned with the IC memory card camera, it is more effective to use opto-magnetic disks or like large capacity storage media in lieu of the IC memory card 14. Further, the invention is not limited to cameras but can of course be applied broadly for information retrieval in general systems for storing and reproducing data.

Now, a further embodiment will be described with reference to the flow chart of FIG. 26. In this embodiment, predetermined data which are stored in data file area of the storage medium randomly without relation to the sequence of the pick-up, are reproduced at least in the sequence of storage time sections. As the storage time sections, dates of storage are used. Thus, stored data of the same pick-up date may be reproduced in a sequence other than the sequence of the storage time.

Referring to FIG. 26, the system controller 39 (see FIG. 22) checks whether the playback mode is a date sequential playback mode or the normal playback mode (step S111). If the mode is the date sequential playback mode, the system controller 39 reads out the header information indicative of the date from the storage medium such as an IC memory card 14 (step S112), and according to this header information, the sequence of the reproduction is controlled to allow date sequential reproduction (step S113). If it is found in the step S111 that the prevailing mode is the normal playback mode, the reproduction is made conventionally in the sequence of storage in the storage medium (step S114).

The management of predetermined data stored randomly in data file areas in the storage medium in the date sequential playback mode will be described with reference to FIG. 27. When the sequence of storage in the storage medium is random and without relation to the pick-up sequence as shown in FIG. 27(A), the system controller 19 reads out the date information and rearranges the sequence of reproduction such as to conform to the date sequence as shown in FIG. 27(B).

In this embodiment, a plurality of records of predetermined image data which are stored randomly and independently of the pick-up sequence in the data file areas of the storage medium can be reproduced in the storage time section sequence, i.e., the date sequence. This means that even with randomly stored data there is no need of being conscious about the storage sequence in reproduction when editing enormous amounts of data that may be produced on an increased capacity storage media. This invention is thus convenient in case of electronic albums or the like.

In the above embodiment where a plurality of records of predetermined data stored randomly in a storage medium may be reproduced such that they are rearranged automatically in the date sequence, it is impossible to recognize the storage date of each reproduced image. As a modification of the embodiment, means for displaying the pick-up date of the reproduced image series on a reproduction screen when the date is changed will be described with reference to FIGS. 28 and 29. The hardware construction of this modification is the same as that of the embodiment shown in FIG. 22, and it is not described.

Figure 28:
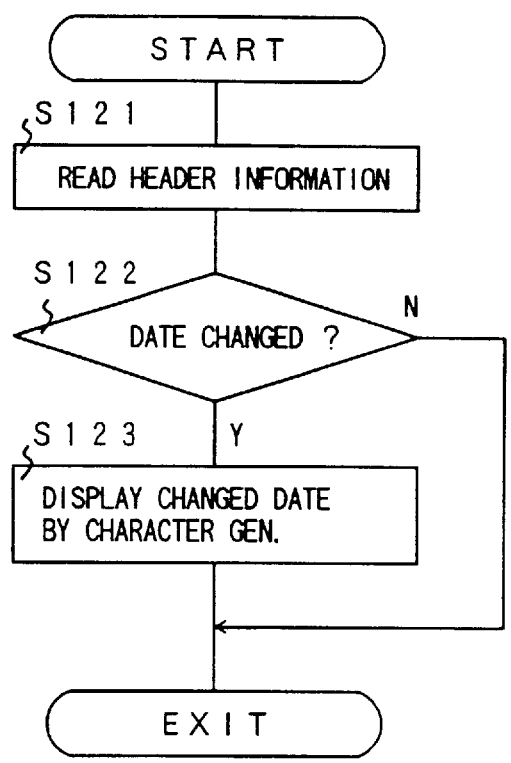
FIG. 28 shows a flow chart of the date display operation of the above embodiment.

FIG. 28 is a flow chart for explaining the operation of the modification. The system controller 39 reads out the header information indicative of the pick-up data from the storage medium (step S121) and checks whether the data is changed (step S122). If it is found that the date is changed, the character generator 36 displays the changed date on the reproduction screen (step S123). Otherwise, the routine is ended without any process.

In this modification, whenever the date is changed in the date sequential playback mode, a reproduced frame of the changed pick-up date, such as frames 31 and 34 shown in FIG. 29, can be displayed automatically together with the changed date, such as dates 31a and 34a, on the screen. A reproduced frame without date change, such as frames 32, 33 and 35, is displayed without the date display. Thus, the date change can be noted clearly compared to the case of continually displaying the date with all the displayed frames, thus permitting ready discrimination of the reproduced data. Thus, the date changes in the date sequential playback mode in the electronic album can be made clearer.

As in the conventional technique, it is possible to rearrange the sequence of reproduction without shifting actual image data in data file areas. This is done so by changing the directory entry sequence of the root directory in the IC memory card storage format.

Figures 30A, 30B:
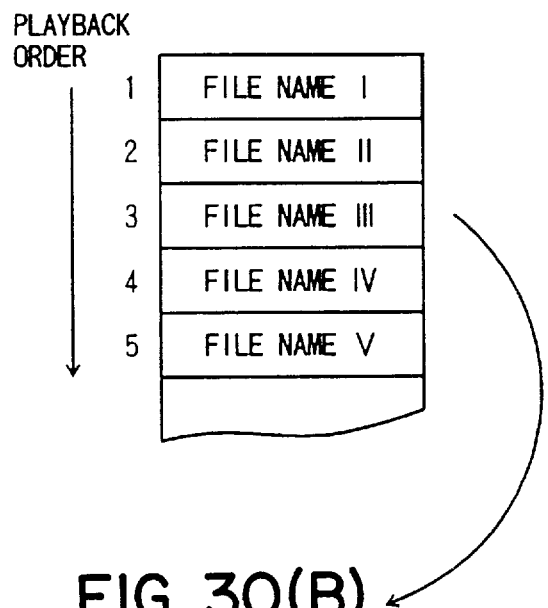
FIG. 30 shows the root directory and entry format in the memory control region of the IC memory card.
Figure 31A:
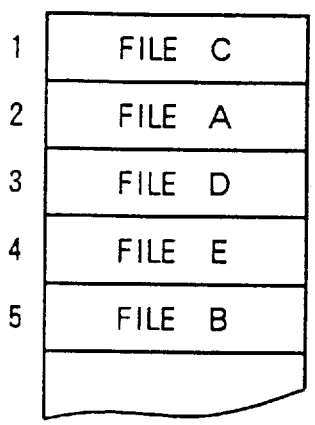
FIG. 31 shows the root directory and data file region in the memory control region of the IC memory card.
Figure 31B:
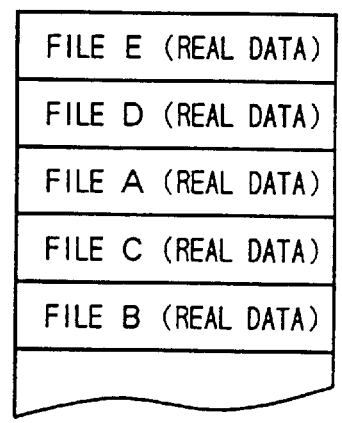

More specifically, where the root directory in the memory management area and its entry format are as shown in FIGS. 30(A) and 30(B), respectively, the reproduction sequence can be managed with the root directory. For example, when the data are stored in the data file areas in the order shown in FIG. 31(B), for reproducing these data in the sequence of C, A, D, E and B, the file names in the root directory may be rearranged to the order as shown in FIG. 31(A).

While in the above case a plurality of randomly stored records of predetermined data are reproduced date sequentially, it is also possible to permit rearrangement of a plurality of records of predetermined data randomly stored at a time in a storage medium into a sequence identical with the pick-up sequence before the reproduction. An embodiment concerning such operation will now be described. The hardware of the embodiment is the same as described before so that it is not described, and only the procedure and operation of the data rearrangement will be described with reference to FIGS. 32 and 33.

FIG. 32 shows the procedure of physically rearranging a plurality of predetermined data records 41 to 45 stored in the date file areas of an IC memory card 31 (see FIG. 22) as storage medium into the sequence noted above by using the auxiliary memory 30. It is assumed that the predetermined data records are stored in the IC memory card 31 in the order of 43, 45, 41, 42 and 44.

First, the data 43 stored in the memory area 31a in the IC memory card 31 is temporarily transferred to the auxiliary memory 30 through the card I/F circuit 9 (as shown by arrow A1). Then, the data 41 stored in area 31c is shifted (as shown by arrow A2). Then, the data 43 temporarily stored in the auxiliary memory 30 is transferred to the area 31c (as shown by arrow A3). As a result, a data arrangement as shown in FIG. 32(B) is obtained in the IC memory card 31.

Likewise, the data 45 and 42 stored in the memory areas 31b and 31d in the IC memory card 31 are interchanged as shown by arrows B1, B2 and B3 in FIG. 32(B), thus obtaining the data arrangement as shown in FIG. 32(C) in the card.

Finally, the data 45 and 44 stored in memory areas 31d and 31e are interchanged as shown by arrows C1, C2 and C3 in FIG. 32(C).

Figure 33:
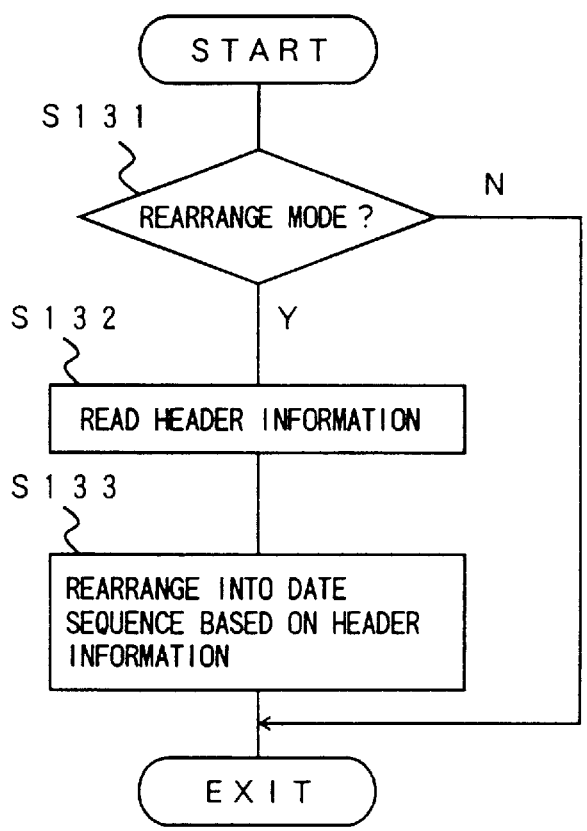
FIG. 33 shows a flowchart of the rearrangement operation shown in FIG. 32.

The operation of the embodiment having the above constitution will now be described with reference to the flow chart of FIG. 33. When the routine is started, prior to the reproducing operation a check is made as to whether the prevailing mode is a mode of rearranging the sequence of storage in the storage medium into the sequence of the pick-up (step S131). If so, the data in the memory are rearranged into the date sequence based on the header information (step S133). If it is found that the mode is not such rearrangement mode, the routine is ended without any further process.

In this embodiment, like the previous embodiment, in the playback mode reproduced pictures are displayed in the sequence of the pick-up. Moreover, since the stored data are rearranged in the storage medium, the stored data can be reproduced in the pick-up sequence even by reproducing them with a different reproducing machine.

While the above embodiments and modifications concern an SMC, this is by no means limitative, and the invention is applicable broadly to general data processing systems.

With the above embodiments and modifications, the sequence of reproduction can be controlled according to the header information, which is stored together with the predetermined image data in the storage medium and is indicative of the data storage time, and thus it is possible to improve the operational control and retrieval efficiency of reproduction.

As shown above, according to the invention a plurality of records of predetermined data stored randomly, i.e., without relation to the pick-up sequence in the data file areas of the storage medium, are reproduced by reading them at least in or after rearranging them into the storage time section sequence. It is thus possible to obtain a pronounced effect of the independence of sequence of reproduction of the image data from the sequence of their storage.

Figure 34:
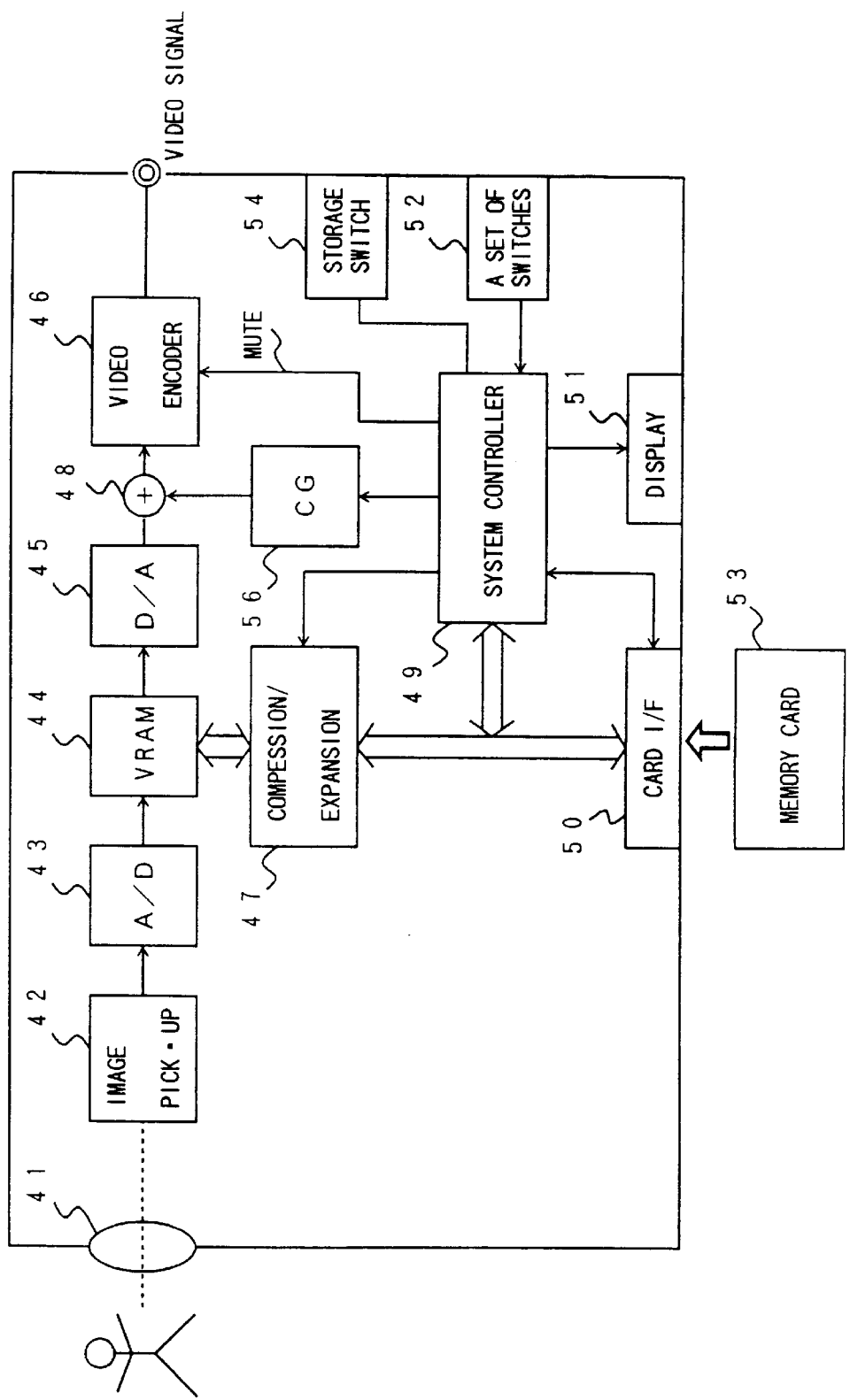
FIG. 34 shows a block diagram of the other embodiment.

FIG. 34 is a block diagram showing a control unit of the SMC as an image data reproducing apparatus embodying the invention. This embodiment of the SMC is used with a memory card 53 as the image data storage medium. In this embodiment, the memory card 53 is initialized or formatted in conformity with the DOS of a prescribed personal computer or the like. The image data picked-up for each picture is stored in the form of a picture unit data file in the memory card 53. The memory card 53 need not be one exclusively used with the SMC, and it may be one which is compatible with the personal computer or the like.

Referring to FIG. 34, in response to the depression of a store switch 54 (see FIG. 35), a pick-up signal is stored in the loaded memory card 53, and in response to the operation of switches 52, stored data in a designated file in the memory card 53 is reproduced and output as a video signal.

In further detail, at the time of the pick-up an object image is focused through a pick-up lens 41 on an image pick-up element such as CCD provided in an image pick-up circuit 42, and the image is output as an image signal to an A/D converter 43. The A/D converter digitally converts the analog input signal to obtain digital image data which is temporarily stored in a RAM 44 serving as an image memory. The digital image data in the RAM 44 is converted by a D/A converter 45 into an analog signal again for a predetermined encoding process in a video encoder 46 to be output as a video signal. When it is judged that the data in a designated file is non-storage area data or data other than image data, the system controller 49 provides a muting signal to cause a muting process in the video encoder 46. At this time, a "blue display" is provided as the screen display. At the same time, an impossible-to-reproduce display is provided on an LCD display 51. When storing the image data in the memory card 53, the image data is read out from the RAM 44 and compressed in a compression/expansion circuit 47 by a JPEG (Joint Photographic Expert Group) system or the like, and then fed to the card I/F 50 through a bus. Thus, the compressed data is written in a designated area in the memory card 53.

In reproduction, the picked-up frame number is designated by operating switches 52 to be described later. The frame number or file number and so forth are displayed on the LCD display 51. According to the designation, a memory area in the memory card 53 is selected, and the corresponding image data is read out through the card I/F 50 and input to the compression/expansion circuit 47 through the bus for expansion. The expanded image data is stored in the RAM 44. The stored image data is then read out from the RAM 44 and converted by the D/A converter 45 into an analog signal. When displaying characters in superimposition, the character data is superimposed on the image data in an adder 48 through a character generator 56, and the superimposed data is input to the video encoder 46. The video encoder 46 encodes the input data to output a video signal.

The system controller 49 supplies predetermined control signals to various parts of the SMC according to the instructions from the switches 52. The SMC further comprises a file attribute identifier, or discriminator for discriminating whether the stored data in the data file in the designated image data area is image data or non-image data. According to the result of the discrimination, a control signal is output to the LCD display 51 for the impossible-to-reproduce display.

Figure 35:
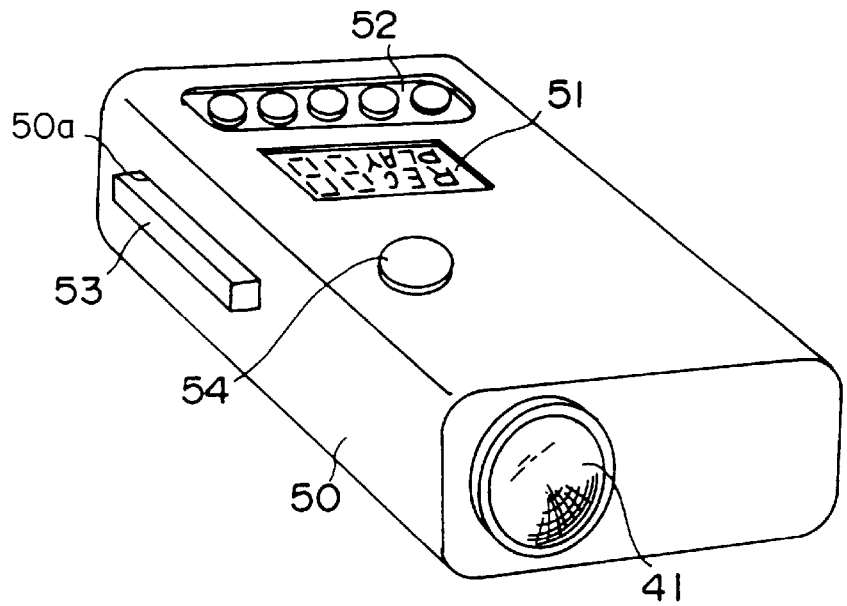
FIG. 35 shows a perspective view of the embodiment in FIG. 34.

In this embodiment of the SMC, as shown in the perspective view of FIG. 35, the pick-up lens 41 is provided on the front face of the camera casing 50. One side of the camera casing has a card insertion slot 50a, through which the memory card 53 is inserted and removed. The top of the camera casing 50 has a store switch 54 serving as a shutter release switch. On a rear portion of the top of the camera casing 50 are provided a set of switches 52 for storing and reproducing operations and also the LCD display 51 as display means for displaying recording/playback mode, alarms such as non-data storage or impossible-to-reproduce alarms, and storing/reproducing frame number.

Figure 36:
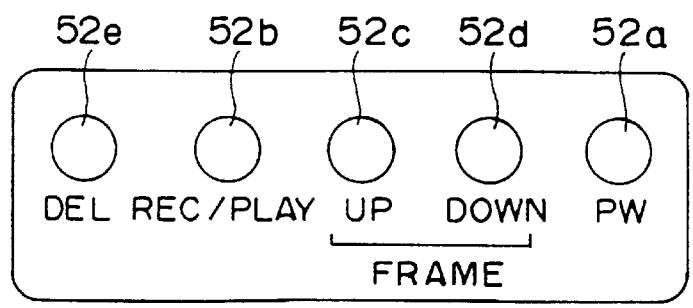
FIG. 36 shows a plan view of a set of switches of FIG. 34.
Figure 37:
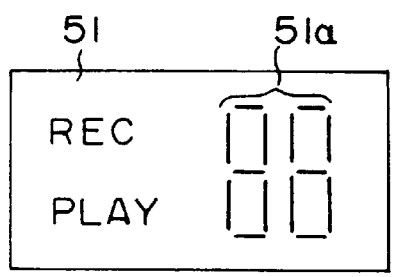
FIG. 37 shows a plan view of the LCD display of FIG. 34.

FIG. 36 shows the arrangement of the set of switches 52. The switch set comprises a PW switch 52a for turning the power on and off, a REC/PLAY switch 52b for switching the recording and playback modes, an UP switch 52c for one-by-one up-shifting the number of the frame for recording or reproduction, a DOWN switch 52d for one-by-one down-shifting likewise, and a DEL switch 52e for deleting stored image data. The REC/PLAY switch 52b is a single switch, and it toggles the recording/playback mode whenever it is depressed. The LCD display 51, as shown in FIG. 37, indicates either one of the recording and playback modes "REC" and "PLAY" that is selected. It also has a two-digit, seven-segment display section 51a for displaying the frame number of the image data being processed or such alarm as non-storage or impossible-to-reproduce alarm.

The operation of the storing and reproducing routines in this embodiment of the SMC having the above construction will be described with reference to the flow charts of FIGS. 38 to 41.

Figure 38:
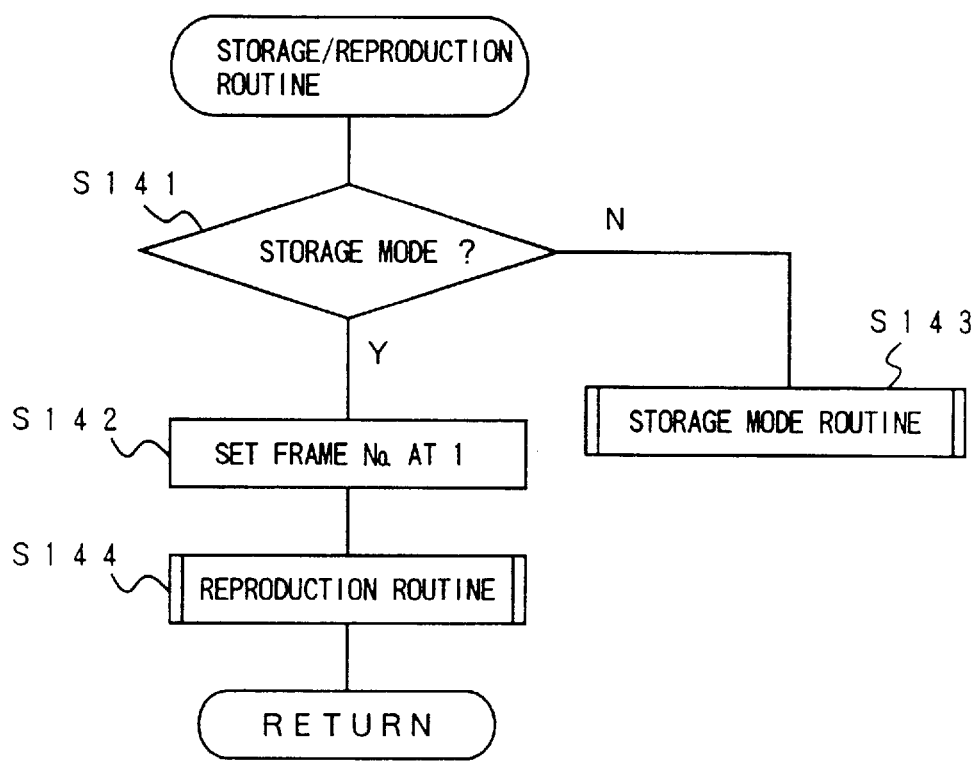
FIG. 38 shows a flow chart of the subroutine "write/reproduction routine" in FIG. 34.

FIG. 38 is a flow chart of the "storing/reproduction routine". This routine is called with the power switch "on", with the memory card 53 loaded in the camera and with the REC/PLAY switch 52b depressed. In a first step S141 the switch state prior to the operation is checked. If it is found that there was no recording mode prior to the switch operation, the routine jumps to a step S143 to execute a "recording mode routine" as a subroutine. If the mode existing prior to the switch operation was the recording mode, the routine goes to a step S142 to set "1" as the frame number, and a "reproduction routine" as a subroutine is called (step S144).

Figure 39:
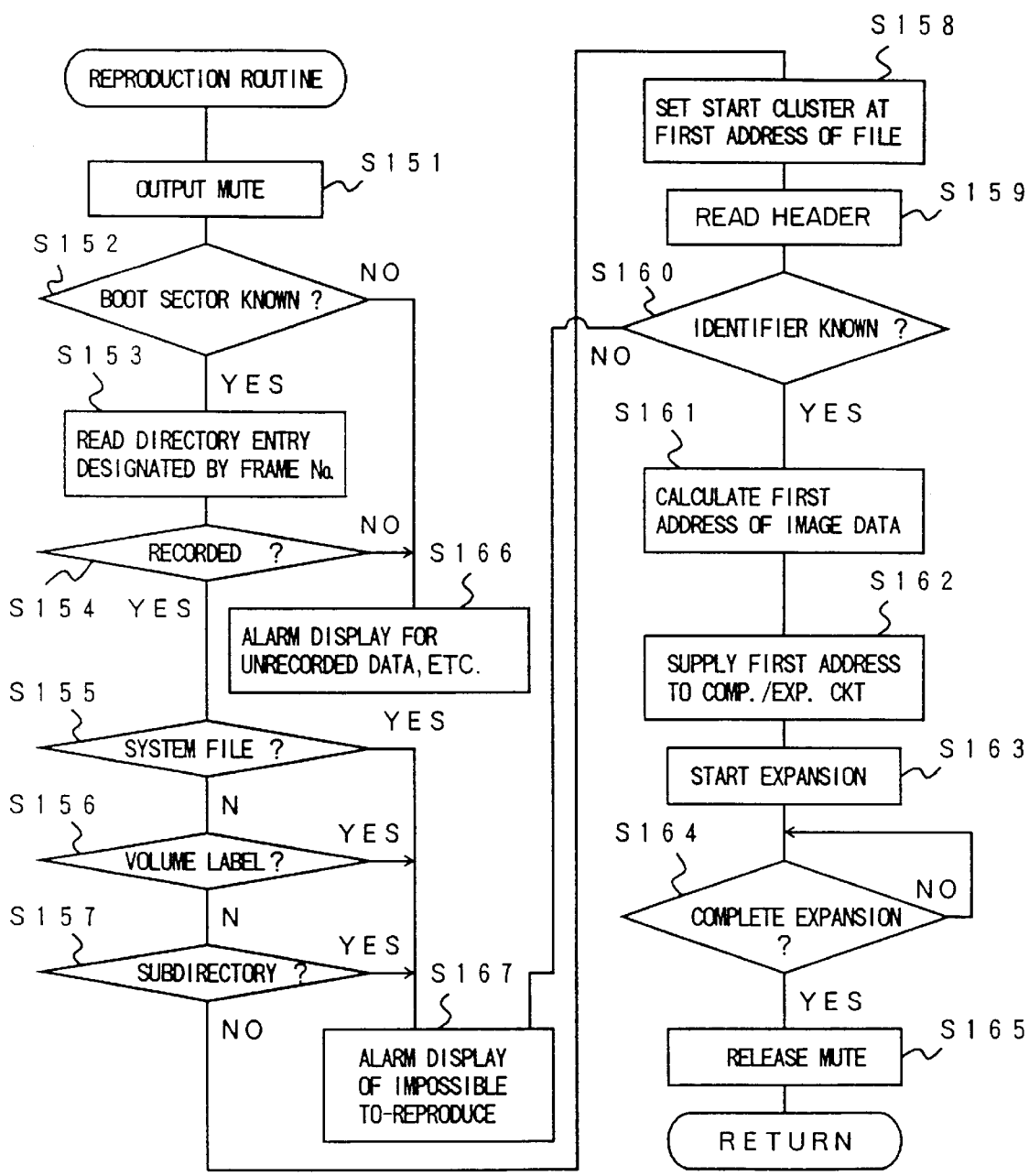
FIG. 39 shows a flow chart of the subroutine "reproduction routine" in FIG. 34.
Figure 42:
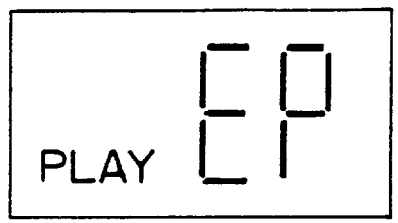
FIG. 42 shows an example of the alarm display for the case where the data is not written.

FIG. 39 is a flow chart of the "reproduction routine" called as a subroutine in the step S144. First, in a step S151 the mute signal is output to provide a "blue display" on the monitor screen. In this state, the boot sector information is read out from the loaded memory card 53. Then a check is made as to whether the boot sector parameter value is known, i.e., it represents the possibility of processing with the pertinent camera (step S152). If it is possible to process, the routine goes to a step S153. Otherwise, i.e., in the case of the memory card having other boot parameter information, the routine jumps to a step S166 to provide a non-data storage alarm indicative of the loading of a memory card incompatible with the pertinent camera. At this time, an alarm display "EP" as shown in FIG. 42 is made on the LCD display 51. This "EP" display is also made when there is no image data stored in an accessed area, as will be described later. It is possible to provide a speech alarm together with the above alarm display.

Figure 43:
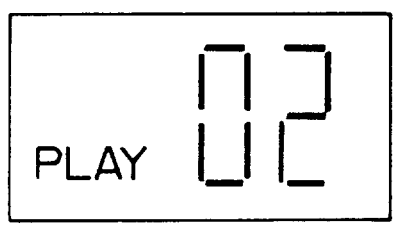
FIG. 43 shows an example of the alarm display for the case where the reproduction is impossible.

In the step S153, the directory entry of the file corresponding to the designated frame number is read out, and the value of the first file in the directory entry is checked. If the checked value is "0" or "0E5H", i.e., if there is no record, the routine jumps to a step S166 to display "EP" as shown in FIG. 42 on the LCD display 51. Otherwise, the routine goes through steps S155 to S157 for checking the attribute of the directory entry (see FIGS. 49 and 50). If the attribute means system file, volume label, and subdirectory, the designated file is a non-image data file impossible to reproduce with an image, and thus the routine jumps to a step S167 to provide an impossible-to-reproduce alarm on the LCD display 51. This display is effected by causing flickering of the pertinent frame number as shown in FIG. 43. Again, it is possible to provide a speech alarm together with this alarm display.

Figure 51:
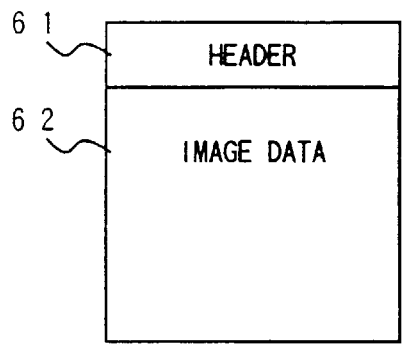
FIG. 51 shows header and image data regions of the memory card in the conventional SMC.
Figure 52:
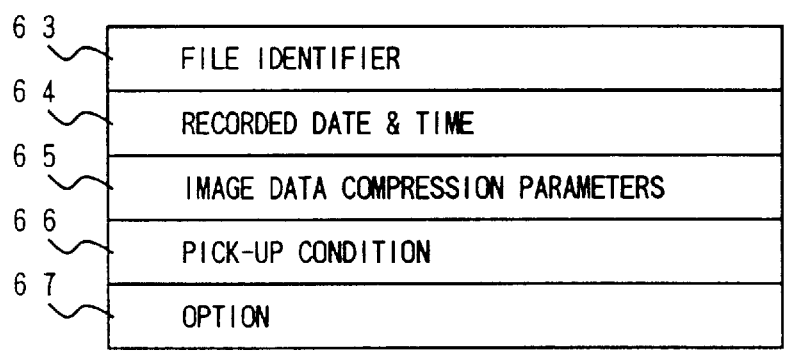
FIG. 52 shows contents to be written to the header of the image data file of the memory card in the conventional SMC.
Figure 53:
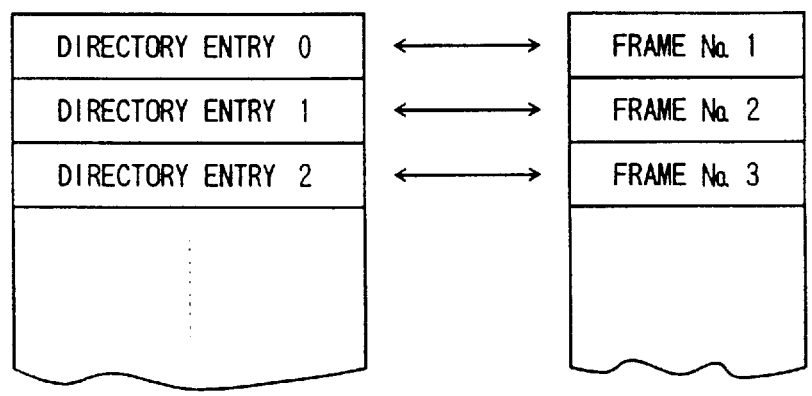
FIG. 53 shows a relationship between the directory entry name and the frame number of the memory card in the conventional SMC.

If it is found the attributes means adequacy as a data file, the routine goes to a step S158 to set the start cluster from the directory entry in the first address of the file. Then, the header information of the file as shown in FIG. 51 is read out, and a check is made as to whether the file identifier as file attribute information is known, i.e., whether it indicates image data which can be reproduced in the SMC. For example, a check is made whether the file identifier is "SMC Ver. 1.0." as noted above. If the identifier is not a predetermined one, the routine jumps to a step S167 to provide an impossible-to-reproduce alarm display on the LCD display 51. If the identifier is a predetermined one, the routine goes a step S161 to reproduce the image.

In the step S161 the first address of the stored image data is calculated, and in a step S162 the calculated first address value is supplied to the compression/expansion circuit 47. In steps S163 and S164 the data in the pertinent address in the memory card 53 is expanded. Subsequently, in a step S165 the mute state is released to enable image reproduction, thus bringing an end to this routine.

It is possible to check the extender in the directory entry file name before going to the step S158 subsequent to the step 157, thus discriminating whether the file is a non-image data file such as a text file and providing the impossible-to-reproduce display if the file is a non-image data file.

Figure 40:
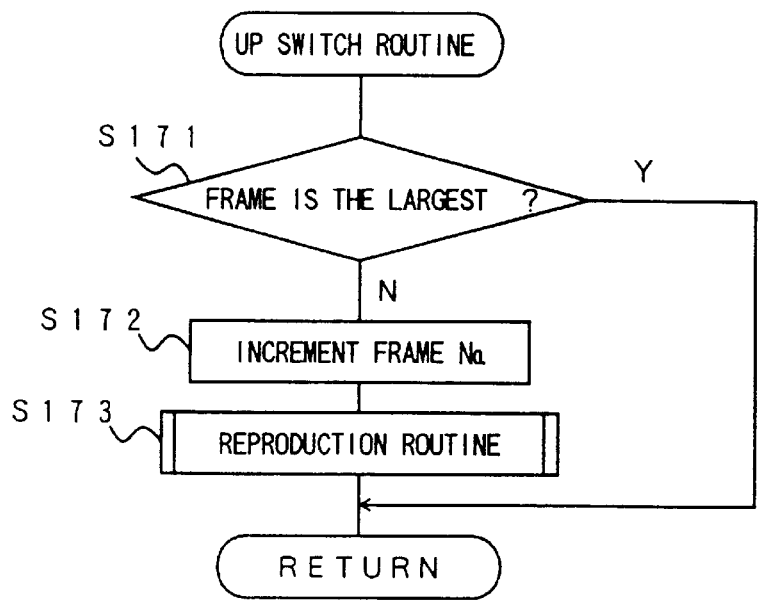
FIG. 40 shows a flow chart of the subroutine "UP switch routine" in FIG. 34.

FIG. 40 is a flow chart of the "UP switch routine", which is a subroutine in the image reproduction operation caused by operating the UP switch 52 in the set of switches 52. In this routine, a check is made as to whether the prevailing frame number is the largest (step 171). If so, the routine is ended. Otherwise, the frame number is incremented (step S172), and the routine goes to a step S173 to call the "reproduction routine", the subroutine shown in FIG. 39 to execute the image reproduction.

Figure 41:
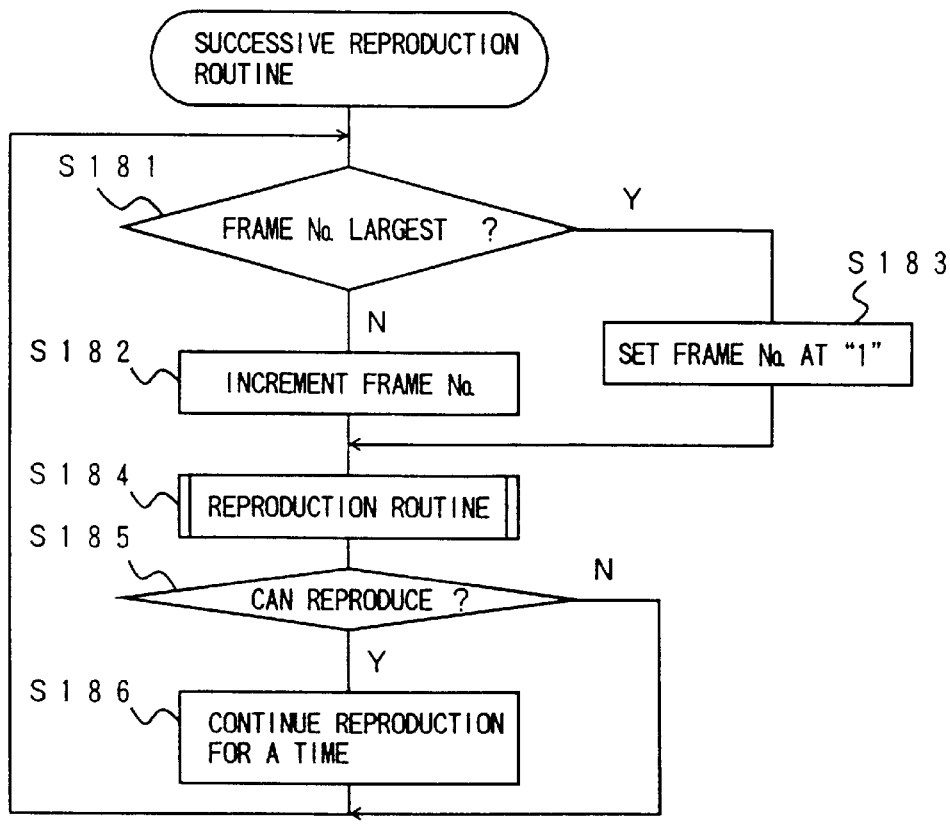
FIG. 41 shows a flow chart of the subroutine "continuous reproduction routine" in FIG. 34.

The "successive reproduction routine" when reproducing images successively by incrementing the frame number in the SMC, will now be described with reference to the flow chart of FIG. 41. In this routine, a check is made as to whether the frame number prior to this routine was the largest. If the number was the largest, "1" is set as the frame number in a step S183, and then the routine goes to a step S184. If the number was not the largest, the frame number is incremented (step S182), and the routine goes to a step S184.

In the step S184, the "reproduction routine" as the subroutine noted above is called to execute image reproduction. If the file as the subject of reproduction is a non-image data file which can not be reproduced (step S185), the routine is returned to the step S181. In this case, the image data is retrieved by discriminating the attribute of the successive files. If no image data could be found by retrieval within predetermined limits, i.e., all the memory card data areas, the retrieval is ended. If the image data could be discriminated and reproduced, the routine goes to a step S186 to continue reproduction for a certain fixed period of time before returning to the step S181. Then, the reproduction of the next frame is executed.

Figure 44:
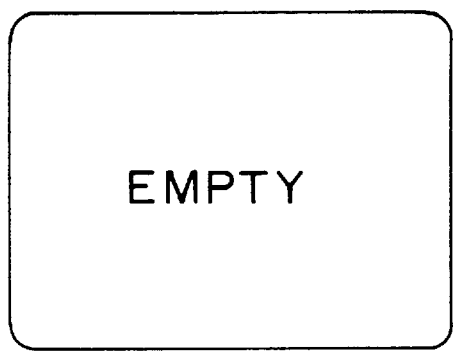
FIG. 44 shows an example of the alarm display by the monitor for the case where the data is not written.
Figure 45:
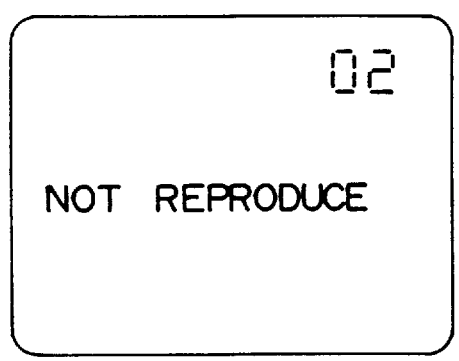
FIG. 45 shows an example of the alarm display by the monitor for the case where the reproduction is impossible.
Figure 46:
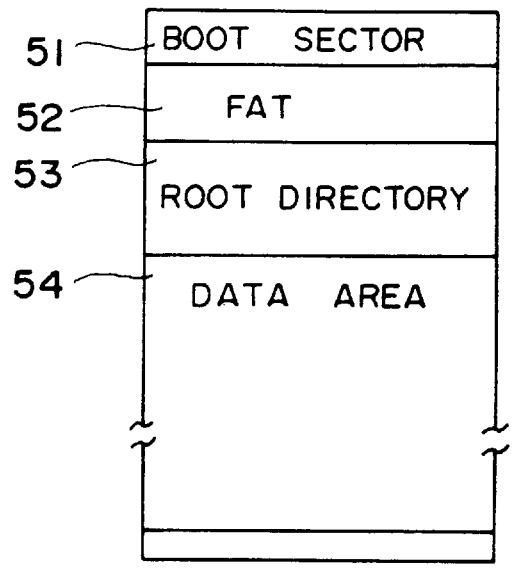
FIG. 46 shows a general logical format of the memory card in the conventional SMC.
Figure 47:
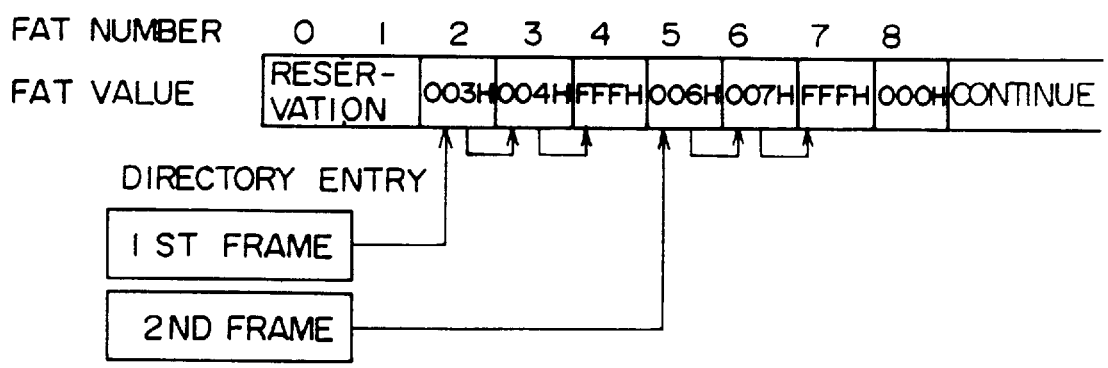
FIG. 47 shows an example of a FAT entry of the memory card in the conventional SMC.

It is possible to display the impossible-to-reproduce or like alarm on an external monitor other than the LCD display 51. FIGS. 44 and 45 show examples of the monitor display of an alarm (FIG. 44) when the designated file is a non-record file and an alarm (FIG. 45) when the reproduction is impossible because of a foreign file attribute or the like. The character data in this case is superimposed through CG 56.

As shown above, when the scope of utility of this embodiment of the SMC is broadened by making the memory card 53 compatible with the personal computer, non-image data files such as text files and program files for personal computers may be included in data files in the memory card 53. Even in such cases, when such a non-image data file is designated, it is possible to avoid a cumbersome state by providing an alarm display. Further, it is possible to permit the selection once again automatically, thus greatly improving the convenience of use.

Although in the above embodiment the memory card is compatible with personal computers, it is possible to provide compatibility with word processors and electronic notebooks and other electronic imaging devices as well. Further, while this embodiment is applied to the SMC, this is by no means limitative, and the subject matter of the invention is applicable to exclusive image reproducing apparatuses using data storage media.

As has been described, the image data reproducing apparatus according to the invention judges whether the prevailing data is image data made according to the attribute information of a designated file stored in the data storage medium, and if the data is non-image data, an impossible-to-reproduce alarm is provided. Accordingly, a file format other than an acceptable format contained in image data stored in the utilized data storage medium can be automatically discriminated to produce an impossible-to-reproduce alarm, thus prohibiting its display as an image. Thus, the user does not feel that the system is cumbersome and can permit automatic selection of different kinds of image data files.

A further embodiment of the invention applied to the SMC will now be described.

In this embodiment, an OS file format such as MS-DOS or UNIX, which permits the processing and handling of a storage medium in a personal computer, is adopted as the storage format for each image, and each record of the data is handled as a file. Further, as relational information to these data files, a specific format (control file) which is a personal computer format is provided, and the relational information is described in the file in a form capable of being displayed and edited with personal computer word processor and editing software. Thus, the user can readily and easily describe the control file by storing the image data picked-up with a camera in a storage medium and directly utilizing the data with a personal computer. It is thus possible to easily describe, correct or add relational information. In addition, it is possible to construct a camera system at a low cost.

Further, there is no need to develop an exclusive relational information storage device, thus permitting great reduction of expense and development overhead. Moreover, adoption of the control file description makes the user much more capable of understanding and handling management of the images.

The relational information is of such kinds or modes as an internal clock function of the camera, peculiar camera identification presets for each of a plurality of different cameras used together, and event pick-up conditions for a sports meeting or picnic, and successive or continuous pick-up. Storing image data by giving the image data file to each of these different kinds or modes permits easier data management. In addition, it is possible to manage these items by producing subdirectories.

Figure 54:
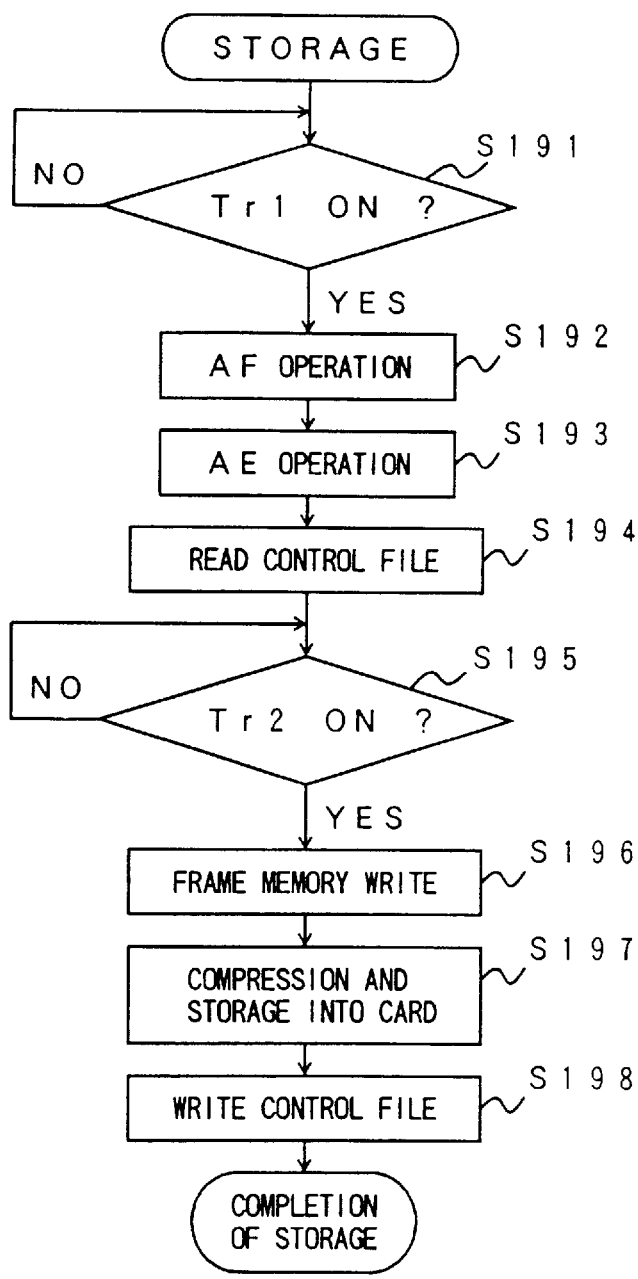
FIG. 54 shows a flow chart of a recording routine for the image information file according to the second embodiment of the invention.
Figure 55:
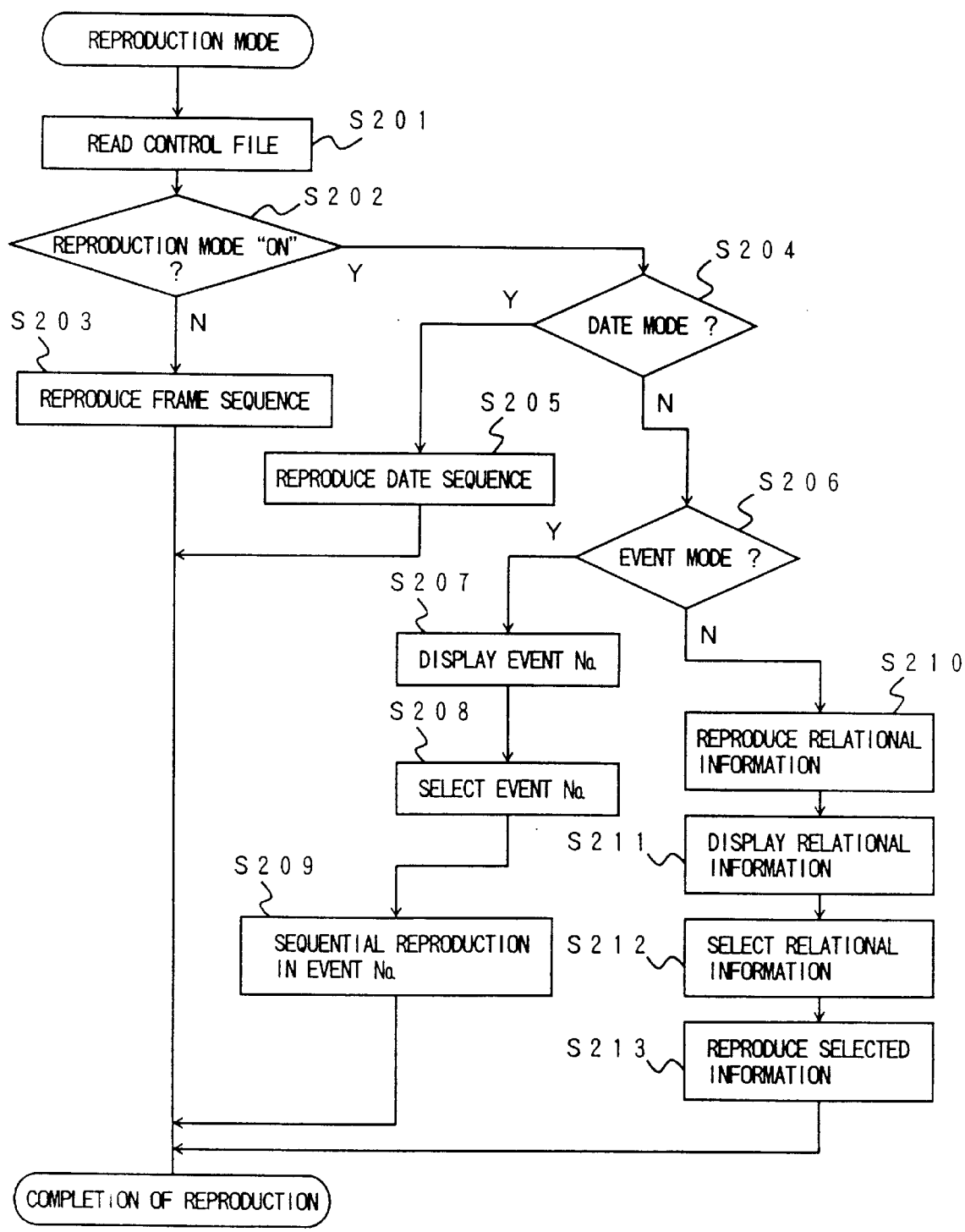
FIG. 55 shows a flow chart of reproduction steps for the image information file according to the second embodiment of the invention.
Figure 56:
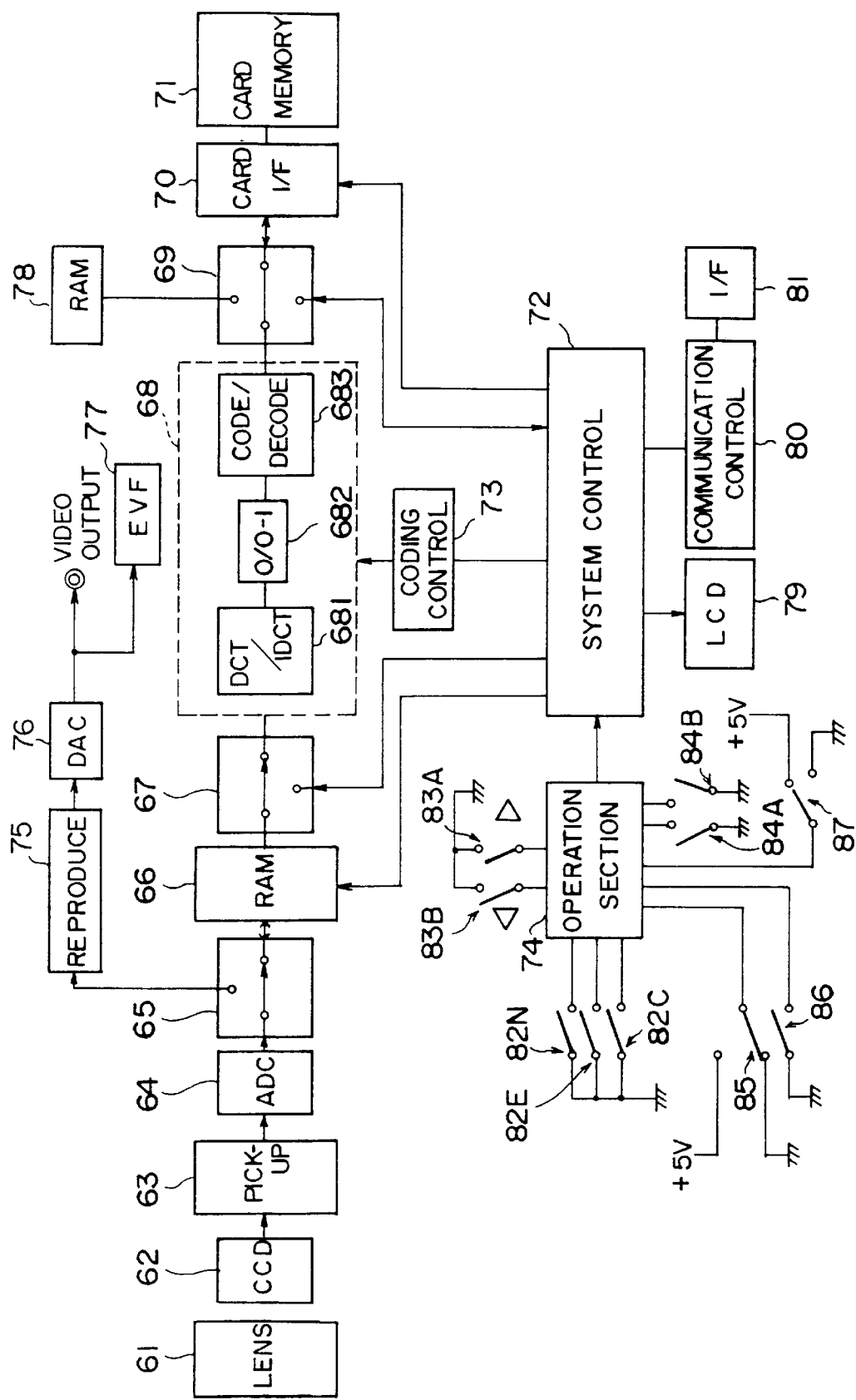
FIG. 56 shows a block diagram of the above embodiment.

FIG. 54 shows a flow chart of a routine for storing data in a storage medium in this embodiment of the invention. FIG. 55 shows a flow chart of a routine for reproducing data from the storage medium. FIG. 56 is a schematic of a camera system of an IC card camera (digital camera) according to the invention.

Referring to FIG. 56, an object image focused on a CCD 62 through a lens 61 is converted to an electric signal, which is subjected in a pick-up processor 63 to a predetermined process such as gamma correction and then converted in an A/D converter 64 into a digital signal.

When storing data, a selector 65 sets up a data path for storing digital image data from the A/D converter 64 in a RAM 66. Block data (i.e., for each block obtained by dividing one picture) read out from the RAM 66 is supplied through the selector 67 to a compression/expansion unit 68. The compression/expansion unit 68 includes a DCT/IDCT circuit 681, which serves as a discrete cosine transform/ inverse discrete cosine transform circuit and effects an orthogonal transformation of the block data for data compression. A transform coefficient obtained as a result of the orthogonal transform is quantized in a quantizer/inverse quantizer 682 and then coded in a coder/decoder 683.

Coding or a like process in the compression/expansion unit 68 is controlled by a coding controller 73 according to instructions from a system controller 72. More specifically, according to contrast information for each division area as noted above, the system controller 72 sets an appropriate Q table for the pertinent division area, thereby controlling the compression process in the compression/expansion unit 8 through the coding controller 73.

Compression coded image data thus obtained in the compression/expansion unit 8 is supplied through the selector 69 to card interface (I/F) 70 to be stored in a memory card 71.

The system controller 72 controls the operations of the RAM 66, selectors 67 and 69, coding controller 73, compression/expansion unit 68, card I/F 70 and communication controller 80. It receives signal from an operating unit 74 and effects various controls of the entire camera.

In reproduction, the digital image data switched by the selector 65 is subjected in a reproduction processor 75 to predetermined reproduction processes and then converted in a D/A converter 76 into an analog signal to be output to an EVF (electronic view finder) 77 and a monitor side output terminal. The system controller 72 receives operating instructions from the operating unit 74, to which various switches are connected, and effects the corresponding controls. In addition, it is connected to the communication controller 80 and effects communication control with respect a serial interface 81. To the selector 69 is connected a RAM 78 which executes an operation to be described later. To the serial interface 81 is connected a modem or a destination side camera.

In a data transmission mode, the selector 69 is connected to the side of the RAM 78, and data read out from the IC card 71 through the card I/F 70 is sent out from the selector 69. Image data read out through the selector 69 is written in the RAM 78 and expanded in the compression/expansion unit 68 and then written in the RAM 66 through the selector 67. Image data read out from the RAM 66 is supplied through the selector 65 to the reproduction processor 75 for the reproduction processes noted above and then converted by the D/A converter 76 into an analog signal output as a monitor output and to the EVF 77. In transmission, data is read out from the RAM 78 and transmitted, thus permitting high speed transmission.

The operating unit 74 is provided with various keys and switches. Such switches are shown at 82N, 82E and 82C. File name provision processes in the normal (date), event and camera identification modes noted above are selected by operating these switches. The keys noted above are a plus and a minus key 83A and 83B for setting a serial No. or a mode serial No. to be provided to each file image data, a two-stage switch comprising a first and a second trigger switch 84A and 84B, an image/sound data switch 85 for switching image data and sound data, a playback mode switch 86 and a REC/PLAY switch 87.

A LCD 79 displays such information as indicative of the prevailing mode, file name and serial No.

Figure 57:
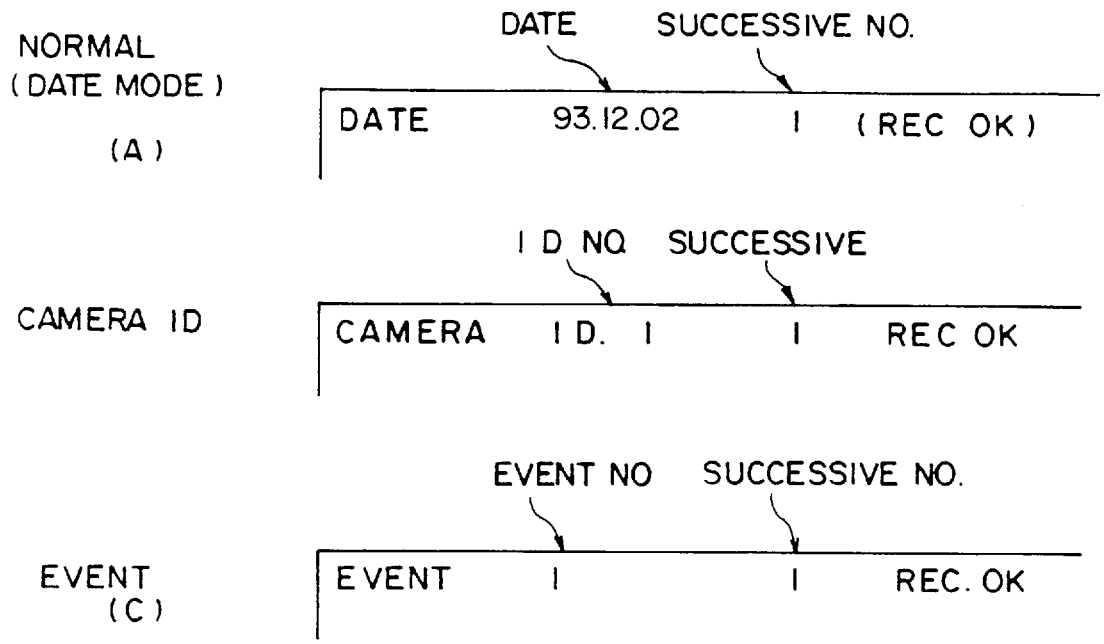
FIG. 57 shows displayed examples for the respective modes on the camera display of the embodiment.

The normal, camera identification and event modes can be set as desired by operating the mode selection operation. FIG. 57 shows examples of the display on the LCD 79 in the individual modes.

FIG. 57(A) shows a display example in the normal mode (i.e., date mode). Displayed on the display screen are "DATE" indicative of the normal mode, "1991.12.02" indicative of the date, "1" indicative of the serial No. of image data and "REC OK" indicative of a state ready for recording. Likewise, FIG. 57(B) shows a display in the camera identification mode. Camera identification No. 1 is displayed as "CAMERA ID. 1" together with a serial No. as "1" and "REC OK". In the case of FIG. 57(C), the event No. 1 is displayed as "EVENT 1" together with a serial No. as "1" and "REC OK". The camera identification No. event No. and serial No. in the respective modes may be changed by operating the plus and minus keys 83A and 83B.

Further, the serial No. is automatically incremented for each picture pick-up. When the serial Nos. are stored without sequence using the plus and minus keys 83A and 83B, upon selection of the No. corresponding to the image data to be stored, "REC OK" is displayed on the LCD 79. Upon selection of the No. corresponding to the image data having already been stored, "REC END" is displayed. Thus, the flexibility of the system is improved.

The above display may of course be made not only on the LCD 79 but also on the EVF 77 or a video output side monitor screen.

Figure 58:
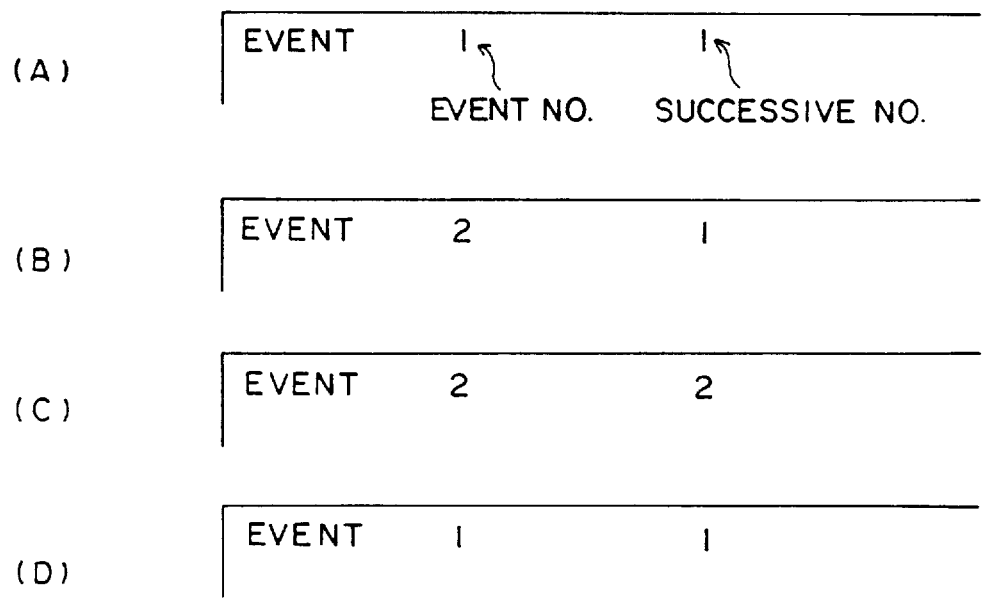
FIG. 58 shows a displayed example for the event mode of the embodiment.

FIG. 58 shows an example of display content changes in connection with the event mode, as an example. In the display shown in 58(A), like the display shown in FIG. 57(A), an event No. 1 is displayed as "1", and the serial No. 1 of image data to be picked-up is displayed as "1". The event No. can be changed by using the plus and minus keys 83A and 83B. By depressing the plus key 83A once, the event No. is changed to "2" (FIG. 58(B)). When the pick-up is made in this state, the serial No. is automatically incremented by "1" to "2" as shown in FIG. 58(C). When it is desired to return the event No. to "1", the minus key 83B is depressed once. By so doing, the display shown in FIG. 58(A) is restored as shown in FIG. 58(D).

Figure 59:
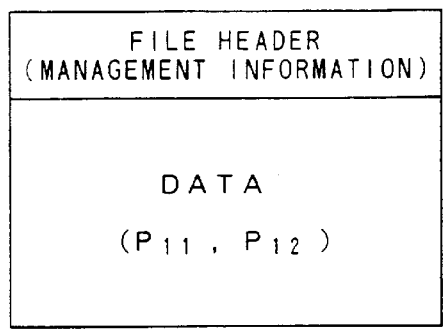
FIG. 59 shows a control file structure of the embodiment.

FIG. 59 shows an example of the configuration of the control file. As relational information, contents shown in FIGS. 64 and 65 are written in terms of ASCII codes or the like in a common data area of the file header for file data organization. It is usually necessary that personal computer word processor software and editor (test edition software) adopts ASCII code or text format for the description. Thus, for displaying and editing data contents, ASCII codes have to be used for displaying the described characters.

Figure 60:
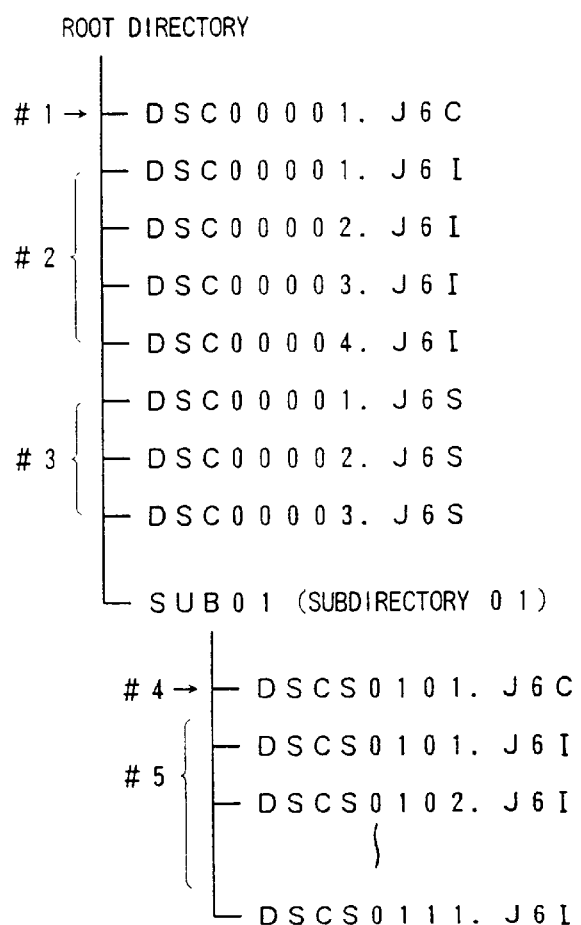
FIG. 60 shows an example of the file structure of the recording medium of the embodiment.

FIG. 60 shows an example of data organization (file organization) in the storage medium. In the root directory, control file #1, image data files #2 and sound data files #3 are provided. More specifically, the root directory is provided with control file DS00001.J6C, image data files DSC00001.J6I to DSC0004.J6I and sound data files DSC00001.J6S to DSC0003.J6S. It is also provided with subdirectory 01 as "event 1", which is represented as SUB01. The subdirectory is provided with control file #4 and image data files #5. In this example, one control file is provided in each directory for management related to files. In this way, when each directory is copied, the control file thereof is also copied, thus facilitating management of the copy. It is possible to make related management of all the files by providing one control file in the root directory.

Figure 61:
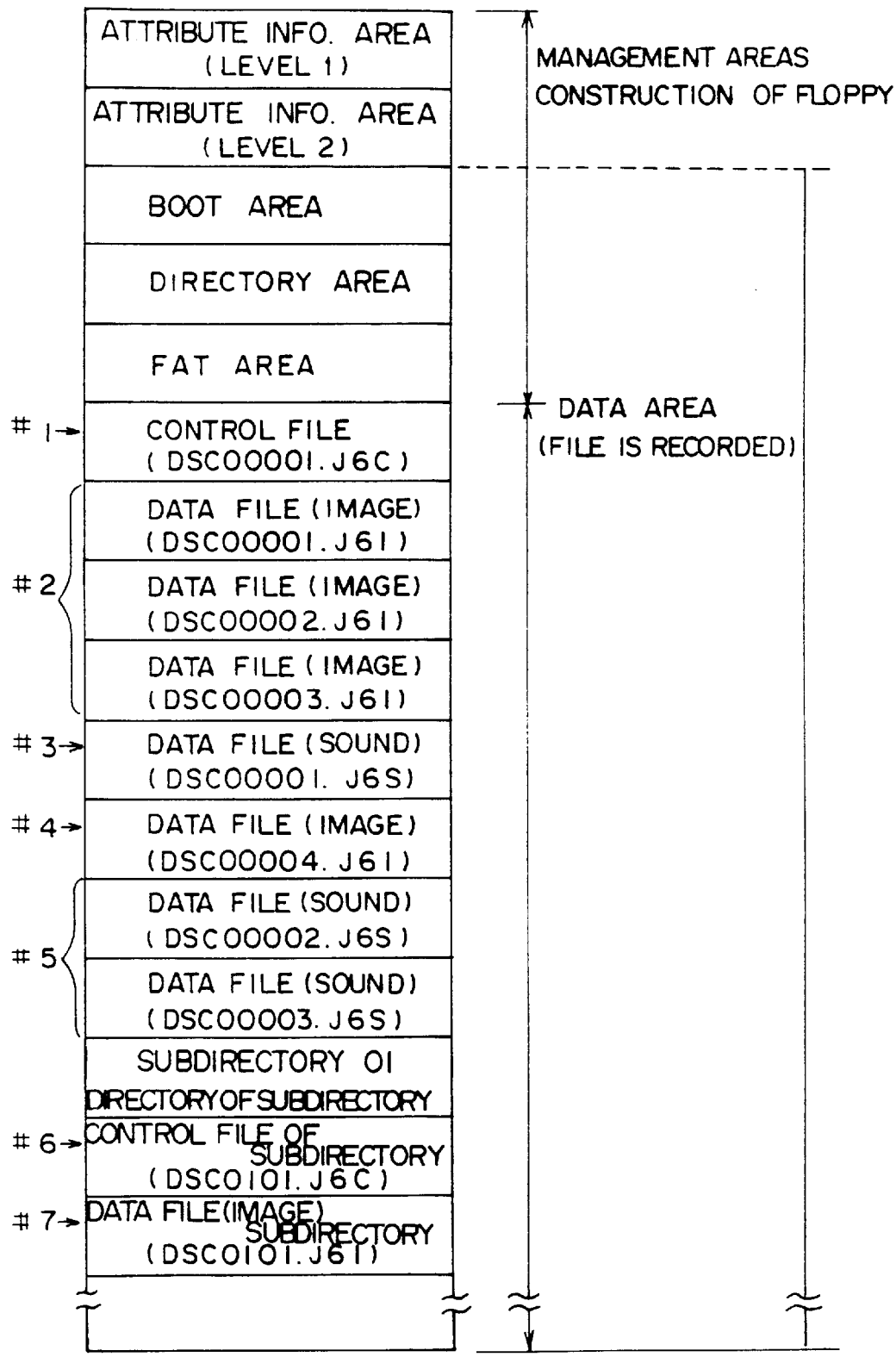
FIG. 61 shows an example of the memory map in the IC memory card of the embodiment.

FIG. 61 shows an example of the memory map of the IC card memory 71 as the storage medium. In the memory map are provided attribute information (levels 1 and 2) areas, a boot area, a directory area and a FAT (file allocation table) area. These areas constitute a management area. Subsequent to the management area are provided control file #1, image data files #2 and #4, sound data files #3 and #5, directory of subdirectory 01, and control and data files #6 and #7 of the subdirectory 01.

FIG. 62 shows an example of the relational information file description.

Following a start portion START of data area is a frame No. table TABLE. Provided first in the table is root directory #1 of image data. In the root directory, four image data files #2 are provided in correspondence to frame Nos. 1 to 4. Following is sound data file root directory #3, in which three sound data files #4 are provided. Then, control file root directory #5 is provided, in which control file #6 is provided. Then, image data subdirectory #7 is provided, in which eleven image data files #8 are provided. Further, subdirectory #9 is provided, in which control file DCS0101.J6C is provided.

Relational information #10 is shown as "INFO". "REC DRIVE 1" indicates successive pick-up in recording, and "TIME=01" indicates one-second interval successive pick-up. Following are four successively picked-up image data files #11.

FIG. 63 shows a file arrangement subsequent to the description shown in FIG. 62.

In case of simultaneously reproducing image and sound data when a particular mode is set, two information files #1 are described as image/sound relational information. "CONT" indicates continuous reproduction, and subsequent "ON" and "OFF" control and designate operation. "SING" indicates a single reproduction of sound data. Two sound data files are described. The description of "SING" indicates single reproduction of each of the two sound data records. The following "PROGRAM01" indicates mode selection.

First, with sound data file DSC0001.J6S first sound data is output. Then after a lapse of 5 seconds as indicated by "TIME=05", image data of three (first to third) subsequent image data files are output. Then, after a lapse of 10 seconds (TIME=10), fourth image data is output. Then, the routine is repeated from the outset. Each routine is ended with "END". In the above frame No. table, the frame No. and file name are described additionally whenever storage is made anew, so they may be described lastly.

Further, it is possible to store the pick-up date (or time) together with the file name, as shown in FIG. 64.

The above relational information is displayed on the EVF of the camera, reproducing monitor or LCD. For example, the playback mode display is switched as shown in FIG. 65 whenever the playback mode switch is depressed during reproduction.

By a first operation of the switch, a data play mode is set. By a second operation, an event play mode is set. By a third operation, a relational play mode operation is brought about. In the relational mode, "PICTURE & SOUND", i.e., reproduction of picture and sound in a related fashion, "INTERVAL PLAY", i.e., reproduction for each time and for each frame No., "PROGRAM PLAY", i.e., execution of program operation, and "CONTINUOUS PLAY", i.e., continuous reproduction of continuously stored data, are selected by operating keys provided in the operating unit 74 shown in FIG. 56.

Now, the storing operation routine will be described with reference to FIG. 54. First, a check is made as to whether the first trigger switch is turned on (step S191). When the switch is turned on, AF (auto-focus) and AE (auto-exposure) operations are executed (steps S192 and S193). Then, a control file is read out from the storage medium, and a stored frame No. and a file name are read out (step S194). After that, a check is made as to whether the second trigger switch is turned on (step S195). If the switch is turned on, picked-up image data is stored in the frame memory (step S196) and compressed and stored in the memory card (step S197). Then, the control file is written (step S198), thus completing the storing. The process of writing the control file in step S198 includes adding the description of the frame No. and frame name of the stored data.

FIG. 55 shows the reproduction routine. First, a control file is read out, and the stored frame No. and file name are read out (step S201). Then, a check is made as to whether the playback mode switch has been turned on (step S202). If not, frame data are reproduced in order of frame No. sequentially from the prevailing frame No. by the normal reproducing operation (step S203), thus ending the reproduction. When the playback mode switch is turned on, a check is made as to whether the date mode prevails (step S204). If the date mode prevails, data is reproduced date sequentially (time sequentially) (step S205), thus ending the routine.

If it is determined in the step S204 that the date mode does not prevail, a check is made as to whether the event mode prevails (step S206). If the event mode prevails, the event No. is displayed (step S207), and event No. selection (step S208) and sequential reproduction concerning the selected event No. (step S209) are executed, thus bringing an end to the routine.

If it is determined in the step S206 that the event mode does not prevail, reproduction of relational information (step S210), display thereof (step S211), selection thereof (step S212) and reproduction in dependence on the selected relational information (step S213) are executed, thus bringing an end to the routine.

FIG. 66 shows an example of displaying the frame number and file name stored in the storage medium on the display of the camera. The display includes image data files #1 (PICTURE), sound data files #2 (SOUND), and event information file #3 (EVENT 1). This table is displayed directly, and there is no need of retrieval or rearrangement whenever the display is made.

Figure 67:
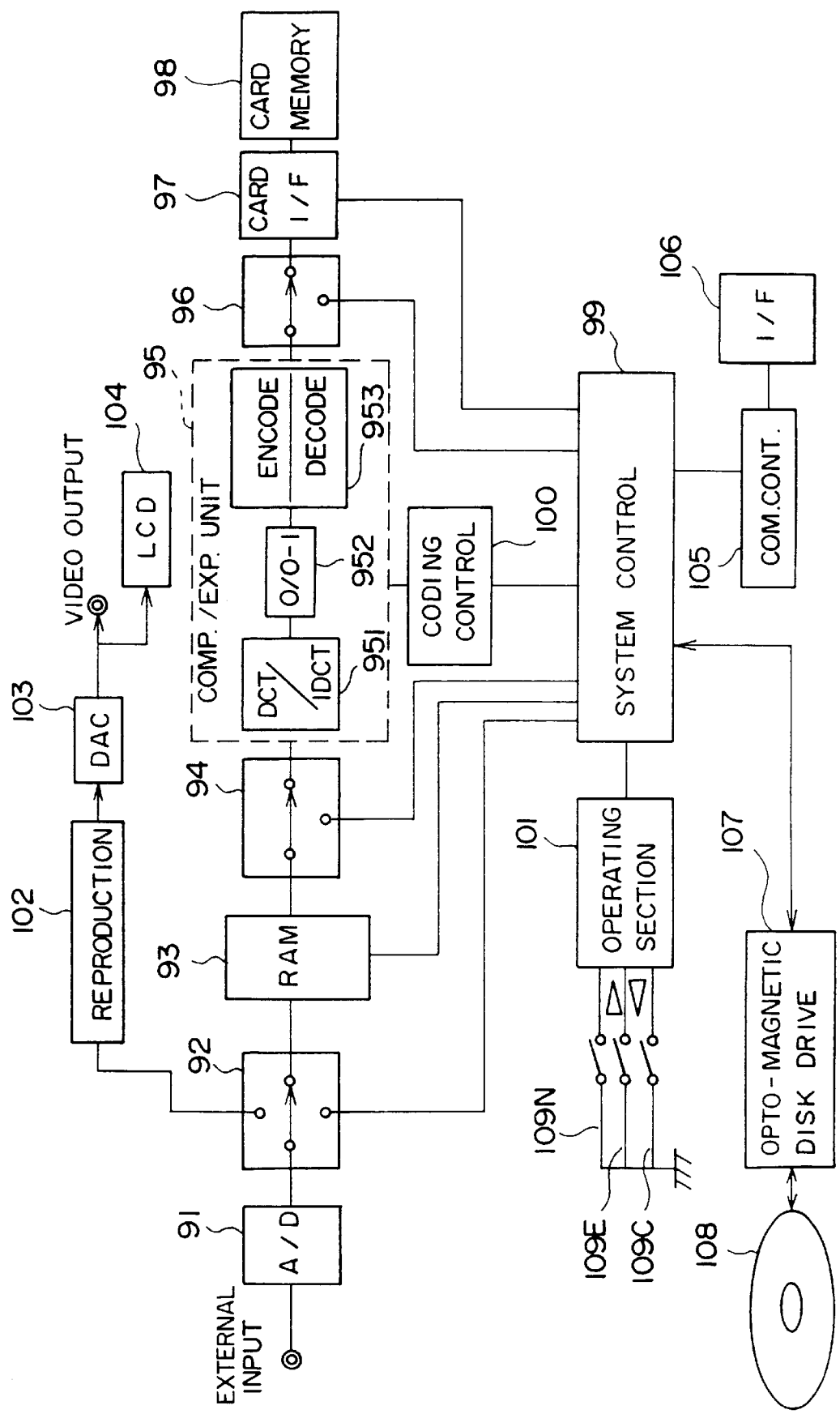
FIG. 67 shows a block diagram of the image editing and reproducing apparatus of the embodiment.

FIG. 67 shows an example of a structure according to the invention applied to an image editing and reproducing apparatus. This embodiment permits similar management by operating the playback mode switch.

An image signal input to an external input terminal is converted in an A/D converter 91 into a digital signal. A selector 92 sets a data path in the playback mode such as to store digital image data from the A/D converter 91 in a RAM 93 as a frame memory. Block data (i.e., data in each of a plurality of blocks, into which one picture is divided) read out from the RAM 93 is supplied through a selector 94 to a compression/expansion unit 95. The compression/expansion unit 95 includes a DCT/IDCT (discrete cosine transform/inverse discrete cosine transform) circuit 951, which executes an orthogonal transform process for data compression. A coefficient obtained as a result of the orthogonal transform is quantized in an quantizer/inverse quantizer 952 and then coded in an encoder/decoder 953.

The encoding and other processes in the compression/expansion unit are controlled in a coding controller 100 according to instructions from a system controller 99. More specifically, according to contrast information for each division area, the system controller 99 selects and sets an appropriate Q table for each division area as noted above, thus controlling the compression process in the compression/expansion unit 95 through the coding controller 100.

The compression encoded image data obtained in the compression/expansion unit 95 is supplied through a selector 96 to a card interface (I/F) 97 to be stored in a memory card 98. As an alternative, it is possible to cause an opto-magnetic disk drive 107 to store data in an opto-magnetic disk 108 through the system controller 99.

The system controller 99 controls the operations of the RAM 93, selectors 94 and 96, encoder controller 100, compression/expansion unit 95, card I/F circuit 97 and communication controller 105. It receives signals from the control unit 101 and effects overall control including the operation according to the invention to be described later.

In reproduction, a desired playback mode is set by either a normal mode switch 49N, an event mode switch 49E or a camera identification switch 49C similar to the mode switches shown in FIG. 3. Image data read out from the memory card 98 is coupled through the card I/F 97, selector 96, compression/expansion unit 95, selector 94 and RAM 93, and digital image data from the selector 92 is subjected in the reproduction processor 102 to predetermined reproduction process and then converted in the D/A converter 103 into an analog signal, which is supplied to a LCD monitor 104 or a video output terminal.

The system control circuit 99 receives operational instructions from the operating unit 101 with various switches connected thereto and effects corresponding controls. In addition, it is connected to the communication controller 105 for executing communication control with respect to the serial interface 106. To the serial interface is connected a modem or a destination side camera.

As shown above, when handling image data files in the image data file handling apparatus and method according to the invention, relational information to image data is described in a control file provided as specific information file in a language permitting direct understanding of the information by the user. Thus, the management of image data can be made very readily, and compatibility with computer systems such as personal computers can be greatly enhanced.

Now, a further embodiment of the invention applied to an image data recording and reproducing system will be described.

Figure 68:
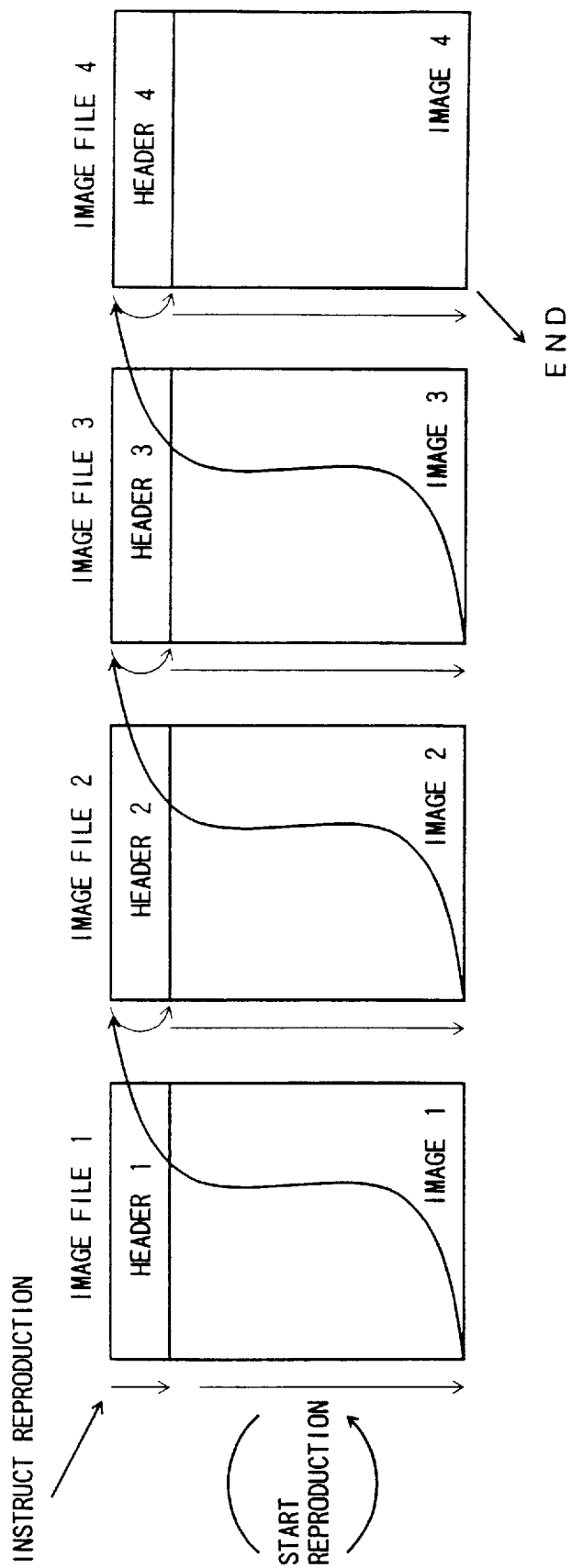
FIG. 68 shows a drawing for explaining a high speed continuous reproduction procedure according to a third embodiment.

FIG. 68 shows an example of process for high speed reproducing four continuously stored images. In a stand-by state, the control file is read out to confirm that the individual files are of the same attribute. Then, header 1 in the image data file 1 is previously read out to confirm the pixel size, data compression system and so forth. Now, the system is ready to reproduce. In response to a reproduction start instruction, image data 1 in image data file 1 is read out and reproduced. With the next image data file 2, header 2 is not read out, but image data 2 is read out immediately. Likewise, with image data file 3 image data 3 is read out immediately without reading out header 3. Further, with image data file 3 image data 4 is read out immediately without reading out header 4. In the above way, the header is read out only with the first image data file, and with the subsequent image data files image data is immediately read out and reproduced without reading the header but in accordance with the information in the first header 1, thus permitting high speed continuous reproduction. Image data obtained by high speed continuous pick-up are stored together with the same attribute information (header information) in a control file.

FIG. 69 shows an example of data organization (file organization) in the storage medium. The root directory normally stores control file #1. Following are normally stored three image files and three sound files #2 and #3. Labeled #4 is a continuous high speed storing control file in a continuous high speed storing subdirectory. It can be known from the content of this control file that continuously stored image files have the same organization. Continuously stored image data are accommodated in eleven files #5. In the example of FIG. 69, one control file is provided in each directory for relational management of the files in that directory. However, it is possible to provide a control file in the root directory for relational management of all the files with this control file alone.

FIG. 70 shows the control file. Management information is described in the file header, and relational information of individual files is described in a data area in ASCII codes. Here, personal computer editors (text edition software) and word processor software should adopt ASCII codes for the description. Otherwise, it is impossible to provide a display in normal characters. Thus, when displaying and editing data contents, ASCII codes are used to describe and display characters.

In the header of the image data file, table data (such as quantization table and coding tables) for determining the extent of image compression is described in addition to the normal attribute information. To make the quality of each still picture constant, however, these table data need not be described because a standard table is used. On the other hand, the high speed continuous storing usually adopts a method, which is also used in reproduction for continuous reproduction. It is thus often the case to give preference to the number of records and storing speed even with a sacrifice in the quality of each picture. Thus, in such case the normal table is not used, but a special table data is recorded to facilitate the routine. Since in this case various kinds of information are described in each file header, it is difficult to prescribe a constant header size, and the header thus has a variable size. Therefore, in the above process it is not easy to recognize the start position of image data.

Accordingly, in a further embodiment of the invention a pointer indicative of the start position of data is described at (or near) the forefront of the header which is at the forefront of the file. When the header content is made clear from the content of the control file, the image data start position can be determined by reading the pointer and without need of retrieving successive headers. Thus, the process is facilitated, and it is possible to obtain high speed reproduction. Further, it is possible to describe the start position of image data in each file as a pointer in the control file, thus permitting collective management and further facilitating the management of the image data.

Such an embodiment permits simple process not only in the case of high speed recording and reproduction but also in the case of reproducing a medium, in which various different kinds of image files are stored. This is so because the case of reproduction with a standard table and the case of reproduction with exclusive table recur, and similar routines may be executed.

FIG. 71 shows an example of image data file organization in this embodiment. Pointer 1 indicative of the head position of image data is described in a forefront portion of the file. In a subsequent file header area, such information items as the image mode, coding system, pick-up date as well as a quantization table and a coding table to be used when the standard table is not used are stored. In a subsequent image data area, compressed image data constituting the image data body is stored. The forefront portion of image data can be read out immediately by reading out pointer 1 in the forefront portion of the image data file.

Figure 72:
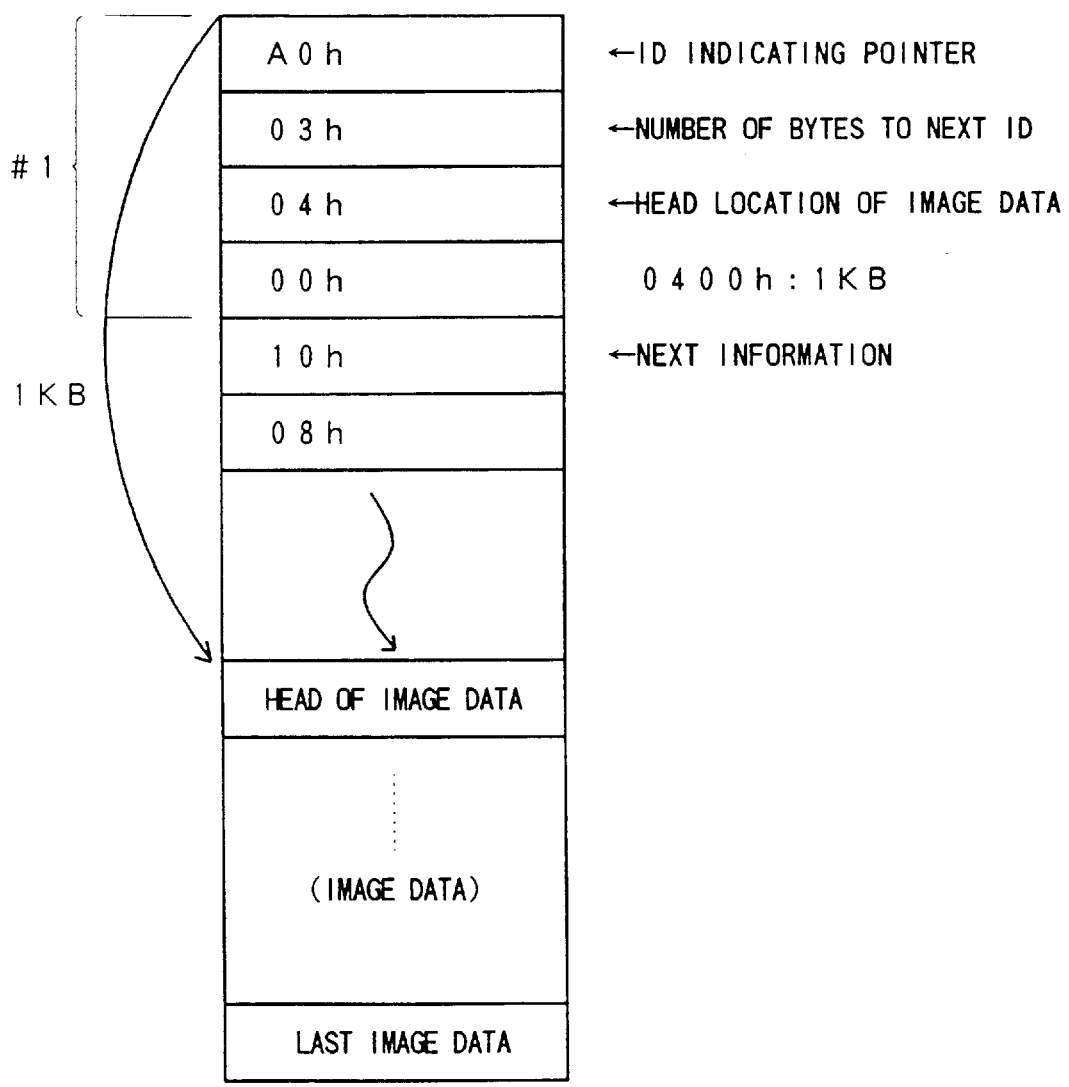
FIG. 72 shows a pointer of the image file of the embodiment.

FIG. 72 shows an image data file organization as an example of the pointer display. Referring to the Figure, labeled #1 is a pointer section. The ID indicative of the pointer is "A0h". The byte number up to the next ID is "03h", and "0400h" constituted by "04h" and "00h" indicates that the forefront of image data is located at a position after 1 kB in this embodiment. "10h" and following portions are for the next information. The image data body starts from the forefront of image data designated by the pointer #1 (the forefront being "SOI" in a case when it is at a position after 1 kB from the pointer position, for instance in a JPEG file) and ends at the last "E01" of image data.

FIG. 73 shows an example of the description of the relational information file in the control file of the root directory. The control file in this example includes subdirectory relational information as well.

Referring to the drawing, labeled #1 are stored image data files and image data pointers, #2 stored sound data files and sound data pointers, #3 a stored control file, and #4 stored image data files and image data pointers of subdirectory 01. These files and pointers are shown together with frame Nos. Regarding the pointer, "0400(h)" represents a hexadecimal showing of 1 kB, and "0800(h)" a hexadecimal showing of 2 kB. In information "INFO", one group of continuous storage is stored in portion #5, and an interval time (in sec.) of continuous storing is stored in portion #6. This example shows recording at an interval of one second. Eight continuously recorded image files are stored in portion #7. In reproduction, it is possible to know by reading out the above information that the recording was made under the same conditions. It is thus possible to obtain high speed reproduction by reading only the first file header and reading solely image data and not reading the header in the subsequent files.

FIG. 74 shows an example of the description of the relational information file with respect to the control file in the subdirectory file as shown labeled #4 in FIG. 69. "TABLE" shows the outset of the file management information. Labeled #1 are pointers of image data of image data files in stored subdirectory 01, #2 information, #3 one group of continuous storing (file in subdirectory 01, #4 interval time (sec.), and #5 eight continuously stored files. From this description it can be recognized that the eight files are stored with the same pixel organization and data compression system.

Figure 75:
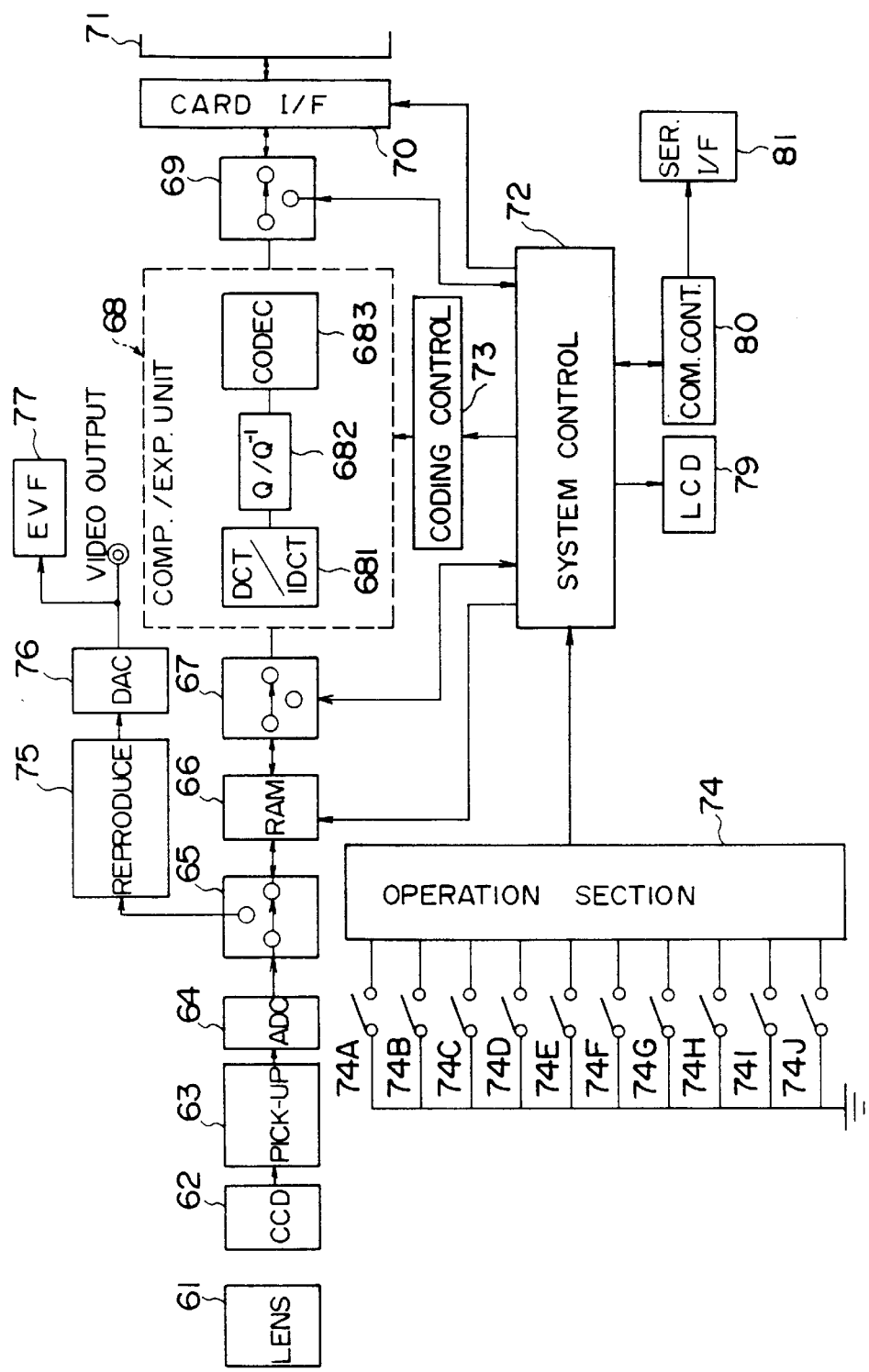
FIG. 75 shows a block diagram of the image recording and reproducing apparatus according to the invention.

FIG. 75 is a block diagram showing an embodiment of the invention applied to an image data recording and reproducing system. This embodiment is an example of an application to a still picture camera used with an IC card as the storage medium. Some portion of this circuit has the same construction as that of the circuit shown in FIG. 56. An object image is focused through a lens 61 on a CCD 62. An operating unit 74 has a shutter trigger switch 74A for the AF operation, a trigger switch 74B for the recording operation, switches 74C and 74D for frame feed in the leftward and rightward directions for shifting files in the reproduction sequence, a switch 74E for switching the recording and playback modes, a switch 74F for switching image and sound data, a switch 74G for designating a special reproduction mode such as the interval reproduction mode, a switch 74H for designating normal recording/reproduction, a switch 74I for designating high speed continuous operation, and a switch 74J for designating low speed continuous operation.

Figure 76:
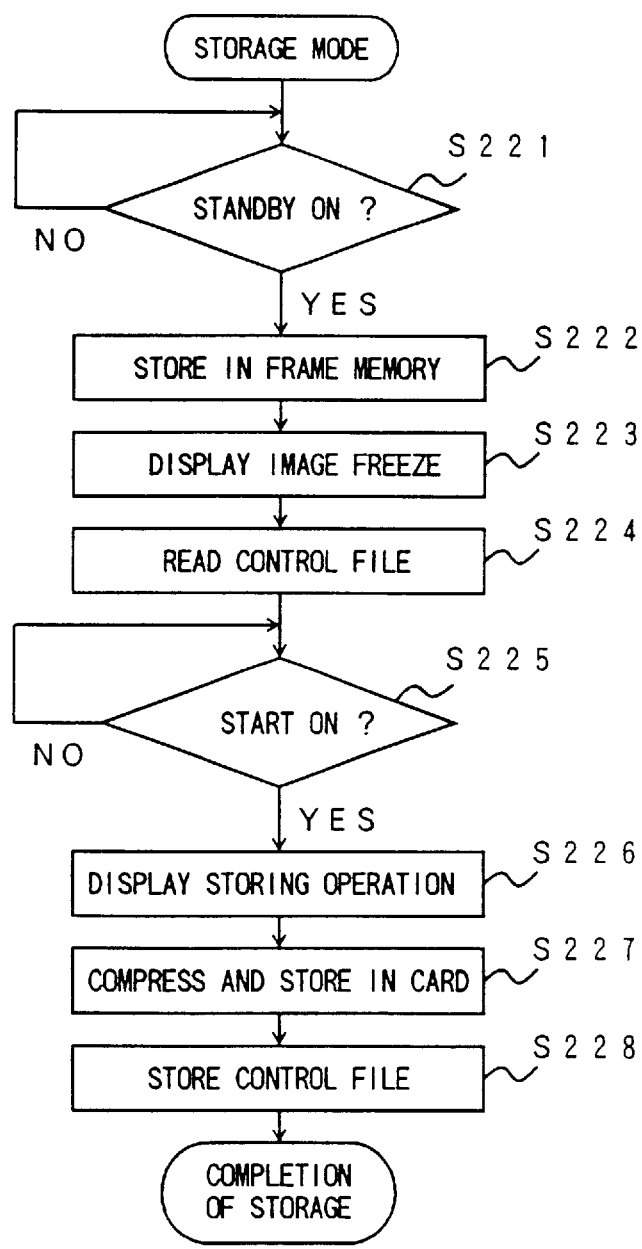
FIGS. 76 and 77 show flow charts of the recording routine of the embodiment.

FIG. 76 illustrates the operation of the embodiment in the recording mode. First, a check is made as to whether the trigger switch 74A (STANDBY) has been turned on (step S221). If the switch is turned on, writing in frame memory is executed (step S222), display is made (step S223), and a control file in the IC card 71 is read to check the prevailing state of the IC card 71 (step S224). Then, a check is made as to whether the start (trigger) switch 74B is has been turned on (step S225). When the switch is turned on, the storing operation is displayed (step S226), and the image data is compressed by the compression/expansion unit 68 and stored in the IC card 71 (step S227). Then, management information like that noted above concerning the stored image data file is written in the control file (step S228), thus completing the recording.

Figure 77:
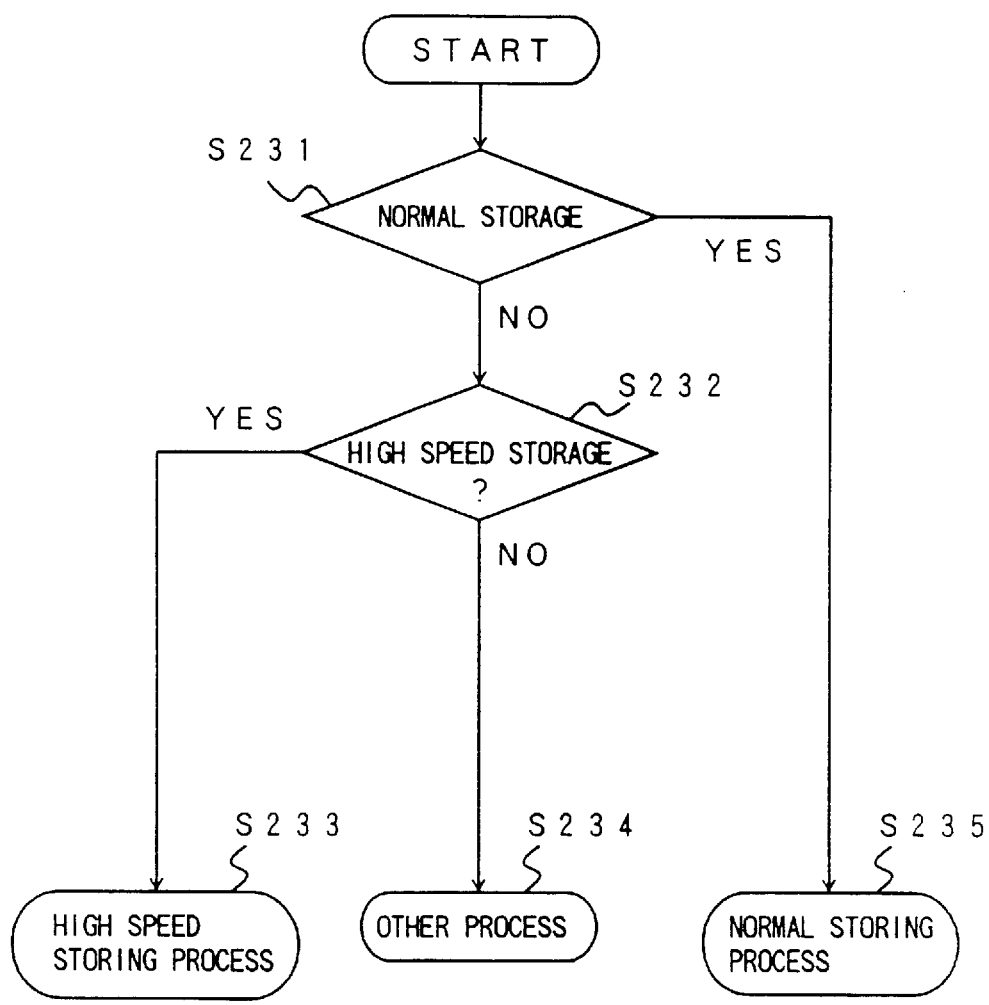

The status of the recording operation is determined by the status of the switches 74H to 74I in the operating unit 74 in the manner as shown by the flow chart of FIG. 77. Fist, a check is made as to whether normal recording is designated (step S231). If it is determined that the normal recording is not designated, a check is made as to whether high speed continuous recording is designated (step S232). If the high speed continuous recording is designated, a high speed recording routine to be described later is executed (step S233). Otherwise, other designated recording routine is executed (step S234). If it is found in the step S231 that the normal recording is designated, a normal recording routine is executed (step S235).

Figure 78:
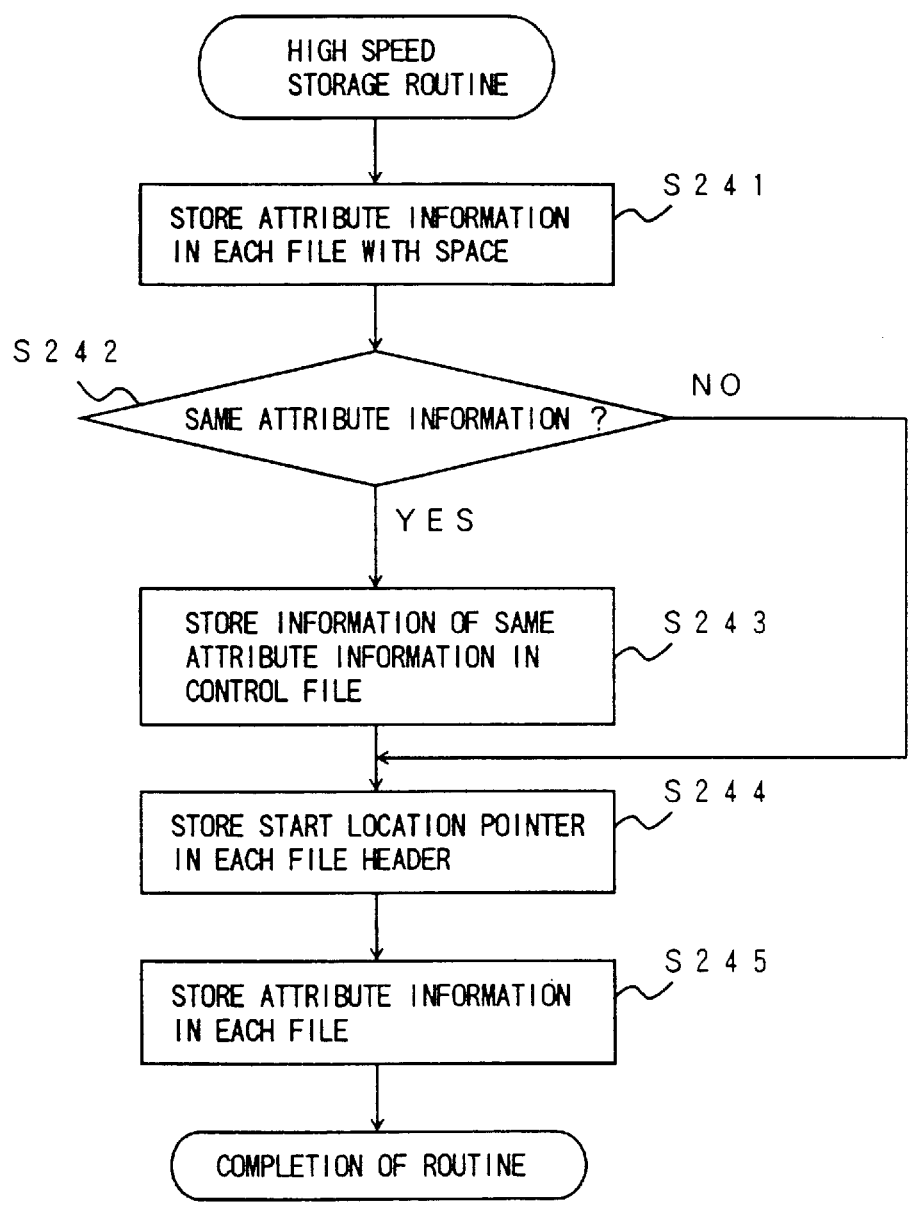
FIG. 78 shows a flow chart of a high speed recording reproduction routine of the embodiment.

FIG. 78 shows the high speed recording routine. In a step S241 image data is stored in a vacant area of each file for writing attribute information (header area). Then a check is made as to whether the attribute information is the same (step S242). It is determined that the attribute is the same, information indicative of the same attribute is written in the control file (step 243). If the attribute information is not the same, the image data start position pointer is written in each file header (step S294). Then, attribute information is written in each file header area (step S245), thus completing the routine.

Figure 79:
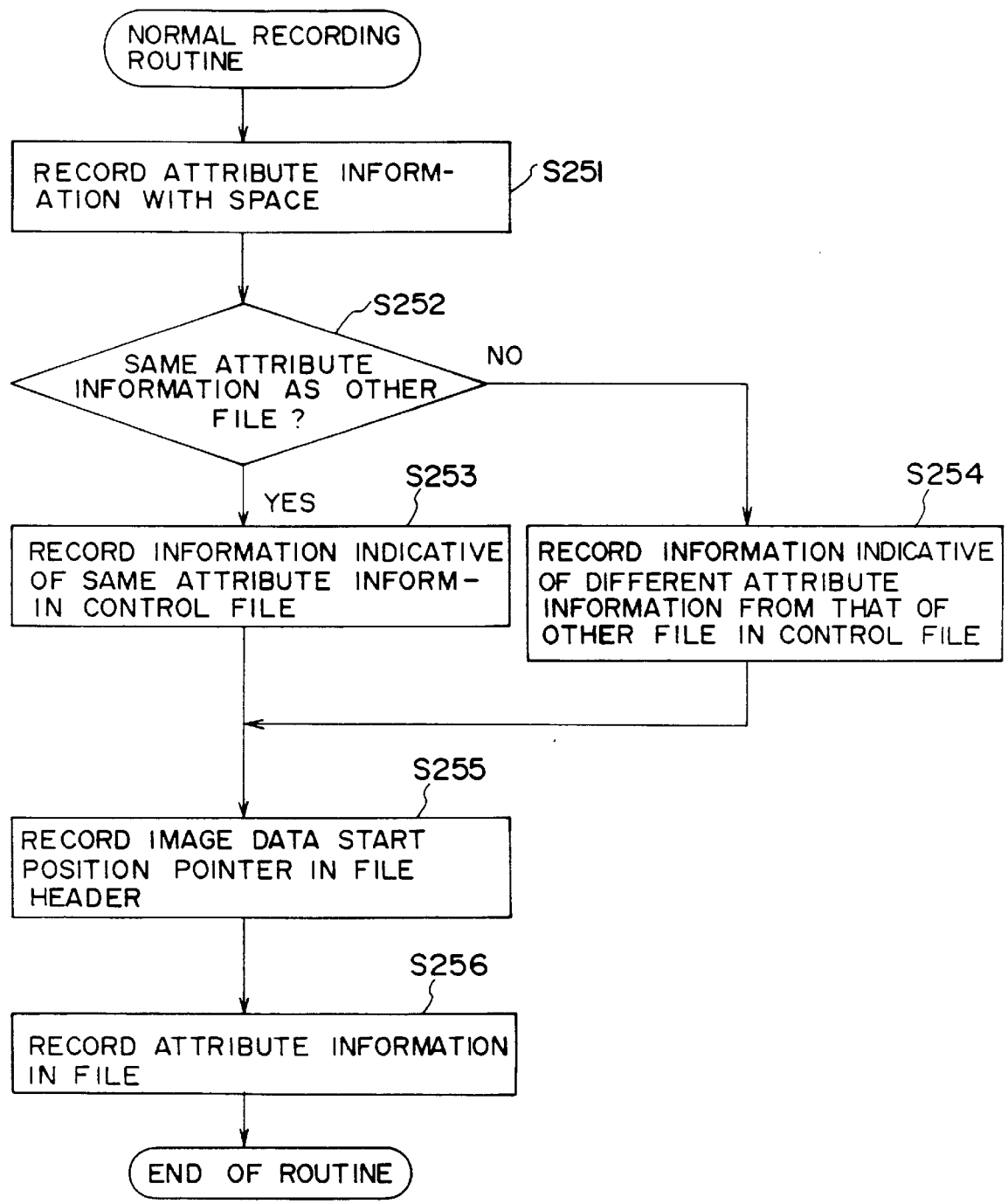
FIG. 79 shows flow charts of the normal recording routine of the embodiment.

Now, the normal recording routine will be described with reference to FIG. 79.

First, attribute information is stored by securing a vacant or empty write area (step S251). Then, a check is made as to whether the attribute information is the same as that of other file (step S252). If the information is determined to be the same, information indicating that the attribute information is the same is written in the control file (step S253). Otherwise, information indicating that the attribute information is different from that of the other file is written in the control file (step S254). Then, the image data start position pointer is written in the file header (step S255), and then the attribute information is written in the file header (step S256), thus completing the routine.

Figure 80:
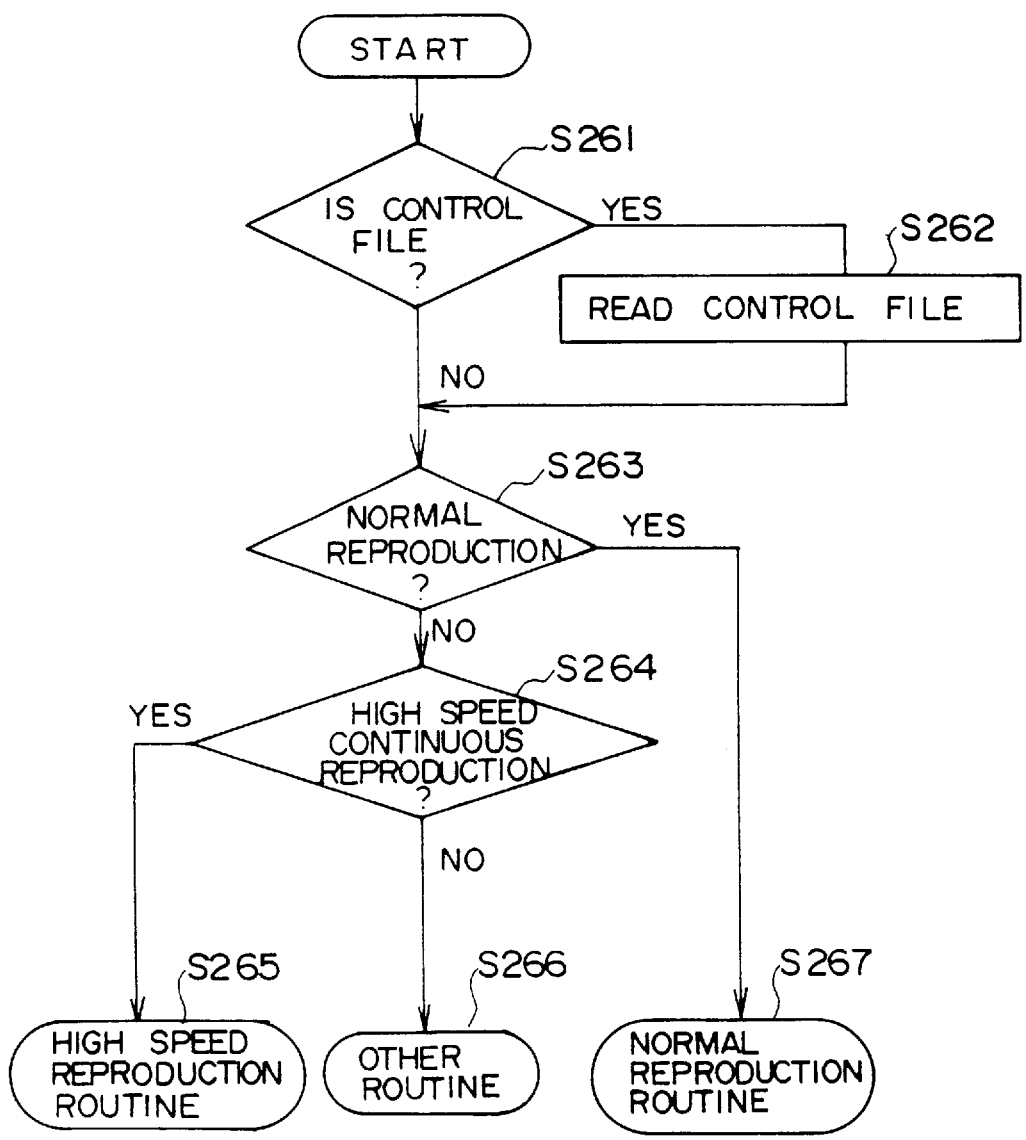
FIG. 80 shows a flow chart of the reproduction routine of the embodiment.

The reproduction routine will now be described with reference to FIG. 80. First, a check is made as to whether there is a control file (step S261). If there is a control file, it is read out (step S262). If it is determined in the step S261 that there is no control file, a check is made as to whether normal reproduction is designated (step S263). If the normal reproduction is not designated, a check is made as to whether high speed continuous reproduction is designated (step S264). If designated, the high speed reproduction routine is executed (step S265). If not designated, another designated routine is executed (step S266). If it is found in the step S263 that the normal reproduction is designated, the normal reproduction routine is executed (step S267).

Figure 81:
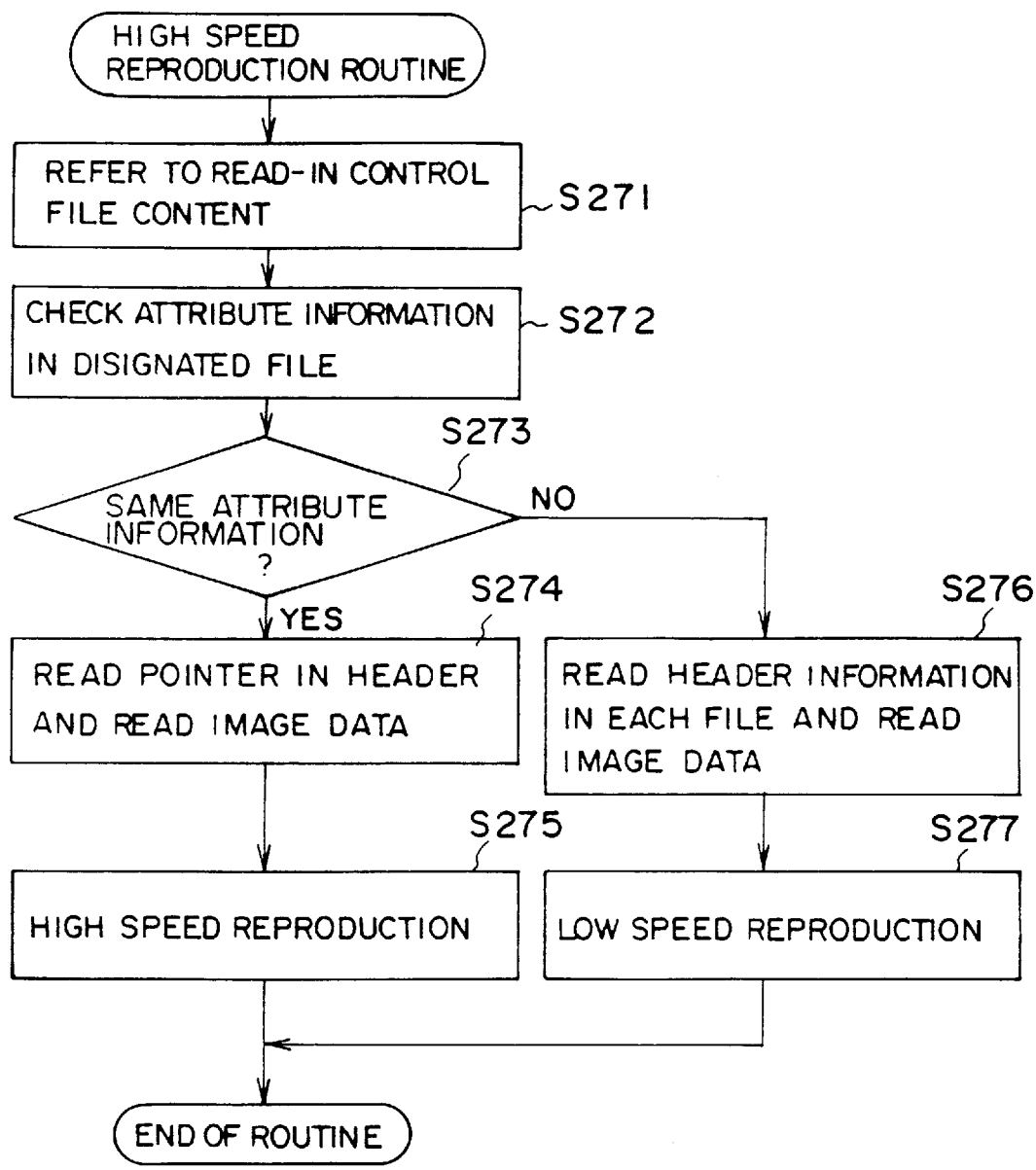
FIG. 81 shows a flow chart of the high reproduction routine of the embodiment.

FIG. 81 shows the high speed reproduction routine. First the stored control file content is referred to (step S271). After checking the attribute information in the designated file (step S272), another check is made as to whether the attribute information is the same (step S273). If it is determined that the attribute information is the same, the pointer stored in the outset of the header is read out, and the image data is read out (step S274). Then, high speed reproduction is executed (step S275), thus completing the routine. If it is determined in the step S273 that the attribute information is not the same, after the attribute information written in the header in each file is read out, the image data is read out correspondingly (step S276), and then low speed reproduction is executed (step S277), thus completing the routine. The embodiment described is applied to a still picture camera, but it is also possible that image data files are supplied externally for processing in a personal computer or like computer.

Figure 82:
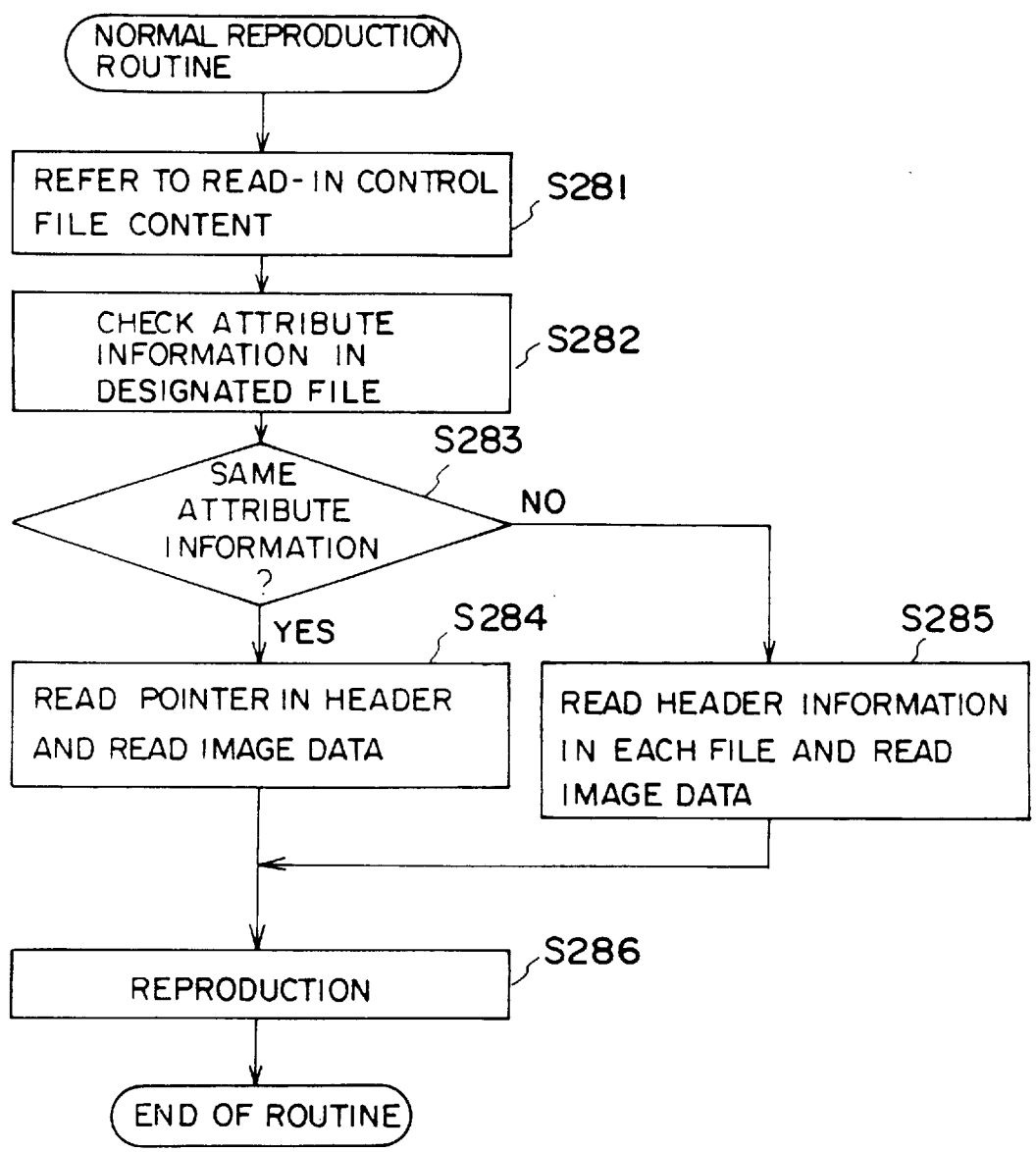
FIG. 82 shows a flow chart of the normal reproduction routine of the embodiment.

The normal reproduction routine will now be described with reference to FIG. 82. First, the stored control file content is referred to (step S281). Then, the attribute information of the designated file is checked (step S282). Then a check is made as to whether the attribute information is the same (step S283). If the attribute information is the same, the pointer stored in the outset of the header is read out, and the image data is read out (step S284). Otherwise, the attribute information stored in each file header is read out (step S285). After the steps 284 and 285, the reproduction routine is executed (step S286), thus completing the routine.

Figure 83:
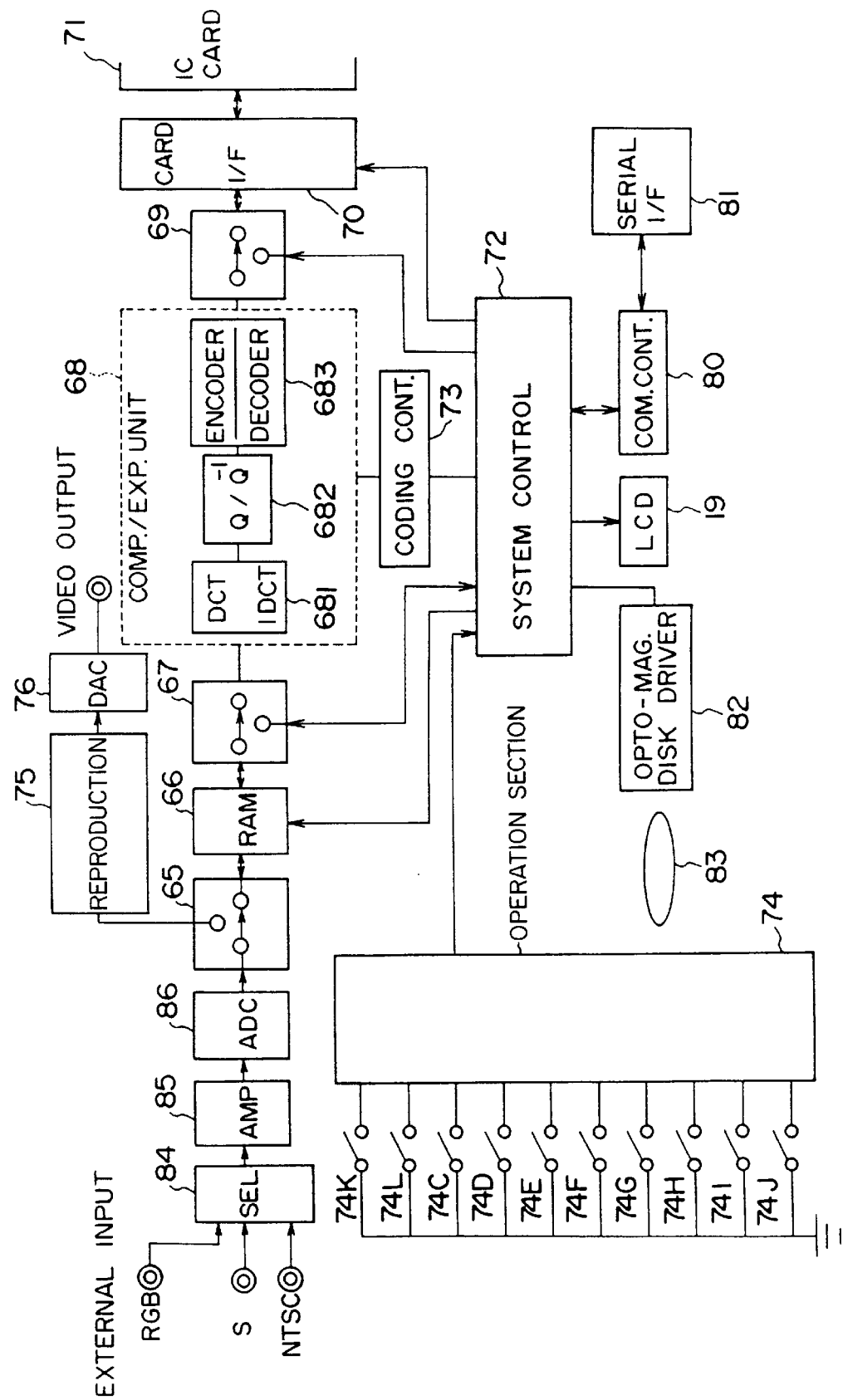
FIG. 83 shows another block diagram of the image recording and reproducing apparatus according to the embodiment.
Figure 84:
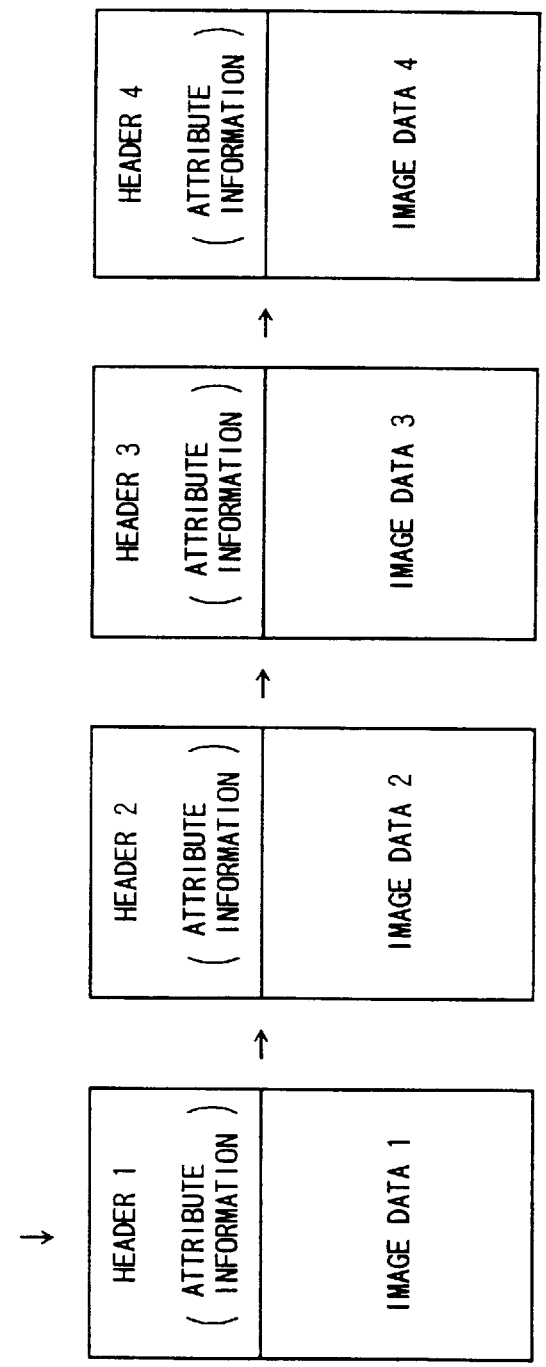
FIG. 84 shows a file structure where a plurality of the image data are continuously recorded.

FIG. 83 shows a different embodiment of the recording and reproducing apparatus according to the invention. In this apparatus, recording and reproducing processes are executed with respect to a opto-magnetic disk 83 as well as an IC card memory 71. In the drawing, parts designated by reference numerals like those in FIG. 75 have like functions. The operating unit 74 is provided with a START switch 74K and a STANDBY switch 74L. Recording signal is input as an external input in the form of RGB (color) signal, S (sound) signal and NTSC signal. These input signals are selected by the selector 84, amplified by the amplifier 85 and then converted in the A/D converter 86 into a digital signal which is supplied to the selector 65.

Image data provided from the RAM 66 through the selector 67 and compressed image data provided through the selector 69 are coupled through the system controller 72 to the opto-magnetic driver 82 to be stored in the opto-magnetic disk 83.

As shown above, with the above image data recording and reproducing apparatus according to the invention conditions representing the relation of individual data (such as data form, pixel size and compression system) are stored as attribute information of an image file in a control file while storing the image data start position as a pointer near the forefront of the control file. In reproduction, the control file is referred to, and with image data files stored under the same conditions, only the header of the first image data file is read out, and with the following image data files the image data can be immediately read out and reproduced by reading the pointer and without reading the header section. Thus, high speed reproduction is possible.

FIG. 85 schematically shows an example of the organization of files stored in the embodiment of the invention. Individual image data files (B) to (E) have respective header sections 1 to 4 and image data sections 1 to 4. In an attribute area of each header section is described information necessary for the image reproduction (such as a pointer indicative of the start position of image data in each file, the compression system and various tables for data compression and expansion). In the image data section, image data is stored.

In the conventional apparatus, image data is reproduced by effecting an expansion process on the data after reading the header section in each file. That is, it is necessary to read the header section in each file. This interferes with high speed reproduction. In this embodiment, the above various kinds of information necessary for reproducing the image are described in a file (i.e., control file) representing the relation of the individual data separately from the image data. Thus, in the reproduction it is necessary only to make reference to the control file, and there is no need to read out the attribute information in each file. In addition, it is possible to read data by skipping the attribute information from the image data start position information (pointer) described in the attribute information area. Further, it is possible to grasp various tables necessary for reproducing each image data file without retrieving the file and instead use information stored in the control file. Further, since attribute information is stored in a standardized form in each file, it is of course possible to reproduce each file in the usual way.

Further, with the above arrangement, by reading control file (A) it is possible to confirm the attribute of each file when inserting (or loading) the storage medium (IC memory card) or closing the power source, thus making it ready to execute expansion reproduction of compressed image data, it is possible to realize high speed image reproduction with a simple routine.

Further, to facilitate management when intended image files are transferred to a personal computer, an INDEX small display may be produced by utilizing a DC component in each image block extracted in the compression of each image data file and described together with control file table information. Actually, an information storage area is provided in a last portion of the control file, and small display area information of each image data file is described together with the image data No.

More specifically, as attribute information for reading and reproducing file data, pixel organization, pixel size, coding system, pick-up date, pick-up information (name, shutter speed, exposure, etc.), a pointer indicative of image data start position, table data for determining the extent of image compression and so forth are described in the file header. As the table data, are quantization table and coding table. The optimum values of these tables vary with the kind of externally input signal (RGB, Y, C, NTSC, PAL, etc.), and the reproduction is executed in an optimum system. The image data body is stored in an image data area subsequent to the file header. In each file header various kinds of information are described. Therefore, it is difficult to prescribe a uniform header size, and the header size is variable. For this reason, it is not easy to determine the location of each information described. Accordingly, the image data start position in each file is described as a pointer in the control file for collective management, thus facilitating management of the information. Further, when a medium with storage of various different kinds of image files is reproduced, the case of using the standard tables and the case of using exclusive tables for recording recur. Thus, a simple process is possible by executing similar routines.

As noted above, in the above embodiment the same information as the content of each item of attribute information that is described in the file header is also described in the control file, thus facilitating information management and permitting an increase in processing speed. Further, the software of the apparatus can be simplified and can be implemented with small programs. In this case, the overall storage capacity is slightly increased. However, this has only a small influence on program size because of the small capacity of the header itself.

FIG. 86 shows an example of the IC card memory organization.

Layer 1 has attribute information area level 1, in which information indicative of the kind, speed (access speed) and capacity of the device are described. Layer 2 has attribute information area level 2, in which an address of first data, block length, initialization date, manufacturer information, etc. are described.

The memory management area includes a boot sector, in which a standard Ver. No. and BPB (Bios Parameter Block) indicative of the description system of the file are described, a FAT, in which a table showing the connection of data is described, and a directory, in which the file name, file attribute, date, start cluster, file size, etc. are described.

The image data file area has a header information area, in which an image data pointer, standard name, Ver., compression system, pixel organization, distinction between compression and expansion, field/frame, pick-up date and various table data are described, and an image data body area, in which SOI, ..., SOF, ..., SOS, ... indicative of the start and EOI indicative of the end are stored.

In the control file, the above attribute information and relational information are described in ASCII codes, and also additional information (various table data) is described as binary data. The attribute information and relational information are described in ACSII codes because of their high frequency of re-writing by the user, whereas the additional information is described as binary data because of its low re-writing frequency.

FIG. 87 shows an example of the image data file organization (example of the pointer). As shown, an ID representing the pointer, Number of bytes up to the next ID, forefront position of image data (in this example :0400h": 1 kB), ID indicative of the standard, "S" of the standard, "C" of the standard, ID indicative of the pixel size, number of bytes up to the next ID, pixel size (768×480), ID indicative of signal form, number of bytes up to the next ID, signal form (Y/C), and "SOI" and "EOI" codes respectively indicative o the start and end positions of the image data body in the JPEG file are described. If the above image data file is a JPEG file, the pointer indicates the position of the "SOI" code representing the start position of the JPEG image data body and is the same as what is described in the control file. Usually, various tables are not described in the header. However, when using encoding and quantization tables other than the standard ones are used, they are described in the header to facilitate the management.

FIG. 88 shows an example of the data organization (i.e., file organization) in the storage medium.

Referring to the drawing, the root directory has a control file #1 for usual recording and normally stored three image data files and sound data files #2 and #3. In a subdirectory for continuous high speed storing, continuously stored image data are stored in eleven files #4. As shown, a single control file may be provided in the root directory, and relational management of all the files may be made by using this single file alone.

In the example of FIG. 88, the content of the attribute information of all the files including speed and picture may be known from the content of the control file #1, and there is no need of retrieving and recognizing randomly located file headers. Thus, it is possible to facilitate the process and permit high speed reproduction of the data. It is possible as well to provide a control file in each directory for the relational management of the files in the directory.

Figure 89:
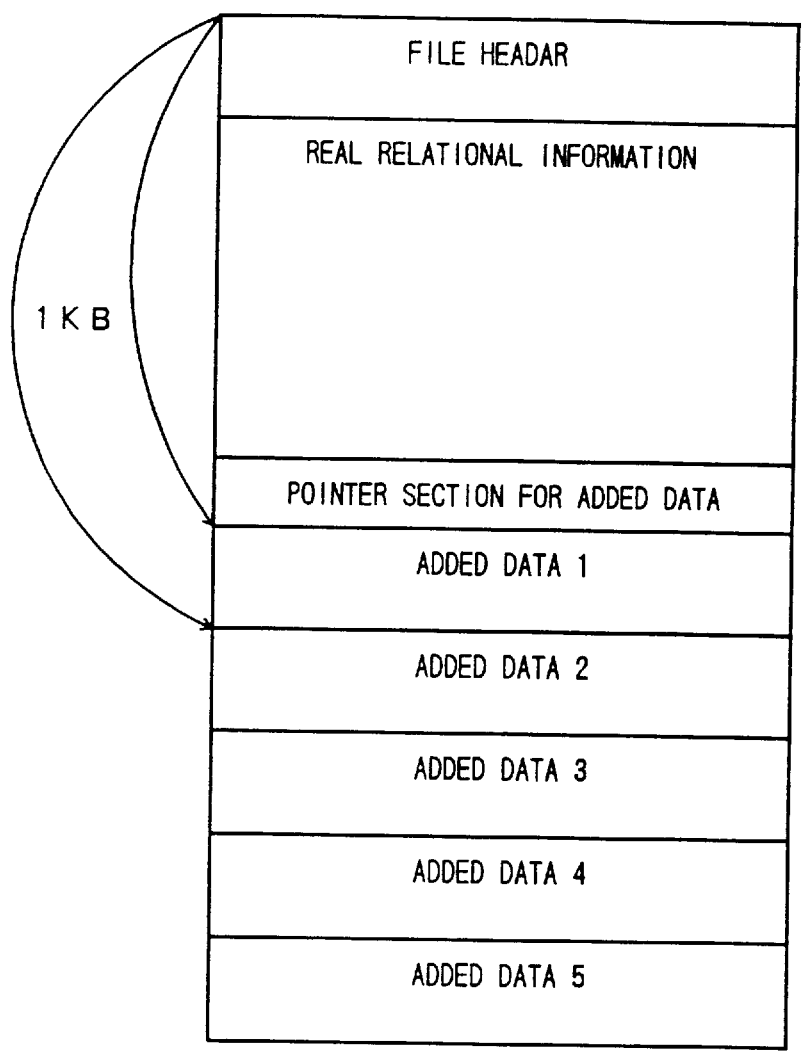
FIG. 89 shows a structure example of the relational information file of the embodiment.

FIG. 89 shows an example of the organization of the control file. The personal computer editors (text software) and word processor software usually adopt ASCII codes for the description. Otherwise, usual character display can not be obtained. Therefore, for facilitating the management of information, the relational information in the control file is described in ASCII codes. However, for reducing the capacity all storage may be made in binary data.

In the file header, information indicative of the control file is described. In the next area, relational information, attribute information, etc. of all the files included in the storage medium are described in ASCII codes. In the subsequent additional information areas 1 to 5, a coding table, quantization table, non-compressed small picture, etc. are written in respective blocks. These items of information are written in the form of binary data. The last additional information in the control file is written not in ASCII codes but in binary data for convenience in management. Specifically, in the last of the relational information a pointer indicative of the forefront of each additional information is described to facilitate management.

FIG. 90 shows an example of the description of the control file #1 in the root directory shown in FIG. 88.

Referring to the drawing, labeled #1 are basic values of flag expressions of attribute information table and attribute information of each file. For example, "DISP. REZO" expresses the display resolution in terms of the pixel size. "1" represents "640×480", "2" represents "768×480", and "3" represents "1024×768". In "SIGNAL TYPE", "1" to "3" respectively represent RGB, Y/C and YMCB. In "HUFFMAN TABLE" (coding table) "1" represents standard, and "2" and "3" represent custom tables "2" and "3", respectively. In "Q-TABLE type" (quantizaton table) "1" represents standard, and "2" to "4" represent custom tables 1 to 3, respectively. Further, in "SOUND SAMPLING CLOCK", "1" represents 44 kHz, "2" represents 22 kHz, "3" represents 11 kHz, and "4" represents 5.5 kHz.

In a portion #2 subsequent to the description "TABLE" showing the start of file management information, stored image data file, image data pointer, attribute information flag and image No. (frame No.) are described. Here, image data pointer #21, "DISP REZO." #22, "SIGNAL TYPE" #23, "HUFFMAN TABLE" #24 and "Q-TABLE TYPE" #25 are specified in the form of respective numbers.

In a portion #3, the pointers of the stored sound file and sound data, sound number (frame number) are described. #31 and #32 describe pointer and "SOUND SAMPLING CLOCK", respectively.

In a portion #4, a control file of the root directory is described.

In a portion #5, stored subdirectory image files and image data pointers are described. It is seen that the eight image data files are stored under the same conditions.

Referring to FIG. 91, "INFO." representing information is described. In a portion #2 the interval time (in sec.) is described. In a portion #3, eight continuously stored image data files are described. In a portion #4, each table data is described in block form in each data area, and a pointer indicative of the forefront position to the Huffman table is described. In a portion #41, a pointer to Huffman table 1 is described, in a portion #42, a pointer to Huffman table 2, in portions #43 to #45, pointers to quantization tables 1 to 3 are described, and in a portion #5 various items of information are described. In this example, the described data are binary data incapable of being edited, and the above various tables are described continuously in blocks.

Figure 92:
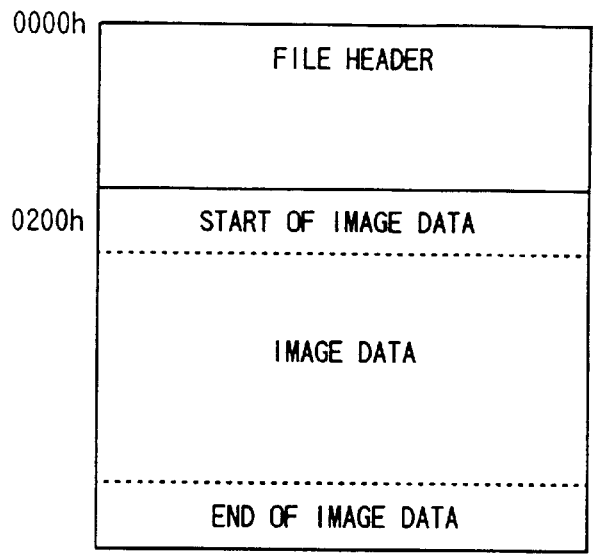
FIG. 92 shows an example of the image file structure of the embodiment.

FIG. 92 shows an example of the image data file organization. The file is organized from a file header and an image data body. In the file header, such information as the number of pixels of the subsequently stored image data and coding system is stored. At the outset of the header, information indicative of the "DSC" specification file, symbol representing the image organization and specification version No. are described as specification name, thus facilitating the management. The header is usually 512 B (the size being described in a tuple in the header). In case when data is not compressed, the data again starts from "0200H" and is usually of 512 B (which is described in the header).

Figure 93:
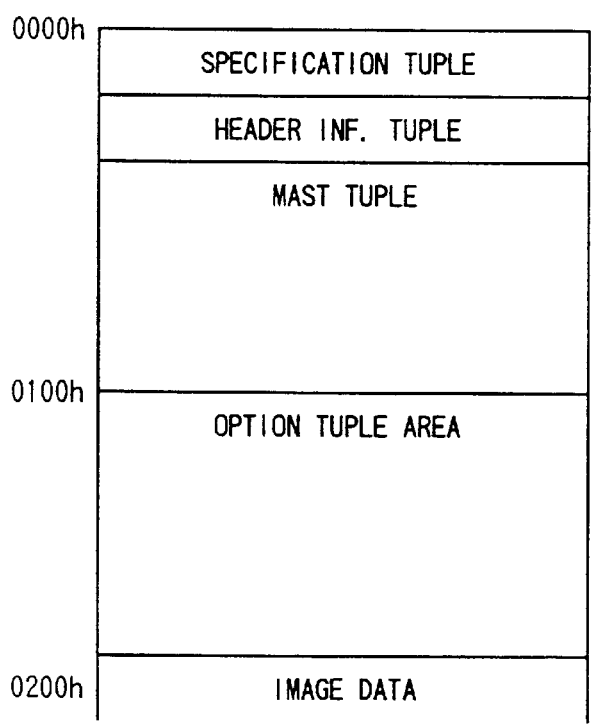
FIG. 93 shows an example file header of the embodiment.

FIG. 93 shows an example of the file header. The leading 512 bytes of the file is allocated as the file header for managing the data body. In the first place, a specification tuple is described for discrimination of the basic data kind. As its contents, the specification name and version No. are described. Then, a header information tuple is provided, and the total number of bytes in the header is described. Then, a mast tuple is provided, and information concerning image is described. Then, 256 bytes afterwards an option tuple area is provided to permit description of such contents as comments as desired. In the option tuple area, individual items are all described in the tuple form.

The image data body starts from "0200h" (as described in the header information tuple). The forefront of the option tuple area is fixed at "0100h". As the option tuple area 256 bytes are allocated even if no description is made. In FIG. 94 is described an example of the specification tuple. FIG. 95 shows an example of the description of the header information tuple. In this tuple, the total number of bytes in the header is described. FIG. 96 shows an example of the description of the mast tuple. In this tuple, necessary information concerning the image data is described. FIG. 97 shows an example of the description of the option tuple area. In this area, auxiliary items concerning the image data are described. FIGS. 98 and 99 show header description contents. FIG. 98 shows the content of the mast tuple, and FIG. 99 shows the content of the option tuple.

Now, the contents of each tuple will be described in detail. The contents of the specification tuple are as follows.

00: Tuple ID (representing the forefront of the specification tuple, "80h" being described).

01: Off-set (the off-set value up to the next tuple being described).

02 to 11: Specification name, version (indicating the tile conforming to this standard, 16 characters being described in ASCII codes).

The contents of the header information tuple are as follows.

00: Tuple ID (representing the forefront of the header information tuple, "81h" being described).

01: Off-set (the off-set value up to the next tuple being described).

02 to 03: Total byte number (the total number of bytes in the header being described, the forefront of the data body being present this many bytes after the forefront of the file).

The contents of the mast tuple are as follows.

00: Tuple ID (representing the forefront of the header information tuple, "82h" being described).

01: Off-set (the off-set value up to the next tuple being described).

02 to 0D: Date (the date of the pick-up being described in ASCII code, one byte being used for each digit, low-order two places of the Christian Era year being written).

0E to 0F: Reserved.

Now, reference values of the header contents will be described. It is assumed that each image data file has its own header content reference values. For example, reference values are predetermined for individual items as shown in FIG. 100. When and only when all these reference values are used, a flag (D7) indicative of the use of the reference values is provided at a location, in which the coding system is set.

Now, an example of the image data organization will be described.

In the case of non-compressed data organization, one pixel in a component with the least horizontal and vertical pixel number and pixels in different components corresponding in number to a sample ratio are combined to obtain a unit. For example, in a combination of three components Y, Cd and Cr, with Y and C in a ratio of 2:1 horizontally and 1:1 vertically, the pixel arrangement is as shown in FIG. 101. With such an image, the data is rearranged into the following sequence, the sequence of Y/Cd/Cr conforming to the component storage sequence noted before.

Y0, Y1, Cb0, Cr0, Y2, Y3, Cb1, Cr1, Y4, Y5, Cb2, Cr2, Y6, Y7, Cb3, . . .

In the compressed data organization (JPEG), the compressed data conforms to the JPEG baseline system. The following limitations are provided.

Only block interleave is used.

Restart interval may be used.

APPn, COM, DRI, RST and DNL may be inserted.

A quantization table and Huffman table should be provided.

Even with the quantization table or Huffman table provided, all settings are made with a single DQT marker or DHT marker. That is, one DQT marker and one DHT marker are to be provided in one image.

The quantization table and Huffman table are provided between SOI and SOS markers.

The pixel number and other parameters should have reference values as noted above.

FIG. 102 shows JPEG data meeting the above requirements. Because only the block interleave is used, only a single scan header is provided. An example of the description of the MCU is shown in FIG. 103. For each Cb and Cr, two Ys are provided in the horizontal direction. Since the number of components and number of pixels are determined, the frame header is as shown in FIG. 104. The index Cn of each component is ASCII code Y, B and R. In the illustrated example, one quantization table is assigned for Y, and one for C. When assigning independent quantization tables to Cb and Cr, the value is shown within braces.

As for the scan header, three components are included in the scan because of use of the interleave. The last three bytes are baseline and thus fixed.

FIG. 105 shows an example in which one AC and one DC Huffman table is assigned to Y and C each. When the Huffman table is assigned differently, the underlined byte value is changed.

Figures 106, 107:
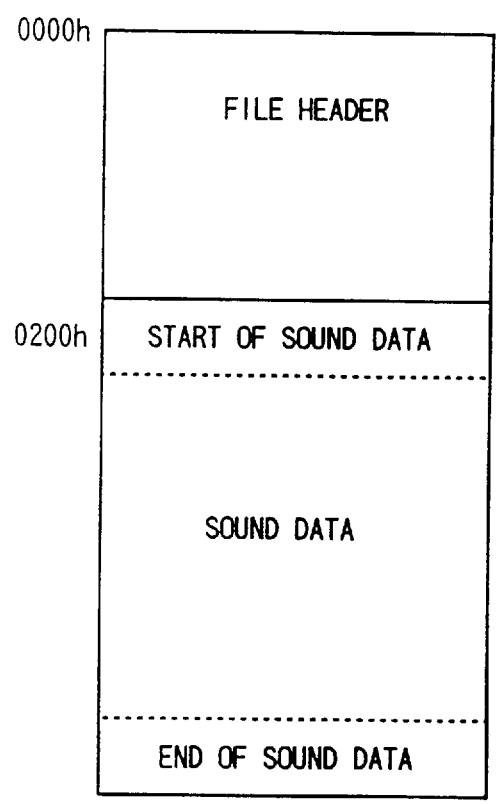
FIG. 106 shows examples for defining two quantum tables of the embodiment.
FIG. 107 shows structure examples of the header and speech data of the embodiment.

Two quantization tables are defined as shown in FIG. 106. With other numbers of quantization tables, the numerical value of Lq is changed. With a single quantization table, Lq is "0043". With three quantization tables, it is "00D5". When two Huffman tables are used for AC and DC each, the following definition applies. DRI and RST are stored when and only when the restart interval is made effective. This has to be observed on the reproduction side at all times. (At the start of each restart interval the forecast value of the DC coefficient is made zero.) APP, COM AND DNL markers may be stored. However, when the restart interval is made effective, CNL should be provided at the end of the scan.

Now, the organization of the speech data file will be described.

As shown in FIG. 107, the file is organized from a file header and a speech data body. The file header contains such information as sampling and system of compression of the following stored speech data. Further, as the specification name, information indicative of the "DSC" specification file, symbol indicative of the speech organization and specification version No. are described in the header, thus facilitating information management. The size of the header is usually 512 B. (The size is described in a tuple in the header.) In the non-compression case, the data body also starts from "0200h". Usually the size is 512 B (which is described in the header).

Figure 108:
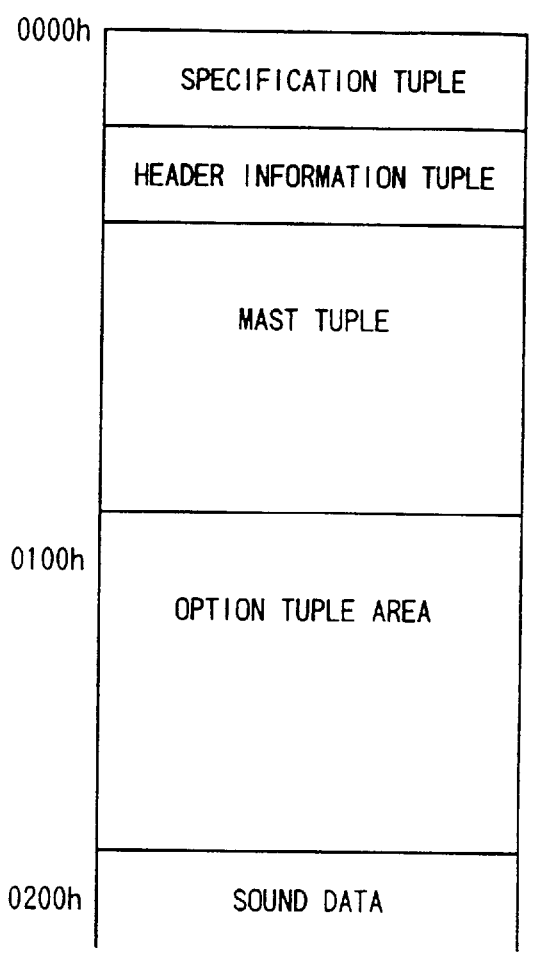
FIG. 108 shows an example for managing the data with the preceding 512 bytes of the file as the file header of the embodiment.

As shown in FIG. 108, the first 512 bytes in the file are allocated as a file header for the management of the data body. First, basic specifications are described in the specification tuple. The contents described are the standard name and version No. Then, a header information tuple is provided to describe the total number of bytes of the header. Then, a mast tuple is provided to describe information concerning the speech. 256 bytes afterwards, an option tuple area is provided to permit description of comments or like contents as desired. The individual items in the option tuple area are all described in the tuple form.

The speech data body starts from "0200h" (which is described in the header information tuple). The forefront of the option tuple area is at "0100h" (fixed). 256 bytes are provided for the option tuple area even if nothing is described.

FIG. 109 shows an example of the description of the specification tuple. Here, the specification name and version No., representing the attribute of the file, are described. FIG. 110 shows an example of the description of the header information tuple. Here, the total number of bytes of the header is described. FIG. 111 shows an example of the description of the mast tuple. Here, necessary information concerning the speech data is described. FIG. 112 shows an example of the description of the option tuple area. Here, auxiliary items concerning the speed data are described.

Now, the contents described in the header will be explained.

FIG. 113 shows the contents of the mast tuple.

Of the individual tuple contents, the specification tuple contents are as follows.

00: Tuple ID (representing the forefront of the specification tuple, "80h" being described).

01: Off-set (the off-set value up to the next tuple being described).

02 to 11: Specification name and version (representing the file conforming to the standard, 16 characters being written in ASCII codes).

The contents of the header information tuple are as follows.

00: Tuple ID (representing the forefront of the header information tuple, "81h" being described).

01: Off-set (the off-set value up to the next tuple being described).

02 to 03: TOTAL BYTE NUMBER (the total number of bytes in the header being described, the forefront of the data body being located this number of bytes after the forefront of the file).

The contents of the mast tuple are as follows.

00: Tuple ID (representing the forefront of the header information tuple, "82h" being described).

02 to 0D: Date (the date of storage being described, using one byte for each digit, in ASCII codes, low-order two digits of the Christian Era year being described).

0E to 1F: Reserved.

The contents of the option tuple area are as follows.

00: COMMENT tuple ID (representing the forefront of the comment tuple, "83h" being described).

01: Off-set (the off-set value up to the next tuple being described, tuple end code (FFh" being described in case when there is no subsequent tuple).

02 to XX: Comment (an area for describing names of materials used for recording in ASCII codes and with 253 alphabet letters or 126 Chinese characters).

XX+1: Command end code (code (00h) representing the end of the command being described).

The individual speed data files have respective header content reference values. For instance, for the DSC SOUND1 system speech data file reference values as shown in FIG. 114 are predetermined. When and only when all these values are used, a flag (D7) indicative of the use of the reference values is set in a location for setting the coding system.

The data organization will now be described. In the organization of non-compressed data, sampled and quantized data are stored in the sampling sequence, as shown in FIGS. 115(A) and 115(B). In the case of a plurality of channels, the data are stored sequentially in the sequence of description in the speech data information tuple.

In the organization of compressed data, the coded speech data are stored sequentially according to the speech data information tuple coding system, as shown in FIGS. 116(A) and 116(B). In the plural channel case, the data are stored point sequentially according to the sequence of description in the speech data information tuple.

When 8-bit/sample data is compressed to 4 bits using ADPCM as the standard compression system, the data is stored in 8-bit packs at byte boundaries in the output sequence, as shown in FIGS. 117(A) and 117(B).

Now, an example of the organization of the control file will be described in detail.

Figure 118:
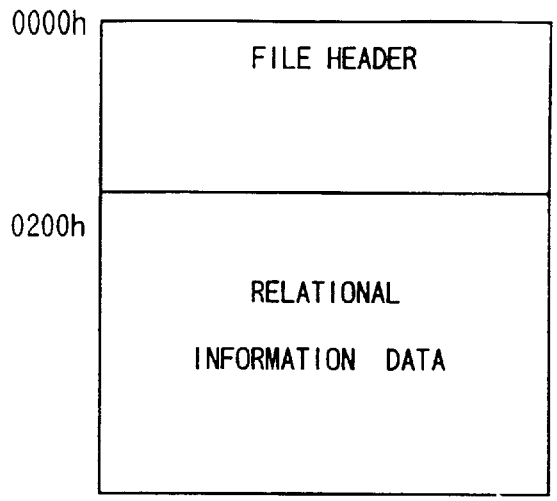
FIG. 118 shows a structural example of the control file of the embodiment.

As shown in FIG. 118, the file is organized in the form of a file header and relational information concerning each file. The main contents of the file are as follows.

1: Management of the track No.
2: Relation of a plurality of files (continuous pick-up, simultaneous reproduction of image and speech, program reproduction)
3: Brief organizational judgment of each file (data start position, etc.)

As the specification name, information indicative of the "DSC" specification file, symbol representing management information and specification version No. are described, thus facilitating the management. The header is usually of 512 B (the size being described in a tuple in the header).

The relational information is described in blocks each for each content and each in some vacant space. Thus, if information is increased, the new content may be written additionally. Further, if a predetermined space is increased, it is divided, and the new content is written in the last division. For such management, the items of information and the locations of their description are described in the header. Further the group, such as track, drive, program simultaneous sound reproduction, as well as the group No. and start address are described in the header.

Figure 119:
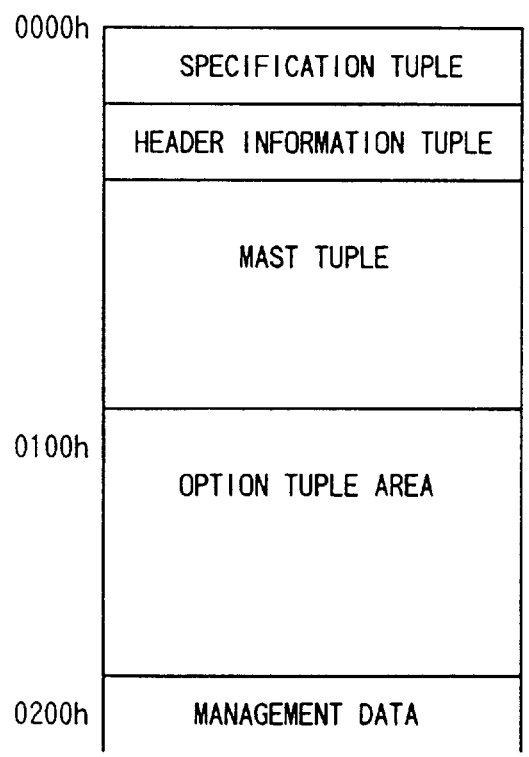
FIG. 119 shows a structural example of the file header of the embodiment.

An example of the file header will now be described in detail with reference to FIG. 119.

The first 512 bytes of the file is allocated as the file header for managing the data body. First, basic items are described in a specification tuple. That is, the standard name and version No. are described. Then, a header information tuple is provided, and the total number of bytes of the header is described. Then, a mast tuple is provided, and information concerning the management is described. 256 bytes afterwards, an option tuple area is provided to permit description of comments or like contents as desired. Individual items are described in the option tuple area in the tuple form.

The management information body starts from "0200h" (as described in the header information tuple). The forefront of the option tuple area is fixed at "0100h". As the option tuple area, 256 bytes are allocated even if nothing is described.

FIG. 120 shows an example of the description of the specification tuple. The specification name and version No., representing the attribute of the file, are described.

FIG. 121 shows an example of the description of the header information tuple.

FIG. 122 shows an example of the data organization of the file. Relational information describes the relation of the individual files contained in the medium. Basically, an expression ready to be recognized on the personal computer side is used.

Now, as a further embodiment of the invention grouping with control file will be described. As shown in FIG. 123, a flag representing the recording mode for recording individual image data is added to the control file. That is, the flag as shown is set in an attribute information table (INFO. TABLE).

Further, file management information is described in the manner as shown in FIG. 124.

In the prior art, successively stored data are collectively accommodated in a separate directory. If such different modes as multiplex exposure or monochromatic picture are introduced in this directory, it is possible that two or more different modes such as multiplex exposure successive storing or successive monochromatic pictures are held simultaneously. In such a case, confusion is likely. According to the invention, with the above prescription a flag can be provided to each of various modes, thus permitting grouping and improving the property of retrieval.

Now, an example of grouping will be described according to the file name will be described with reference to FIG. 125. In the MSDOS, a file name comprising eight alphabet letters and a three-letter extender is provided to each record of data. By using this file name, the recording mode of each record of image data is described as shown in FIG. 125(A). As for the kind of recording, the normal recording is represented by NOM, the successive recording by CON, the multiplex exposure by MEX, monochromatic imaging by MON, multiplex successive recording by MEC, and monochromatic successive recording by MOC. The group is used as the No. of each recording mode. For example, it represents the serial number of recording in a series of successive recordings. The serial No. represents the serial number in each group. For example, it represents the serial No. of data stored in successive recordings.

The file name that is written in the above way is as shown in FIG. 125. With such a file name it is possible to group individual image data without reading the contents of each file of image data or the like but by merely reading the file name of the root directory. This is effective for improving the retrieval property and also for high speed reproduction.

Further, it is possible to obtain grouping with the header of image data. That is, a comment tuple in an option tuple in the header is used to describe various recording modes as shown in FIG. 126. In this case, in the absence of recording mode information, a judgment that the mode is the normal recording mode is made. Monochromatic recording is prescribed with a separate flag.

Following is an example of the application of grouping according to the invention.

First, the implementation of virtual reality will be discussed.

In CG, virtual reality (VR) or image processing, many natural pictures are required. This is so because in CG it is very difficult to produce natural pictures due to the production time and capacity of the man who produces the pictures. In order for natural pictures to be used efficiently in CG or VR, it is most efficient to take and file still pictures of actual objects (such as carpets, desks, kitchens, and outdoor scenes) . However, when using natural pictures in VR, although the images can be easily enlarged, contracted and rotated, it is very difficult to change the angle at which an object is seen, or to re-process a picture of an object at hand into a picture of the object seen at a distance. Therefore, pictures in natural picture files for VR and CG pictures picked-up at various angles and also pictures picked-up at various three-dimensional angles have to be filed together with their pick-up angles as material for a VR application.

Figure 127A:
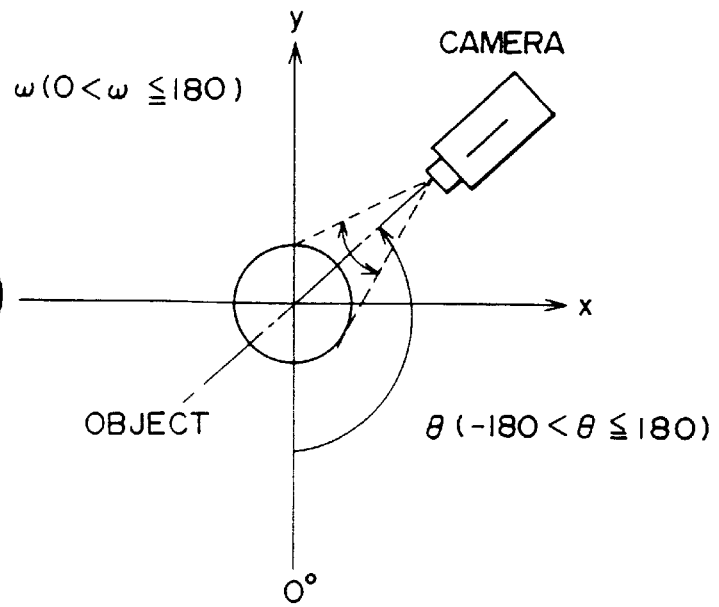
Figure 127B:
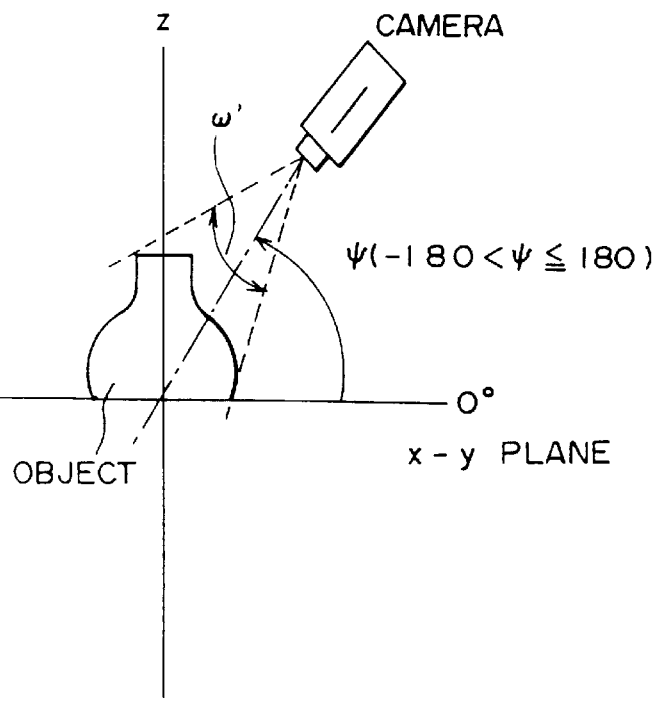

Accordingly, various data are described by providing the following flags. When a vase is picked-up as data for VR as shown in FIGS. 127(A) and 127(B), three flags, θ, ψ and ω (ω') the defined. The flag θ is angle information (−180<θ≦180) in the XY plane, the flag ω is angle information (−180<ω≦180) in the Z axis direction, and ψ is a three-dimensional angle (0<ψ≦180) of the subject as seen from the camera.

By defining the flags as above, a natural picture can be represented by the three flags θ, ψ and ω. An example of describing the control file is shown in FIG. 128. As shown in FIG. 128(A), a description of adding a flag to attribute information table (INFO. TABLE). Also, file management information is described as shown in FIG. 128(B).

In the above example, the information for grouping was described in the control file. However, it is possible to describe the information in the image data file header. This is possible by using a comment tuple as in the previous example. Values are set in the locations of θ, ψ and ω in FIG. 129.

As a different example, the definition of the processed file will be described. #1 to #5 indicate that the pertinent image data files are the following processed (i.e., other than original) files.

1: Multi picture (1×2, 2×2, 3×3, 4×4, . . . )

2: Menu picture (1×2, 2×2, 3×3, 4×4, . . . )

3: Copied picture

4" Composed picture

5: Picture copied by transmission via telephone or the like.

These kinds of pictures are described in the control file as shown in FIG. 130. That is, the illustrated flags are added to the attribute information table (INFO. TABLE).

In the above example, the information for grouping was described in the control file, but it is possible to describe the information in the image data file header as shown in FIG. 131. This is possible by using a comment tuple as in the previous example.

Further, it is possible to provide a flat indicative of an interpolated signal. More specifically, if signal in either odd or even effective horizontal lines of a stored picture is produced by interpolating an original signal, a flag indicative of this is prescribed. This is advantageous when copying or dubbing data in that if the above condition is known, copying of the original signal may be made in preference. This example is applicable to a case when frame picture is produced with a field imager output or when a field picture or frame picture is produced by using a color line sequential output imager.

FIGS. 132(A) to 132(C) show an example of description in the control file. A flag as shown in FIG. 132(A) is added to attribute information table (INFO. TABLE). FIG. 132(B) shows the meaning thereof. FIG. 132(C) shows the description of the file management information.

Although in the above example the information for grouping was described in the control file, it is possible to describe the information in the image data file header as shown in FIG. 133. This is possible by using a comment tuple as in the above embodiment.

Now, the operation of the image data recording and reproducing apparatus according to the invention will be described with reference to the flow charts of FIGS. 134 to 139.

When the apparatus is rendered operative with the insertion of the IC memory card or with the closure of the power source, a check is made as to whether there is a control file (step S291). If there is no control file, the normal management routine with the file header is executed (step S292). If there is a control file, it is read in (step S293), and management process based on control file is executed (step S294). After the steps S292 and S294, whether recording is designated is checked (step S295). If it is designated, whether the record capacitance is sufficient is checked (step S296). If there is a problem in the record capacitance, an alarm display process is executed (step S297). If there is no problem, a record mode is executed (step S298). If it is found in the step S295 that no recording designation is made, a reproduction mode is executed (step S299).

The recording operation will be described with reference to FIG. 135. When it is detected in a step S301 that the STANDBY button is depressed, recording into the frame memory (step S302) and display image freeze (step S303) are executed, and then a check is made as to whether the recording start button is turned on (step S304). If the start button is turned on, a display of the recording state is made on the LCD 18 (step S305), the data compression routine is executed (step S306), and data is written in the IC memory card (step S307). Then, recording in the control file is executed (step S308), thus completing the recording routine.

FIG. 136 shows the routine of writing in the control file. As shown, attribute information described in the file header is flag processed (step S311), and individual items of the attribute information are prepared in a predetermined order (step S312). Then, a check is made as to whether a different quantization table than the reference one is used (step S313). If no different quantization table is used, preparations for writing information indicative of the use of the standard quantization table in the control file are made (step S314). Otherwise, a data area is prepared as the last area of the control file, and preparations for writing the quantization table are made (step S315). After the steps S314 and S315, a check is made as to whether a coding table other than the reference is used (step S316). If no other coding table is used, preparations are made for writing information indicative of the use of the standard coding table for the control file (step S317). Otherwise, a data area is prepared in the last area of the control file, and preparations are made for writing the coding table (step S318). After the steps S317 and S318, writing in the control file is executed (step S319), thus completing he routine.

FIG. 137 shows the routine in the playback mode. As shown, a check as to whether the process is with the control file is made (step S321). If the process is not with the control file, a normal reproduction routine referring to the header is executed (step S322). If the control file is referred to, a reproduction routine with reference to the control file is executed (step S323), and image data is written to the frame memory (step S324), and data is reproduced (step S325).

FIG. 138 shows a flow chart for the normal reproduction routine with the header. First, the attribute information in the header of the designated file is referred to (step S331), and a check is made as to whether the image data is stored in the compression mode (step S332). If the data is stored in the compression mode, a check is made as to whether the compression mode is the standard mode (step S333). If not, each table in the header is read out and loaded in the reproduction circuit (step S334). If it is determined in the step S333 that the mode is the standard mode, each standard table stored in the system controller is loaded in the reproduction circuit (step S335). Then, the pointer written at the forefront of the header is read out, and the image data is read out (step S336), thus completing the routine.

FIG. 139 shows the reproduction routine with the control file.

In this routine, the read-in contents of the control file are referred to (step S341), and a check is made as to whether the image data is of the compression mode (step S342). In the case of the compression mode, a check is made as to the compression mode is the standard mode (step S343). If the mode is not the standard mode, each table in the control file is read out and loaded in the reproduction circuit (step S344). If the mode is the standard mode, each standard table provided in the system controller is loaded in the reproduction circuit (step S345). Then, the pointer in the control file is read out, and the image data is read out (step S346).

As has been shown, in the image data recording apparatus according to the invention a file (control file) showing the relationship of individual data is provided separately of image data for describing information necessary for reproducing all image and speech data files in the file. Thus, when a reproduction instruction is produced, the status of all the files can be known easily without a routine of retrieving the header of a file in question but from the content of the single file. It is thus possible to increase the speed of the process and simplify the file management. More particularly, effective grouping is possible. The apparatus is thus useful for editing, retrieving and efficiency increase of the reproduction. Further, when the control file or file name is referred to, it is possible to obtain grouping without retrieval of all the image data but by merely reading out the file name of in the control file or root directory file. The apparatus is thus suited for high speed processing.

FIG. 140 is a block diagram showing an SMC as an embodiment of the information recording apparatus according to the invention. An object image is focused through an optical system 101 on a pick-up element of a pick-up circuit 102 for conversion to an electric video signal. The video signal is converted in an A/D converter 103 into a digital signal which is stored in a frame memory 104. Video data read out from the frame memory 104 is converted in a D/A converter 105 into an analog signal and then converted in a video encoder 106 into a video signal, which is displayed on a view finder 107 made of liquid crystal or the like and is also supplied to an output terminal OUT. The video output is further compressed in a compression/expansion circuit 108 and then stored in a memory card 116 through a bus 110 and a card interface (I/F) 109. In reproduction, video data read out from the memory card 116 through the card I/F 109 is expanded in the compression/expansion circuit 108 and then stored in the frame memory 104. Image data read out from the frame memory 104 is converted through the D/A converter 105 and video encoder 106 into a video signal, which is output to the view finder 107 and the output terminal OUT.

The system controller 112 controls the entire camera apparatus. A clock module ill supplies date/time information for executing a process peculiar to the embodiment to be described later to the system controller 112. A non-volatile memory 113 stores information necessary for the operation of the system controller 112. A display panel 114 displays the operational status of the camera device. A set of operation switches comprises various tactile switches for designating camera operations. A buzzer 117 generates an alarm when an inadequate state of camera operation occurs.

In this embodiment, the prior art inconvenience is precluded by setting a predetermined file name with a combination of predetermined calculation results of fixed pattern, serial No. date and time data.

FIG. 141 shows an example of the arrangement of areas in a memory card in conformity to DOS prescriptions. The storage area of the memory card comprises a boot sector area, a FAT area, a root directory area and a data file storage area. The root directory area, as shown in FIG. 142, has continuous areas of directory entries 0, 1, 2, . . . . In the SMC, frame Nos. 1, 2, . . . are assigned to the entry areas 0, 1. . . . FIG. 143 shows the directory entry. It is divided into areas showing the file name, attribute, reservation, time, date, start cluster and file size. The file name is constituted by 11 bytes, with 8 bytes allocated to the principal file name and 3 bytes to an auxiliary file name. While the following description concerns the root directory, it also applies to the subdirectory.

FIG. 144 shows the file name. As shown, of the 8 bytes of the principal file name, 3 bytes are fixed as "DSC", and the 3 bytes of the auxiliary file name are fixed as "J6I". Of the remaining 6 bytes of the principal file name, bytes 1 to 3 are allocated to date and time calculation results to be described later, and the other two bytes 4 and 5 to the serial No. The digit number and position noted above can be selected as desired within prescriptions. The serial No. may be one from a point at which a content other than the serial No. of the name is determined. Alternatively, it may the entry No. or like processing information. The bytes (1) to (3) are determined by an operation to be described later, using the date and time information at the instant of loading of the memory card. These items of information are held until the memory card is unloaded. The calculation may be made anew when power is turned on, or it may be made anew whenever a picture is picked-up.

The above calculation is carried out by using a hash function as shown in FIG. 145.

FIG. 145 shows an example concerning 92. 09. 26 13:19 (i.e., Sep. 26, 1992, 13 hours, 19 minutes). The individual numerals are arranged in a column, and each numeral is expressed by a binary number shifted by one bit with respect to the preceding one, and then EX-OR (exclusive OR) of the individual binary numbers is taken in the column direction. This EX-OR operation yields "1" if the sum of "1" is in the individual digits is an odd number and "0" if the sum is an even number. The result is shown at the bottom. It is divided into sections each of 4 bits from the high-order bit side, then read with 0 to 9, A to F (hexadecimal system), and changed into ASCII codes. At this time, the last bit is not used. The result is "937" as shown. Thus, a file name as shown in FIG. 146 is stored, and the file name thus determined can be displayed on the view finder or an external monitor screen. In the above method of determining the file name, the name may be changed to an alphabet code. Further, the calculation for determining the file name may be carried out by adopting another means other than the hash function process or by using random numbers or the like.

Now, an embodiment which can solve the problem at the time of the superimposition of a file name, will be described. When data compatibility with a personal computer or the like is provided, it is impossible to expect names as data files in the medium. In addition, there is a possibility of superimposition at all times. This embodiment solves these problems.

In this embodiment, the file name determined in the above way is held and displayed if possible. Then, the file names in the directory are retrieved to find an identical file name, if any. If no identical file name is found, the determined file name is used. If an identical file name is found, the serial No. is incremented, and then the file name retrieval routine is executed again.

For example, with a directory of the loaded memory card having a content as shown in FIG. 147, when the first fame of picked-up data is stored, the first frame data is stored in an area A shown in FIG. 148. When the second frame is stored, the second frame file name already exists as "DSC93702.J6I" (portion C in FIG. 148), the serial No. is incremented and then stored in an area B.

FIG. 149 shows a flow chart of the procedure in this embodiment.

When the memory card is loaded, the card management area is first read out (step S351), and whether it is ready to record data is checked by checking such items as whether the card format is adequate and whether the recording capacity is sufficient (step S352). If it is found that it is not ready to record data, an alarm routine is executed (step S361). If it is ready to record data, the start address of recording is calculated from the management area data (step S353). Then the serial No. counter is initialized (step S354), and then the data and time information (in this example 92. 09. 26. 13:19) is read out from the clock module (step S355) to be converted into the file name by the above calculation (step S356). Then, the file name ("DSC93701.J6I") is generated (step S357), and it is compared with the file names in the directories (step S358) to check whether there is any identical name (step S359). If there is no identical name, it brings an end to the routine, and that file name is used. If there is an identical file name, the serial No. is incremented (step S360), and the routine is returned to the step S358. In the alarm routine in the step S361, flickering of a frame No. section on the monitor screen is caused, as shown in FIG. 150, while at the same time a buzzer sound is produced. In FIG. 149, a routine for avoiding the superimposition of file name is executed in steps S358 to S360.

FIG. 151 shows a flow chart of the routine in the recording operation.

In the recording process, first a recording start address is set from data in the management area (step S371), then a pick-up routine is executed (step S372), then compression and transmission are executed (step S373), and then a FAT is written in the directory (step S374). When the next recording routine sets in, the recording start address is calculated (step S375), and whether it is ready to record data is checked by checking whether the remaining recording capacity is sufficient (step S376). If it is determined that it is not ready to record data, an alarm routine is executed as in the previous case (step S377), and the file name is produced (step S378). Then, the routine for avoiding the superimposition as shown in FIG. 150 is executed (step S379), thus bringing an end to the routine.

As a further embodiment of the invention, an SMC will now be described which permits manual setting of part of the file name, and in which a fixed pattern and a serial No. set by the user are added.

As shown in FIG. 152, 6 bytes (characters) in the principal file name constituting the file name are allocated for the manual setting, while using two bytes for the serial No. and the remaining three bytes for a fixed pattern "J6I" as in the previous embodiment.

Figure 153A:
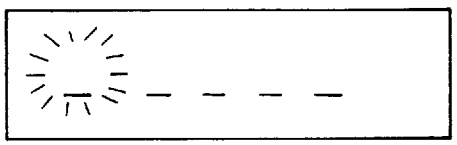
Figure 153B:
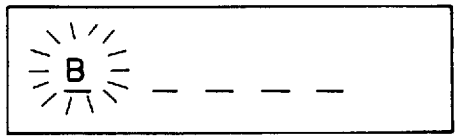
Figure 153C:
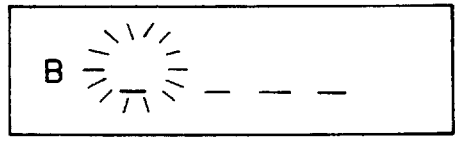
Figure 153D:
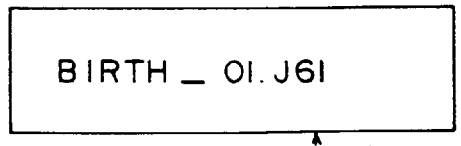
Figure 153E:

At the time of the manual setting, by operating a manual setting designation switch flickering of the display of the first digit on the monitor, corresponding to the first byte, is caused as shown in FIG. 153(A) to persuade the setting of the first digit. Then, by depressing the UP/DOWN switch among the operation switches, flickering of successive alphabet letter displays is caused as shown in FIG. 153(B). When an alphabet letter desired by the user is displayed, the setting switch is depressed to set this letter. As a result, the flickering display is shifted to the next digit as shown in FIG. 153(C). FIG. 153(D) shows the display when the setting of each digit has been completed. In this example, "BIRTH" is set by the user as letters indicating the file name. Subsequently, the monitor display is changed to the directory entry position (i.e., "01" in this example) as the normal display as shown in FIG. 153(E).

In this way, the file name is set for recording. FIG. 154 shows a state when three records are completed. When superimposition of file names occurs, it is avoided by incrementing the serial No. as described above.

This embodiment can of course be applied to the subdirectory as well, for setting the subdirectory name likewise.

A further embodiment will now be described. In this embodiment, the position of the recording area in the medium is changed when the size of the image or like data file is changed. For example, the embodiment is applicable to such case as when the data compression factor, monochromatic/color, field/frame, single/successive or a combination of some of these items is variable. When the operating mode or system data is changed, the memory capacity (or desired file size) for the recording is changed. In this embodiment, with such a change in the desired file size the position of the storage area in the medium is changed suitably by performing re-retrieval of the non-storage block.

FIG. 155(A) shows a memory card storage area. The storage area comprises a management area as a unit of memory management, and a recording-over area as shown shaded. Each storage file has a size corresponding to a file size A shown in FIG. 155(B), and a file size B shown in FIG. 155(C) is double the file size A.

If the video data file to be recorded is of the size A, it is possible to re-retrieve the non-recorded area for recording in non-recorded area #1, the recording start position of which is designated by the pointer A shown in FIG. 155(A). However, with a file of the file size B, the non-recorded area #1 has insufficient recording capacity, and therefore a pointer B is set for recording in the non-recorded area #2. In the case of the successive pick-up, as large non-recorded area as possible is desired, and thus the pointer B is set.

With a non-recorded area as shown in FIG. 156, having the file size A, for the recording with the file size A the pointer A is set, whereas for the recording with the file size B an alarm is provided for the non-recorded area of the file size A is insufficient.

FIG. 156 shows a flow chart of the routine of switching the file size in this embodiment.

When the file size is switched, the file size is determined with reference to a file size data table based on setting condition (step S381), then non-recorded areas are retrieved by the FAT retrieval (step S382), and a check is made as to whether there is any non-recorded area (step S383). If there is no non-recorded area, an alarm routine is executed (step S386). If a non-recorded area is found, a check is made as to whether the non-recorded area is a sufficiently continuous area more than the file size (step S384). If it is judged in step S384 that the area is not a sufficiently continuous area, the routine returns to the step S382. If it is judged that the area is a sufficient continuous area, a recording start area pointer is set (step S385), thus bringing an end to the routine. The pointer is used at the time of setting the recording start address shown in FIG. 157.

As shown above, this embodiment of the invention has a function of avoiding the double file name by generating a file name including process information of date and time. In addition, a portion of the file name can be designated by the user, the remaining portion being filled up by the camera. Thus, it is possible to generate a file name which can avoid the double name. Further, when an operation subject to change in the data file size is executed, the ready-to-record areas of the medium are re-retrieved, thus improving the property of use.

As has been shown, the data recording apparatus according to the invention does not only permit generation of a file name in conformity to the DOS system but also can solve the problem of data destruction accompanying the file name superimposition.

We claim:

1. An electronic still camera for taking pictures and storing them in an applied storage device, said still camera comprising:

image pick-up means for generating and outputting an analog image signal photoelectrically converted from an image incident thereon;

image data generating means for generating digital image data corresponding to said image signal outputted from said image pick-up means, a format of the digital image data being dependent upon a type of said applied storage device;

data storing means for storing said image data on said applied storage device in the form of a file organized by a directory or a subdirectory supported by a disk operating system and permitting storage of said image data in a tree hierarchical structure; and a display device for displaying said tree hierarchial structure of said image data formed as said file, said display comprising first and second display sections, both the first and second display sections provided with a connection symbol therebetween, said first and second display sections for displaying two hierarchial levels.

2. An electronic still camera according to claim 1, further comprising:

file access means for selectively accessing a file in said tree hierarchical structure; and switch means for causing said file access means to access a selected file in said tree hierarchical structure by selectively traversing a branch of the tree hierarchical structure in one of an ascending or a descending direction.

3. An electronic still camera according to claim 1, further comprising:

tree generating means for generating said tree hierarchical structure organizing said file; and switch means for causing the tree hierarchical structure to be generated in a particular form.

4. An electronic still camera according to claim 1, further comprising a display device symbolically displaying at least a portion of the tree hierarchical structure.

5. An electronic still camera according to claim 1, further comprising a display device symbolically displaying a hierarchical directory position to be accessed.

6. An electronic still camera according to claim 1, wherein some directories allowably linked as subdirectories correspond to image data files representing frame or field pictures.

7. An electronic still camera for storing image data on an applied storage device, said still camera comprising:

generating means for generating an analog image;

conversion means for converting the analog image to a digital data representation thereof;

storage means for storing said digital data representation;

group determining means for determining whether image data to be stored belongs to a predetermined group by judging whether said image data is to be stored so as to be recognized as group data or independent data, and for outputting information indicative of said determination; and indicator storage means responsive to said group determining means for storing data representative of said indicative information in a header portion of an allocated file in said applied storage device.

8. An electronic still camera according to claim 7, further comprising grouping means for defining a group corresponding to a successive pick-up operation of said still camera and for providing an indication of said group to said group determining means as said predetermined group.

9. An electronic still camera for storing image data to an applied storage device, said still camera comprising:

generating means for generating an analog image;

conversion means for converting the analog image to a digital data representation thereof;

storage means for storing said digital data representation;

generating means for generating information indicative of whether image data to be stored belongs to a predetermined group by judging whether said image data is to be stored so as to be recognized as group data or independent data, and for outputting information indicative of said determination; and storing means responsive to said generating means for storing data representative of said indicative information in a control file particularly allocated in said applied storage device designating a tree hierarchical order of image files organized by directories and subdirectories supported by a disk operating system.

10. An electronic still camera according to claim 9, further comprising:

a display device for displaying said tree hierarchial order of said image files, said display comprising first and second display sections, both the first and second display sections provided with a connection symbol therebetween, aid first and second display sections for displaying two hierarchial levels.

11. An electronic still camera for retrieving image data from an applied storage device, said still camera comprising:

generating means for generating an analog image;

conversion means for converting the analog image to a digital data representation thereof;

storage means for storing said digital data representation;

discriminating means for discriminating whether data to be read out from said applied storage device is predetermined image data by examining attribute information associated with said data to be read out; and notifying means responsive to a result of said discrimination by said discriminating means for outputting a signal indicating whether the data to be read out is said predetermined image data, said notifying means including a display device for providing an impossible-to-reproduce alarm when the data intended for reproduction is not image data.

12. An electronic still camera according to claim 11, wherein said attribute information includes an identifier specifically provided in a header portion of each allocated image data file in said applied storage device.

13. An electronic still camera according to claim 11, wherein said display device is effected by causing flickering when a pertinent frame number intended for reproduction corresponds to non-image data.

14. An electronic still camera for storing image data in an applied storage device, said still camera comprising:

generating means for generating an analog image;

conversion means for converting the analog image to a digital data representation thereof; and storage means for storing said digital data representation;

generating means for generating subsidiary information indicative of various attributes of image data, and for outputting said information; and storing means for storing said indicative information in a control file particularly allocated in said applied storage device in a hierarchical order of image files organized by directories and subdirectories supplied by a disk operating system.

15. An electronic still camera according to claim 14, wherein said control file is capable of being allocated by an external personal computer connected to said electronic still camera.

16. An electronic still camera according to claim 14, further comprising:

a display device for displaying said tree hierarchial order of said image files, said display comprising first and second display sections, both the first and second display sections provided with a connection symbol therebetween, said first and second display sections for displaying two hierarchial levels.

17. An electronic still camera for storing image data in image data files allocated on an applied storage device, said still camera comprising:

generating means for generating an analog image;

conversion means for converting the analog image to a digital data representation thereof;

storage means for storing said digital data representation;

means for generating subsidiary information required for a reproduction or retrieval operation performed by said apparatus; and storing means for storing said subsidiary information in a control file particularly allocated in a same hierarchial order as image data files organized by a directory or subdirectory supported by a disk operating system.

18. An electronic still camera according to claim 17, wherein said control file contains collective attribute information identical to attribute information stored in a header of each of said image data files.

19. An electronic still camera according to claim 17, wherein said control file contains a data transformation table to be referred to for transforming image data during a storage/retrieval operation.

20. An electronic still camera according to claim 17, further comprising:

a display device for displaying said tree hierarchial order of said image files, said display comprising first and second display sections, both the first and second display sections provided with a connection symbol therebetween, said first and second display sections for displaying two hierarchial levels.

21. An electronic still camera for storing image data in the form of image data files in an applied storage device, said still camera comprising:

generating means for generating an analog image;

conversion means for converting the analog image to a digital data representation thereof;

storage means for storing said digital data representation;

generating means for generating subsidiary information indicative of conditions commonly applied to take images concerning successive pick-up operations of said still camera; and storing means for collectively storing said subsidiary information and a number of images belonging to said series and a pointer representing a location of a forefront portion of each image data area of image data file in a control file particularly allocated in a hierarchical order of image data files organized by directories and subdirectories supported by a disk operating system.

22. An electronic still camera according to claim 21, further comprising:

a display device for displaying said tree hierarchial order of said image files, said display comprising first and second display sections, both the first and second display sections provided with a connection symbol therebetween, said first and second display sections for displaying two hierarchial levels.

23. An electronic still camera for retrieving image data in image data files from an applied storage device, said still camera comprising:

generating means for generating an analog image;

conversion means for converting the analog image to a digital data representation thereof; and storage means for storing said digital data representation;

recognition means for recognizing information indicative of conditions commonly applied to take images concerning a series of operations, a number of images belonging to said series and a pointer representing a location of a forefront portion of each allocated image data file in said applied storage device, said information being retrieved from a control file particularly allocated in a hierarchical order of image data files organized by directories and subdirectories supported by a disk operating system; and reproducing means for successively reproducing images corresponding to image data in said image data files by reading attribute information of an image data file located at a forefront position of said series and then directly reading an image data section of each said image data file by referring to a pointer representing a location of a forefront portion of an image data area in each said image data file, without referring to attribute information of each said image data file associated with a second and subsequent file of said series, based on a recognition by said recognition means, thereby enabling high speed successive reproduction.

24. An electronic still camera according to claim 23, wherein said recognition means recognizes said information by reading said control file when the apparatus is in a standby state.

25. An electronic still camera according to claim 23, wherein said control file is allocated as subordinate directories on a same hierarchical order of image files belonging to said series.

26. An electronic still camera according to claim 23, further comprising:

a display device for displaying said tree hierarchial order of said image files, said display comprising first and second display sections, both the first and second display sections provided with a connection symbol therebetween, said first and second display sections for displaying two hierarchial levels.

27. An electronic still camera for retrieving image data of image data files from an applied storage device, said still camera comprising:

generating means for generating an analog image;

conversion means for converting the analog image to a digital data representation thereof;

storage means for storing said digital data representation;

recognition means for recognizing information to be utilized in a reproduction or retrieval operation of the apparatus, said information being retrieved from a control file particularly allocated in a same hierarchical order as said image data files organized by a directory or subdirectory supported by a disk operating system; and reproducing means for reproducing images corresponding to said image data in said image data files based on the recognition by said recognition means.

28. An electronic still camera according to claim 27, further comprising:

a display device for displaying said tree hierarchial order of said image files, said display comprising first and second display sections, both the first and second display sections provided with a connection symbol therebetween, said first and second display sections for displaying two hierarchial levels.

29. An electronic still camera for storing data in the form of image data files allocated in an applied storage device, said still camera comprising:

generating means for generating an analog image;

conversion means for converting the analog image to a digital data representation thereof;

storage means for storing said digital data representation;

clock means for generating time data; and name generator means for producing a name of said files so that at least a partial section of the name is generated by a calculation based on the time data generated by said clock means, another partial section of the name is fixed as a code representing a digital still camera, and still another partial section of the name is denoted by a code representing a picture taken.

30. An electronic still camera according to claim 29, further comprising name input means for defining a remaining section of the name that is not defined by said name generator means.

31. An electronic still camera according to claim 29, further comprising:

defining means for defining a structure of a file name inclusive of at least three categories.

32. An electronic still camera according to claim 29, wherein said name generator means carries out said calculation by using a hash function.

33. An electronic still camera for storing image data in the form of image data files allocated in an applied storage device, said still camera comprising:

generating means for generating an analog image;

conversion means for converting the analog image to a digital data representation thereof;

storage means for storing said digital data representation;

recording means for recording image data on said storage device as a variable-length record;

means responsive to a variable-length recording operation by said recording means for re-examining remaining areas of said storage device to determine portions of said storage device permitting storage of supplied image data; and alarm means for providing an alarm when said remaining area is insufficient for recording said supplied image data.

34. An electronic still camera according to claim 33, wherein said re-examining means re-examines whether said remaining area is sufficiently continuous area with respect to said supplied image data.

35. An electronic still camera for taking pictures and for retrieving image data previously stored in an applied storage device, said still camera comprising:

generating means for generating an analog image;

conversion means for converting the analog image to a digital data representation thereof;

storage means for storing said digital data representation;

file forming means for providing a relational information file in which various information defining a relationship between a file and another file are described; and reproductive means for controlling a manner of one of simultaneous and successive reproduction for data of image files with reference to said relational information file.

36. An electronic still camera for taking pictures and for retrieving image data previously stored in an applied storage device in the form of a file, said still camera comprising:

generating means for generating an analog image;

conversion means for converting the analog image to a digital data representation thereof;

storage means for storing said digital data representation;

successive reproduction executing means for successively reproducing stored data from said applied storage device;

discriminating means for discriminating whether data of a file to be read from said applied storage device is image data by examining attribute information associated with said data to be read; and skipping means for skipping over a data file through said successive reproduction stage when said data intended for reproduction is non-image data based on discrimination of said discriminating means.

37. An electronic still camera for taking pictures and for retrieving image data previously stored in an applied storage device in the form of a file, said still camera comprising:

generating means for generating an analog image;

conversion means for converting the analog image to a digital data representation thereof;

storage means for storing said digital data representation; and an angle information storage means for storing an information representing a three-dimensional angle of the subject as seen from said electronic still camera while taking a photograph using said still camera.

38. An electronic still camera for obtaining image data via an image pick-up device and an image data processing circuit connected to the image pick-up device, and for storing the image data in an applied storage device in the form of a file organized by a directory or a subdirectory supported by a disk operating system in a tree hierarchial structure, said still camera comprising:

image file access means for selectively accessing a specific image file in said tree hierarchical structure; and switch means including a first switch for frame-up accessing and a second switch for frame-down accessing, both of said first and second switches being disposed in a predetermined portion of said camera body, for causing said file access means to access a selected file in said tree hierarchical structure by selectively traversing a branch of the tree hierarchical structure in one of an ascending or a descending direction.

39. An electronic still camera according to claim 38, further comprising a display device, disposed on a predetermined portion of a camera body, for symbolically displaying at least a portion of the tree hierarchical structure.

40. An electronic still camera according to claim 38, further comprising:

a display device for displaying said tree hierarchial structure of said image data formed as said file, said display comprising first and second display sections, both the first and second display sections provided with a connection symbol therebetween, said first and second display sections for displaying two hierarchial levels.

41. An electronic still camera for obtaining image data via an image pick-up device and an image data processing circuit connected to the image pick-up device, and for storing the image data in an applied storage device in the form of a file organized by a directory or a subdirectory supported by a disk operating system in a tree hierarchial structure, said still camera comprising:

tree generating means for generating said tree hierarchical structure organizing said file; and switch means including a specific operation switch disposed on a predetermined portion of a camera body, for causing the tree hierarchical structure to be generated in a particular form.

42. An electronic still camera according to claim 41, disposed on a predetermined portion of a camera body, for further comprising a display device symbolically displaying at least a portion of the tree hierarchical structure.

43. An electronic still camera according to claim 41, further comprising:

a display device for displaying said tree hierarchial structure of said image data formed as said file, said display comprising first and second display sections, both the first and second display sections provided with a connection symbol therebetween, said first and second display sections for displaying two hierarchial levels.

* * * * *